US011886213B2

(12) United States Patent
Heydari et al.

(10) Patent No.: US 11,886,213 B2
(45) Date of Patent: Jan. 30, 2024

(54) CONNECTED SANITARYWARE SYSTEMS AND METHODS

(71) Applicant: AS America, Inc., Piscataway, NJ (US)

(72) Inventors: Behnam Heydari, Ridgewood, NJ (US); Eric B. Soberano, Barnegat, NJ (US); Robert M. Jensen, East Brunswick, NJ (US); Verne Myers, Fort Wayne, IN (US); Christopher Helmstetter, Langhorne, PA (US); Mahendra Gunawardena, Hillsborough, NJ (US); Claudia Marcela Jovel, Jamesburg, NJ (US); Ki Bok Song, Plainview, NY (US); Soonjae Kwon, Astoria, NY (US); Stanmir Stoynov, Westfield, NJ (US)

(73) Assignee: AS America, Inc., Piscataway, NJ (US)

( * ) Notice: Subject to any disclaimer, the term of this patent is extended or adjusted under 35 U.S.C. 154(b) by 158 days.

(21) Appl. No.: 17/263,388

(22) PCT Filed: Aug. 2, 2019

(86) PCT No.: PCT/US2019/044894
§ 371 (c)(1),
(2) Date: Jan. 26, 2021

(87) PCT Pub. No.: WO2020/028798
PCT Pub. Date: Feb. 6, 2020

(65) Prior Publication Data
US 2021/0157340 A1 May 27, 2021

Related U.S. Application Data

(60) Provisional application No. 62/714,299, filed on Aug. 3, 2018.

(51) Int. Cl.
*G05D 7/06* (2006.01)
*G05B 15/02* (2006.01)
(Continued)

(52) U.S. Cl.
CPC ............. *G05D 7/0617* (2013.01); *E03D 3/12* (2013.01); *E03D 5/10* (2013.01); *E03D 5/105* (2013.01);
(Continued)

(58) Field of Classification Search
CPC ................................ E03C 1/057; E03D 5/105
See application file for complete search history.

(56) References Cited

U.S. PATENT DOCUMENTS 6,250,601 B1 * 6/2001 Kolar ........................ G01S 7/41
251/129.04
6,934,977 B1 8/2005 Quintana
(Continued)

FOREIGN PATENT DOCUMENTS

JP 03-224925 A 10/1991
JP 2002-021148 A 1/2002
(Continued)

OTHER PUBLICATIONS

International Search Report dated Oct. 29, 2019 in corresponding International Application No. PCT/US2019/044894 (2 pages).

*Primary Examiner* — Janie M Loeppke
(74) *Attorney, Agent, or Firm* — Anna-Lisa L. Gallo; Tyler A. Stevenson

(57) ABSTRACT

A sanitaryware system may include sensors to determine a status or condition of one or more sanitaryware fixtures in the sanitaryware system and perform a particular function, such as, for example performing a flush, closing the flush valve and/or angle stop, sending an alert, initiating a service ticket. The sanitaryware system may automatically perform
(Continued)

the function. The sanitaryware system may communicate the status or condition to an internet connected device and/or user, the device may perform the function or may instruct the sanitaryware to perform the function. The sensed information, sanitaryware system status or condition, and/or initiated response may be logged and monitored to improve the overall efficiency and operation of the sanitaryware system and the sanitaryware fixtures within the system.

24 Claims, 51 Drawing Sheets

(51) Int. Cl.
  *E03D 3/12*   (2006.01)
  *E03D 11/00*   (2006.01)
  *E03D 5/10*   (2006.01)
(52) U.S. Cl.
  CPC .............. *E03D 11/00* (2013.01); *G05B 15/02* (2013.01); *E03D 2201/00* (2013.01)

(56) References Cited

U.S. PATENT DOCUMENTS

| | | | |
|---|---|---|---|
| 7,177,725 B2 | 2/2007 | Nortier et al. | |
| 7,304,569 B2 | 12/2007 | Marcichow et al. | |
| 8,037,551 B2 | 10/2011 | Wilson et al. | |
| 8,364,546 B2 | 1/2013 | Yenni et al. | |
| 8,561,225 B2 | 10/2013 | Wilson et al. | |
| 8,907,810 B2 | 12/2014 | Belz et al. | |
| 9,169,625 B2 | 10/2015 | Chiu et al. | |
| 9,657,472 B2 | 5/2017 | Plate et al. | |
| 10,378,676 B2 | 8/2019 | Bush et al. | |
| 10,430,737 B2 | 10/2019 | Yenni et al. | |
| 10,498,620 B2 | 12/2019 | Lin | |
| 10,936,612 B2 | 3/2021 | Amin et al. | |
| 2002/0007510 A1* | 1/2002 | Mann | E03C 1/057 4/300 |
| 2006/0006354 A1* | 1/2006 | Guler | E03C 1/057 251/129.04 |
| 2009/0119142 A1 | 5/2009 | Yenni | |
| 2010/0269248 A1 | 10/2010 | Nowak | |
| 2014/0373263 A1* | 12/2014 | Plate | E03D 9/00 4/300 |
| 2017/0167123 A1* | 6/2017 | Allard, III | F16K 37/0091 |
| 2017/0235317 A1 | 8/2017 | Cummings et al. | |
| 2018/0010322 A1 | 1/2018 | Grover et al. | |
| 2019/0087788 A1* | 3/2019 | Murphy | E03D 5/105 |
| 2019/0120809 A1 | 4/2019 | Rexach et al. | |
| 2019/0354535 A1 | 11/2019 | Amin et al. | |
| 2020/0299941 A1 | 9/2020 | Veros et al. | |

FOREIGN PATENT DOCUMENTS

| | | |
|---|---|---|
| JP | 2003-074105 A | 3/2003 |
| JP | A 2017-031623 A | 2/2017 |
| JP | A 2018-062776 A | 4/2018 |

* cited by examiner

Device Management

Filters

- Device Type
  - ☑ Gateway
  - ☑ Toilets
  - ☐ Urinals
  - ☐ Faucets
- Bathroom Type
  - ☑ Men
  - ☑ Women
  - ☑ Unisex
- Location
  - All
  - Floor 1
  - Floor 2
  - Floor 3

Search [ ]

| Name | Floor | Bathroom | Clogs 🔔 | Battery 🔋 | Comm. 📶 |
|---|---|---|---|---|---|
| Stall 1 | 2 | Men's East | 1 | LOW | 5 min ago |
| Stall 2 | 2 | Men's East | OK | OK | 30 Hrs. ago |
| Stall 3 | 2 | Men's East | OK | OK | 30 Hrs. ago |
| Stall 4 | 2 | Men's East | OK | OK | 30 Hrs. ago |
| Stall 5 | 2 | Men's East | 1 | CRITICAL | 30 Hrs. ago |

« Previous  1  2  3  4  ...  12  13  Next »

Sidebar: JS John Smith — Dashboard, Operational Status, Device Management, Reports, App Setup, AS Diagnostics

FIG. 4B

Device Management

Filters

Device Type
- ☑ Gateway
- ☑ Toilets
- ☐ Urinals
- ☐ Faucets

Bathroom Type
- ☑ Men
- ☑ Women
- ☑ Unisex

Location
- All
- Floor 1
- Floor 2
- Floor 3

Search

| Name | Floor | Bathroom | Clogs 🔔 | Battery 🔋 | Comm. 📶 |
|---|---|---|---|---|---|
| Stall 1 | 2 | Men's East | 1 | LOW | 5 min ago |
| Stall 2 | 2 | Men's East | OK | OK | 30 Hrs. ago |
| Stall 3 | 2 | Men's East | OK | OK | 30 Hrs. ago |
| Stall 4 | 2 | Men's East | OK | OK | 30 Hrs. ago |
| Stall 5 | 2 | Men's East | 1 | CRITICAL | 30 Hrs. ago |

« Previous [1] 2 3 4 ... 12 13 Next »

Sidebar:
- JS John Smith
- Dashboard
- Operational Status
- Device Management
- Reports
- App Setup
- AS Diagnostics

Operational Status > Overview

Status Overview

| | No. of Flushes (times) | No. of 2nd Flushes (times) | Water Consumption (gal) | Batteries Status (%) | Clogs Status | High Traffic Bathrooms | Communication |
|---|---|---|---|---|---|---|---|
| Floor 3 - W North - No.1 | 54 | 5 | 85 | 98 | OK | Low | Fail |
| Floor 3 - W North - No.2 | 67 | 8 | 102 | 85 | OK | Mid | OK |
| Floor 3 - W North - No.3 | 89 | 32 | 135 | 0 | Low | High | Fail |
| Floor 3 - W North - No.4 | 46 | 26 | 70 | 92 | OK | Low | OK |
| Floor 3 - W North - No.5 | | | | | | | |
| Floor 3 - W South - No.1 | | | | | | | |
| Floor 3 - W South - No.2 | | | | | | | |
| Floor 3 - W South - No.3 | | | | | | | |
| Floor 3 - W South - No.4 | | | | | | | |
| Floor 3 - W South - No.5 | | | | | | | |
| Floor 3 - M North - No.1 | | | | | | | |

Floor 3 ▾    Detail    Company 1 ▾    Building 1 ▾    Last 30 Days ▾

Individual Status Detail

No.1 W North Floor 3

- No. of Flushes: 54 times
- No. of 2nd Flushes: 5 times
- Water Consumption: 85 gal
- Batteries to Status: 98% (Last 03/12/19)
- Clog Status: OK (Last 05/24/17)
- High Traffic Bathrooms: Low
- Communication: Fail

Operational Status

Company 1 ▼ Building 1 ▼

Batteries to Change
4 Critical Level
12 To Replace Soon

Communication
8 Fixtures Out of Range

No. of Pending Clogs
15 Pending Clogs

High Traffic Bathrooms
4 Higher than usual traffic

Pending Alarms per Floor
Select a floor for details

- Floor 2: 9
- Floor 1: 8
- Floor 3: 7
- Floor 10: 5
- Floor 5: 5
- Floor 4: 4
- Floor 6: 2
- Floor 9: 1
- Floor 7: 0
- Floor 8: 0

Men's East — Floor 2

| | Clog | Battery | Comm | System |
|---|---|---|---|---|
| Stall 1 | YES | OK | 5 min ago | OK |
| Stall 2 | YES | OK | OK | F.Y. Inhibited |
| Stall 3 | YES | OK | OK | OK |
| Stall 4 | YES | OK | OK | OK |
| Stall 5 | OK | OK | OK | OK |

Normal Traffic 320 Visits
Gateway OK

Bathrooms Status — Floor 1 ▼

| Bathroom Name | Floor | Clogs | Battery | Traffic | Comm. |
|---|---|---|---|---|---|
| Men's East | 2 | 4 | ✓ | ⊗ | ✓ |
| Men's West | 2 | 3 | ✓ | ⊗ | ✓ |
| Women's East | 2 | ✓ | ✓ | ⊗ | ✓ |
| Women's West | 2 | ✓ | 2 | ⊗ | 1 |
| Unisex ADA | 2 | ✓ | ✓ | ⊗ | ✓ |

---

John Smith ▼

- Dashboard
- Operational Status
- Device Management
- Reports
- App Setup

[Wire Frame]

[Wire Frame]

CONNECTED SANITARYWARE SYSTEMS AND METHODS

CROSS-REFERENCE TO RELATED APPLICATIONS

This application claims priority to U.S. Provisional Application No. 62/714,299, filed Aug. 3, 2018, hereby incorporated by reference in its entirety.

TECHNICAL FIELD OF THE INVENTION

The present invention relates generally to connected sanitaryware systems and methods and, more particularly, to sanitaryware communication with internet connected devices to control performance and operation of the sanitaryware.

BACKGROUND OF THE INVENTION

Water conservation is a concern for numerous economic and environmental reasons. Currently, to conserve water during flushing, many toilets use "dual flush" technology. The "dual flush" technology provides users with a "low volume flush" option (usually about 2 to 4.5 liters) and a "high volume" flush option (usually about 4 to about 9 liters). The option selected depends on the contents of the toilet bowl after use, with the flush disposal of liquid waste requiring only use of the "low volume" option while the "high volume" option could be used for solid waste disposal. However, a "dual flush" toilet limits the selection of volumes to two discrete amounts, "low" and "high" flush volumes. Further, the "dual flush" toilet leaves the selection of the volume to the discretion of the user, who may choose a "high" flush volume when a "low" flush volume otherwise would suffice. Furthermore, when a toilet malfunctions, such as when there is a clog, constant flush condition, and/or failure of a toilet component, water may continually run into the bowl or may not exit the bowl. This may all lead to wasting of water, resources, money, and/or damage to the toilet, bathroom and/or building. Therefore, a need exists for sanitaryware which may determine the contents of the toilet and flush the appropriate water level. A need further exists for sanitaryware which may communicate with other devices to operate in a manner that controls the water flow through the toilet. Yet a further need exists for connected sanitaryware systems and methods.

BRIEF SUMMARY OF THE INVENTION

In an embodiment of the disclosure, a sanitary ware control system for controlling a sanitaryware fixture system may include a plurality of sanitaryware fixtures; one or more sensors coupled to each of the sanitaryware fixtures, the one or more sensors configured to detect one or more parameters associated with operation of sanitaryware fixture system; and a controller electrically coupled to each of the sanitaryware fixtures and configured to determine a condition of the sanitaryware fixture system based on the detected one or more parameters. Each of the sanitaryware fixtures are configured to be operated based on the condition, external behavior data, or a combination thereof.

In an embodiment of the disclosure, the external behavior data is from a similar system or a dissimilar system.

In an embodiment of the disclosure, the similar system is one or more of the other sanitaryware fixtures.

In an embodiment of the disclosure, the dissimilar system is weather services, date and time management services, or inline flow meters.

In an embodiment of the disclosure, the plurality of sanitaryware fixtures comprise toilets, urinals, bidets, or combinations thereof.

In an embodiment of the disclosure, the controller is configured to initiate an action to operate one or more of the plurality of sanitaryware fixtures based on the condition and external behavior data.

In an embodiment of the disclosure, the condition corresponds to a load status and the action is one of a high flush volume or a low flush volume.

In an embodiment of the disclosure, the condition is a clog event and the action is one of initiating a service ticket, closing a flush valve, or closing an angle stop.

In an embodiment of the disclosure, the condition is a leak detection and the action is one of initiating a service ticket, closing a flush valve, or closing an angle stop.

In an embodiment of the disclosure, the condition is an angle stop status and the action is self-diagnosing a clog or initiating a service ticket.

In an embodiment of the disclosure, the condition is a battery status and the action is initiating a service ticket.

In an embodiment of the disclosure, the condition is a water pressure and the action is initiating a service ticket, supporting a claims investigation, facilitating trouble shooting, or adjusting a duration a valve remains open.

In an embodiment of the disclosure, the condition is fixture usage and the action is monitoring a usage of a bathroom or initiating a service ticket based on unusual activity.

In an embodiment of the disclosure, the condition is a water level and the action is initiating a service ticket or adjusting a position of a valve.

In an embodiment of the disclosure, the condition is a line clog and the action is initiating a service ticket or adjusting a position of a valve.

In an embodiment of the disclosure, the condition is an uncharacteristically high or low level of usage of one or more the sanitaryware fixtures as compared to historical data and the action is initiating a service ticket.

In an embodiment of the disclosure, the controller is configured to send the detected one or more parameters and determined condition information to an external device to store and log.

In an embodiment of the disclosure, each of the sanitaryware fixtures are configured to be operated based on a historical data of the stored one or more parameters, condition, and a previous action stored over a period of time.

In an embodiment of the disclosure, the controller is a plurality of controllers, each of the plurality of controllers coupled to a respective one of the plurality of sanitaryware fixtures.

In an embodiment of the disclosure, the controller is electrically coupled to a subset of the plurality of sanitaryware fixtures.

In an embodiment of the disclosure, the one or more sensors includes an ultrasonic sensor located on an exterior of a bowl of one of the plurality of sanitaryware fixtures and an infrared sensor located on a flush valve assembly of the one of the plurality of sanitaryware fixtures, and wherein the one or more parameters includes an indication of bowl contents sensed from the ultrasonic sensor and an indication of usage time of the one of the plurality of sanitaryware fixtures sensed from the infrared sensor.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF DRAWINGS

The accompanying drawings, which are included to provide a further understanding of the invention and are incorporated in and constitute a part of this specification, illustrate preferred embodiments of the invention and together with the detailed description serve to explain the principles of the invention, in the drawings:

FIG. 4A-4D show an exemplary user dashboard.

FIGS. 5A-5J show a user side of an exemplary user dashboard.

DETAILED DESCRIPTION OF THE INVENTION

Figure 1A:
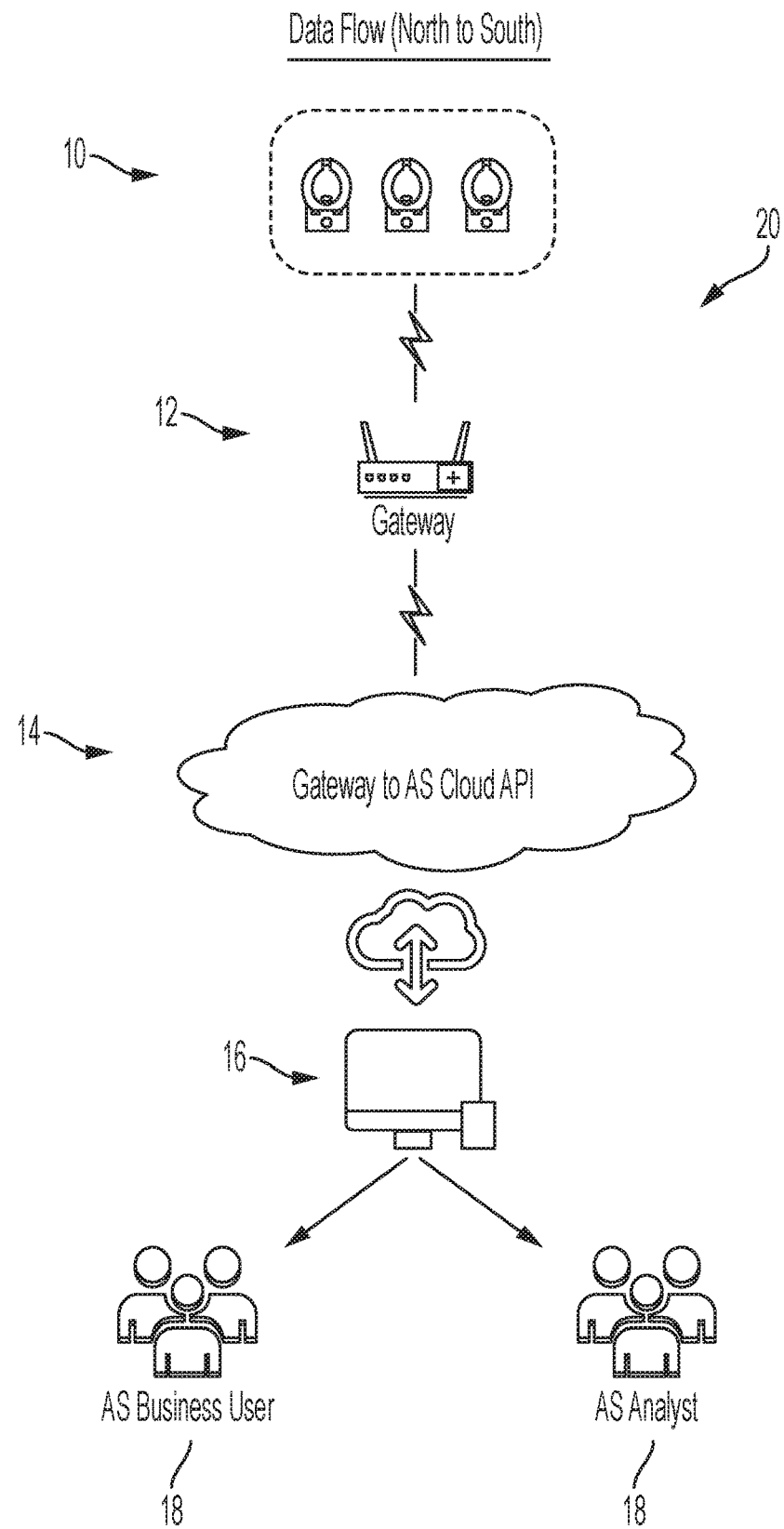
FIG. 1A shows an exemplary flow diagram of communication in a connected system.

The present disclosure relates to systems and methods for the monitoring and control of a set or collection of devices in one or more bathrooms within a building or buildings, warehouse, campus, etc. For example, the system and methods of the present disclosure may monitor and control toilets, urinals, faucets, and/or paper dispensers (e.g., paper towel or toilet paper) within one or more restroom in a building, buildings, warehouse, campus, etc. The control and monitoring may be facilitated by electrically coupling (either wireless, wired, or a combination thereof) the various devices to each other and/or to a computing device. Thus, a user may monitor the status of each device remotely from the computing device. When a problem or other activity occurs in one of the monitored devices, the user may initiate a response or action via the computing device. For example, if a clog is detected in a toilet, the user may disable the use of that toilet and/or other toilets in fluid communication with the clogged toilet. The devices may initiate the action automatically based on a programmed instructions, data stored in a central cloud, and/or data stored on the computing device. In this manner, the user may have remote control of a collection of bathrooms within a single location (e.g., the computing device). This may facilitate the maintenance, control, and monitoring of the bathrooms and/or may assist in water conservation and/or a reduction in water usage by the collection of bathrooms.

The present invention relates to connected sanitary ware systems and methods. The system may include connected, interconnected or networked sanitaryware fixtures. The present invention also relates to a sanitaryware system that may include one or more sanitaryware fixtures, such as a toilet, urinal, or bidet. Each of the one or more sanitaryware fixtures may include one or more sensors to determine a status or condition of the sanitaryware system or an individual sanitaryware fixture in the system, and perform a particular function or action. The sanitaryware system may automatically perform the function (e.g. performing a flush, closing the flush valve and/or angle stop, sending an alert, initiating a service ticket, etc.). The sanitaryware system may communicate the status or condition to an internet connected device, the device may then perform the function or may instruct the sanitaryware to perform the function. For example, the device may instruct a flush, a valve closing, or initiation of a service ticket. The device may log and monitor the status or condition of the sanitaryware to improve the overall efficiency and operation of the sanitaryware and a collection of the sanitaryware.

The systems and methods in accordance with the principles of the invention include communication and the ability to communicate. The present disclosure may include a sanitaryware capable of communicating with one or more devices. The one or more devices may be Internet connected devices. In one aspect, the various devices contemplated are connected to each other in order to transfer data, information, instructions, inputs, and outputs. Network connections can include bridges, routers, switches and gateways. The one or more devices may be capable of one-way, two-way and/or multi-way communication with the sanitaryware, as will be described in more detail to follow. For example, the one or more devices may be other sanitaryware devices, mobile devices, computers, other plumbing fixtures, etc. The sanitaryware may be a urinal, bidet, and/or toilet. The sanitaryware may include one or more sensors. The one or more sensors may detect a condition of the sanitaryware. Various sensors to detect a sanitaryware condition are described in U.S. patent application Ser. No. 15/643,086 titled Systems to Automate Adjustment of Water Volume Release to a Toilet Bowl to Correspond to Bowl Contents, Toilets Including the System and Related Methods to Grover et al. ("Grover et al."), which is incorporated by reference in its entirety. For example, the one or more sensors may be ultrasonic sensors for determining a load or condition of the sanitaryware bowl. The one or more sensors may be ultrasonic sensors coupled to an outer surface of the bowl for determining a status or condition of the sanitaryware bowl. The one or more sensors may be flow sensors or flow rate sensors detecting a flow of fluid through an angle stop, through a flush valve, or through the sanitaryware, etc. The one or more sensors may be pressure sensors for detecting water pressure at one or more locations within the sanitaryware, valves, and plumbing lines. The one or more sensors may be a user detection sensor (e.g. a proximity sensor) for detecting the presence and/or absence of a user. The one or more sensors may be a capacitive sensor. The one or more sensors may be any combination of the described sensors or other known sensors. Various sensors are contemplated in accordance with the principles of the invention.

The one or more sensors may send and/or receive signals from the one or more devices. The one or more devices may be external devices (e.g. a centralized data server, a computer, tablet, mobile device, other plumbing fixtures, etc.) or internal, sanitaryware devices (e.g. flush valve, angle stop, other valves, etc.). The one or more devices may be external to the particular sanitaryware in which the sensor is located or internal to the sanitaryware. The one or more sensors may communicate directly with the one or more devices. That is, the one or more sensors may send a signal corresponding to a sensed one or more parameters of the sanitaryware to the one or more devices. The one or more devices may evaluate the data and determine a status or condition of the sanitaryware. The one or more devices may send a signal indicative of the status or condition of the sanitaryware to a user for evaluation or action. The action may include repair, replacement, or cleaning, for example, of the sanitaryware.

Figure 1B:
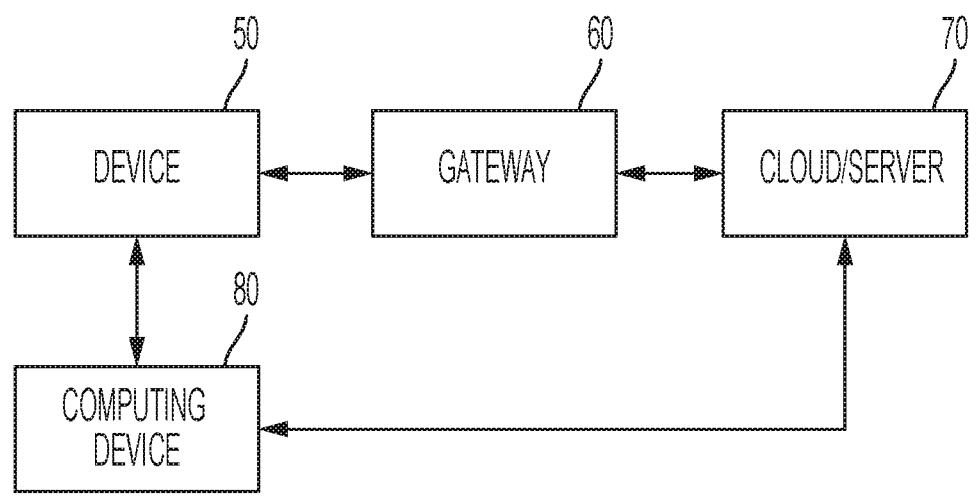
FIG. 1B shows an exemplary flow diagram of communication in a connected system.
Figure 1C:
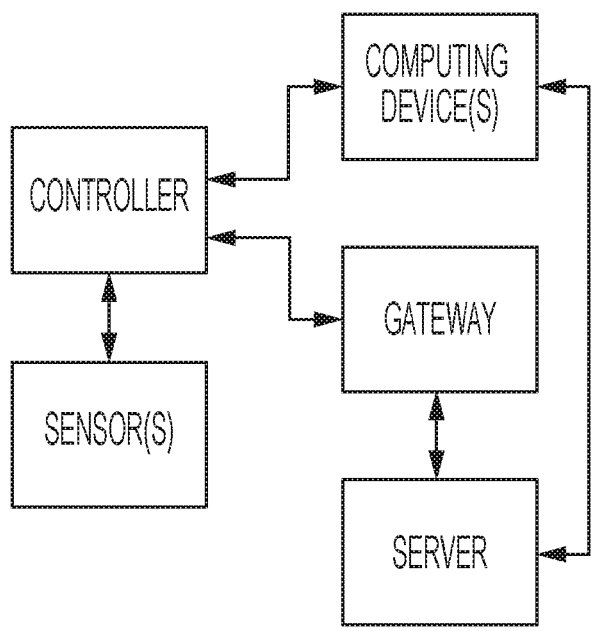
FIG. 1C shows an exemplary Bow diagram of communication in a connected system.

The one or more sensors may communicate with the control system and/or communication system (FIG. 1C). The system may include one or more controllers and/or one or more communication devices. The system may communicate directly with the one or more devices, as will be described in more detail to follow. The one or more sensors may send a signal corresponding to a sensed one or more parameters of the sanitaryware to the system. The system may determine a status or condition of the sanitaryware based on the sensed data and algorithms present in the system. The system may instruct one or more of the one or more devices to perform a function, such as, for example, initiating a particular flush volume where the one or more devices is a flush valve), shutting of flow of water to the sanitaryware (e.g. where the one or more devices is an angle stop), initiating a service ticket (e.g. where the one or more devices is a central computer system or mobile device or janitor's mobile device, etc.). One or more of the one or more devices may log the status and function performed. The data collected by the one or more devices may be used to improve the efficiency of a building system or network of sanitaryware.

For example, the control system may determine, based on the collected data, that use of a certain flush volume in the afternoon leads to a higher number of dogged sanitaryware, and based on that determination the control system increases the flush volume for one or more sanitaryware devices. In an example, the sanitaryware devices with increased flush volume may be only those devices which previously experienced clogs. In an example, the control system may increase flush volume for all of the sanitaryware devices or a subset of the sanitaryware devices. The subset may be sanitaryware devices in the same room, building, or vicinity of the previously clogged devices. In an example, the efficiency of the building system may be improved based on analysis of the collected data by modifying water usage for one or more related sanitaryware devices which are located remotely from a sanitaryware device at which the data was collected.

Data received from a device may be analyzed (e.g., regression analysis, Monte Carlo simulation, averages, etc.), and based on the analysis water usage at a particular device may be modified. Data from more than one device may be aggregated and combined together for analysis, and as additional data is generated by the devices, that data may be added to the previously collected data and analyzed. In an example, if a data storage limit is present, the system may replace the oldest data saved with new, updated, or more recent data. The data may be collected in any number of ways. Collection and/or analysis of the data may occur on a predetermined basis. In an example, the analysis of the data may occur on a periodic basis (e.g., every hour, every day, every week, etc.) or may occur as the data is received and combined with previous data.

The sanitaryware of the disclosure may be coupled to one or more internet connected devices (e.g. internet of things or IOT devices). The devices may include a computer, a tablet, phone, mobile device, components of the sanitaryware (e.g. valves, sensors, etc.), appliances and/or fixtures within a building (e.g. a sink, shower, bathtub, faucet, toilet paper dispenser, paper towel dispenser, soap dispenser, other sanitaryware, toilet, urinal, bidet, refrigerator, freezer, dishwasher, drinking fountains, water features, etc.). The sanitaryware and/or the IOT devices may have two-way communication such that the sanitaryware and/or IOT devices may each send and receive signals, instructions, data, etc. The signals may be associated with the function of the sanitaryware and/or IOT device. The two-way communication may be wired, wireless, PAN, Bluetooth® (e.g. short-range wireless communication), other low power wireless, short range communication, or combinations thereof. For example, the sanitaryware may communicate a status of the sanitaryware (e.g. clogged, cleaning cycle, flushing, volume, etc.) to the IOT device. The status of the sanitaryware may be determined in accordance with the description. The IOT device may evaluate the status of the sanitaryware, compare it to a database of predetermined instructions, and send a corresponding instruction back to the sanitaryware or to a device coupled to the sanitaryware. Alternatively or additionally, the IOT device may evaluate the status of the sanitaryware and communicate predetermined instructions to a third IOT device. For example, the IOT device may communicate the status to a shut-off valve or angle stop valve of the sanitaryware to open or close, thus opening or closing the water flow to the sanitaryware. The sanitaryware may be able to communicate with external internet connected devices to detect a variety of reasons.

As described herein, the components of the connected system may be in electrical communication (e.g., connectivity) with each other. That is, the components or devices of the connected system may be in electrical communication with other components or devices, such as sensors, controllers, computing devices, internet devices, a central server, sanitaryware devices (or the other devices described herein) etc. The electrical communication may allow for the transmission to and/or from each component. The electrical communication may be transmission of data, information, instructions, status, etc., or combinations thereof. The electrical communication may be one-way, two-way, and/or multi-way communication. Such communication can occur via half-duplex or full-duplex. The electrical communication may be between parts, power sources, flush valves, toilets, IOT devices. The electrical communication may be wired and/or wireless. The electrical communication may be through gateways. The electrical communication may be the transmission of electrical signals that include data, information, instructions, etc., or combinations thereof.

Referring to FIG. 1A, an exemplary data flow of a connected system, such as a connected sanitaryware system 20 from one or more sanitaryware 10 to one or more users 18 is shown. One or more of the sanitaryware 10 may include sensors, communication devices, and/or controllers. The sensors may be, as previously described, for sensing one or more parameters of the sanitaryware. The sensed data may be communicated through a gateway 12, to the cloud or server 14, a user's device 16, and then to the user 18. The user 18 may be a business user, such as a user associated with the location of the installed sanitaryware system 20 and/or an analyst associate either with the business or with the manufacturer/seller of the sanitaryware 10. Alternatively, the sensed data may be communicated directly to the server 14. The server 14 may allow for the system to log, save, and manage a multiple or resources, as is described in more detail. Information internal to the building, internal to the sanitaryware, external to the building, operational data, weather data, daily prices of water or other resources, etc. may be stored within the server 14 for use by all levels of the sanitaryware system 20, as is described herein.

The present disclosure describes a smart connected sanitaryware system 20 that may control the operation of valves or other components of the toilet (or other sanitaryware). The control of the valves may be based on information stored in or communicated through the server 14, such as, for example plumbing system behavior (e.g. line clogs), static (product profiles) and dynamic data (sensors) inputs from the system, environmental behaviors/changes (e.g. winter, summer, drought, periodic flush to prevent freezing of plumbing system), and/or daily, weekly, monthly and/or yearly usage patterns, etc. A few exemplary embodiments are described herein.

Referring to FIG. 1B, an example of the electrical communication between parts of the connected system 20 or connected system 100 (FIG. 2) is shown. The device 50 (e.g., the sanitaryware device or other device) may communicate with a gateway 60 which may communicate with a cloud/server 70. The server 70 may communicate with the computing device 80. The path may be two-directional. That is, the device 50 may transmit a parameter to the computing device 80 by way of the server 70. The computing device 80 may determine an appropriate action (e.g., based on the parameter and any external information stored in the computing device 80 and/or the server 70) and transmit the instructions to the device 50 by way of the server 70. The device 50 may communicate with the computing device 80 directly, without the user of the server. This local communication may be wired or wireless and may be two-directional. That is, the device 50 may transmit the parameter to the computing device 80 directly and the computing device 80 may return instructions to the device 50 directly, without the need for communication with the cloud/server 70. Such communications can be in half-duplex or full duplex.

Figure 1D:
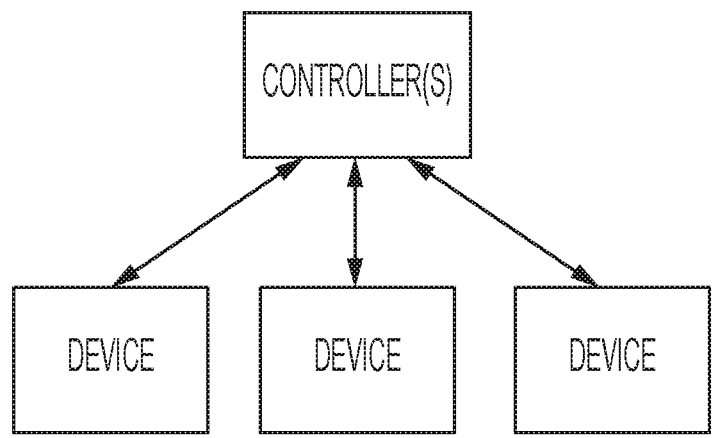
FIG. 1D shows an exemplary flow diagram of communication in a connected system.
Figure 1E:
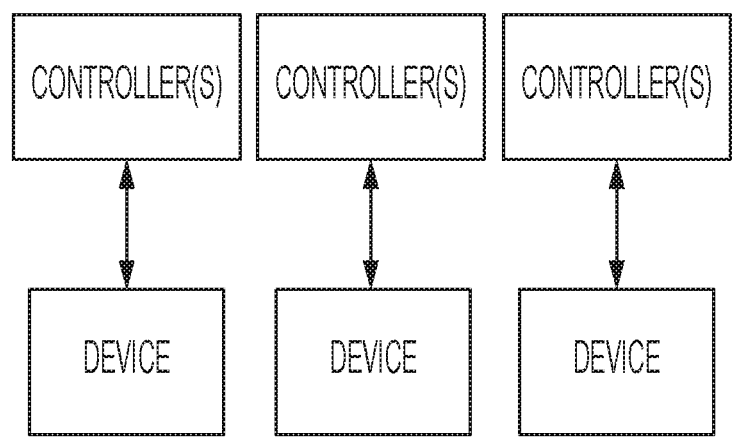
FIG. 1E shows an exemplary flow diagram of communication in a connected system.

Referring to FIG. 1C, an example of the electrical communication between parts of the connected system 20 or connected system 100 (FIG. 2) is shown. The sensor(s) and/or the controller(s) may be located on the device (e.g., device 50 of FIG. 1B). For example, the sensor(s) may be located on the flush valve, on the toilet bowl, on an exterior of the toilet bowl, etc. The sensor(s) may include an ultrasonic sensor located on the exterior surface of the ceramic toilet bowl for detecting bowl contents and/or may include an infrared sensor located on or near the flush valve for detecting the presence of a user. The sensor(s) may be physically located on the device and/or may be located in proximity to the device. The controller(s) may be located on the flush valve, on the toilet bowl, or other location. The controller(s) may be located remotely from the device. The controller(s) need not be located directly on the device and may be located remotely while still being in electrical communication (either wired or wireless) with the sensor located on or near the device. In this manner, one controller may monitor and/or control one or more sensors that are located on one or more devices (FIG. 1D).

With continued reference to FIG. 1C, the controller(s) may electrically communicate with the sensor(s) as described herein. The controller(s) may transmit and/or receive signals to and/or from the sensor(s). The controller(s) may electrically communicate with a computing device and/or with a server by way of a gateway. The controller(s) may transmit and/or receive signals to and/or from the computing device(s) and/or the server. Thus, the controller(s) may be communicate locally (e.g., without connection to the server) by way of the computing device(s) and/or may communicate with the server. The controller(s) may therefore be able to consider a variety of information when instructing action (e.g., instructing the flush valve to open and/or close, instructing the angle stop to close, sending a message to a technician and/or janitor, or other actions as described herein). The information may be information related to an individual toilet, a system of toilets, water usage, weather, sanitaryware contents, user status, etc., and any of the information discussed herein. Each controller(s) may be associated with a plurality of devices (FIG. 1D) or a single device (FIG. E).

Figure 2:
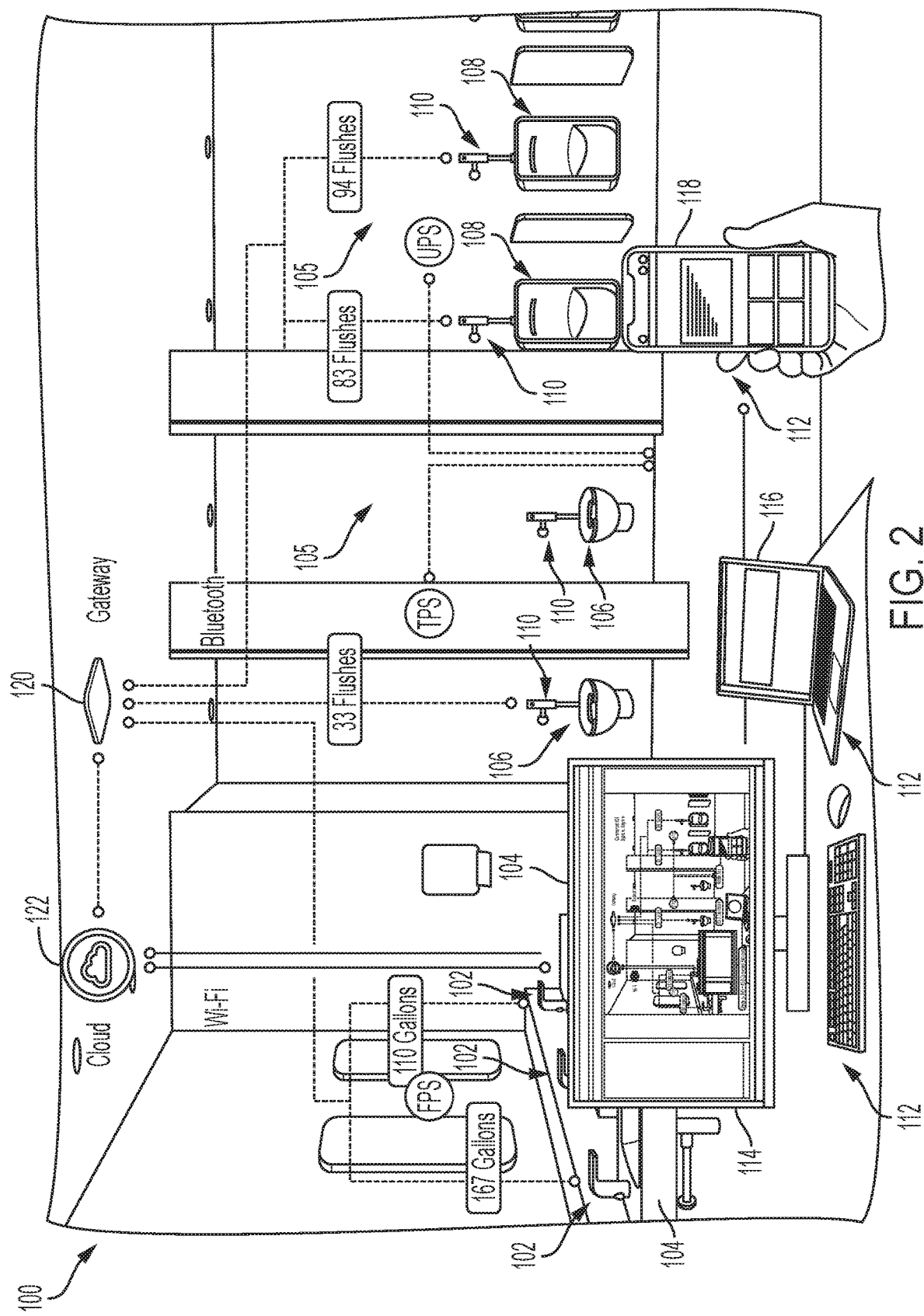
FIG. 2 shows an exemplary connected system.

An exemplary connected system 100 is shown in FIG. 2. The connected system 100 may include one or more faucets 102 (e.g., faucets 102 associated with sinks 104). The connected system 100 may include one or more sanitaryware 105, such as one or more toilets 106 and/or one or more urinals 108. Although sinks 104, toilets 106 and urinals 108 are shown, any may be omitted and/or other fixtures or plumbing fixtures may be included. Any number of sinks 104, toilets 106, urinals 108, and/or other fixtures or plumbing fixtures may be provided in the connected system 100. Each of the sanitaryware 105 may include a flush valve assembly 110. The flush valve assembly 110 may be the same or different among the sanitaryware 105.

The connected system 100 may include a computing device(s) 112, such as a personal desktop computer 114, a laptop 116, a mobile device 118, or combinations thereof. Any of the devices (e.g., the faucets 102, sinks 104, sanitaryware 105, flush valve assemblies 110, etc.) may communicate with a gateway 120 which may communicate with the cloud or server 122. The computing device 112 may communicate with the cloud or server 122. In this manner, the computing device 112 and devices may communicate with each other. Alternatively or additionally, the computing device 112 may communicate directly with the devices. Communication between the sanitaryware 105, flush valve assemblies 110, faucets 102, and/or sinks 104 and the gateway 120 and/or between the gateway 120 and the server 122 may be Bluetooth® (e.g. short-range wireless communication), RF (Radio Frequency), WiFi (e.g., wireless local area network), Infrared, or other wireless or wired communication types. Communication between the computing device(s) 112 and the server 122 may likewise be wired or wireless. The connected system 100 may include systems such as a faucet performance system (FPS), a toilet performance system (TPS), and/or a urinal performance system (UPS), or combinations thereof. The FPS, TPS, and/or UPS may be standalone systems and/or may be a part of the overall connected system 100. The FPS, TPS, and/or UPS may communicate with the devices, with the connected system, with the computing devices, with the server, gateway, etc., or combinations thereof, in manners described herein.

The connected system 100 may allow a user to monitor the status of the various devices. The various devices may be located in a single room, in multiple rooms, in a building, in a commercial building, warehouse, or other facility, in a residential home, etc. For example, the connected system 100 may be allowed to monitor the volume of water used, the number of flushes performed, the clog status, etc. of the devices. Many exemplary uses of the connected system 100 are described herein (e.g., the Event cases describe herein).

In an exemplary embodiment of the connected system 100 shown in FIG. 2, the user may monitor the status of the devices on the computing device 112. For example, sensors on the sanitaryware 105 may communicate to the computing device 112 the number of flushes performed by the respective sanitaryware. In the example depicted in FIG. 2, one toilet has performed 33 flushes, one urinal has performed 83 flushes, one urinal has performed 94 flushes, one sink has used 110 gallons of water and one sink has used 167 gallons of water. This information may be depicted in pictorial, graphical, or textual form on the computing device 112. It may be accessible from one, multiple, or all of the described computing devices 112. The computing devices 112 may have an application or website for monitoring and controlling the connected system 100, as is described in more detail herein.

In an exemplary embodiment of the connected system 100, the one or more sensors may detect one or more parameters of the sanitaryware device 105 (or other component of the connected system 100). For example, an ultrasonic sensor located on an exterior ceramic surface of the sanitaryware device 105 may detect a status of the bowl (e.g., contents within, clog, etc.) and communicate that information to the connected system 100 (e.g., to the computing device 112) in any of the manners described herein.

In an exemplary embodiment the connected system 100 may monitor information from both a sensor on the bowl of the sanitaryware fixture 105 (e.g., an ultrasonic sensor on the outside of the bowl) and an infrared (IR) sensor on the flush valve assembly 110. The connected system 100 may, for example, detect solids (e.g., solid waste, toilet paper, other solids within the toilet) in the bowl of the sanitaryware device 105 with the ultrasonic sensor and detect long usage time by the user with the IR sensor. The connected system 100 may use both of these parameters to determine a high flush (e.g., a high volume flush) is needed and instruct the flush valve assembly 110 to perform the required flush. The connected system 100 may, for example, detect no solids in the bowl of the sanitaryware fixture 105 with the ultrasonic sensor and detect short usage time by the user with the IR sensor. The connected system 100 may use both of these parameters to determine a low flush (e.g., a low volume flush) is needed and instruct the flush valve assembly 110 to perform the required flush. In this manner, the connected system 100 may consider one or more parameters from one or more sensors on each of the respective sanitaryware fixtures to determine the appropriate action. Employing more than one type of sensor (e.g., a bowl sensor and a user status sensor) may improve the accuracy of the action to be taken and/or may validate the appropriate action is being taken.

The flush valve assembly 110 may include a water inlet and outlet as is known in the art. The flush valve assembly 110 may include an angle stop. The flush valve assembly 110 may include an infrared (IR) window, a status LED and an electric override button. The flush valve assembly 110 may include a controller. The controller may control operation of the flush valve or components of the flush valve assembly 110. The controller may be battery powered, AC powered, or a combination thereof. The controller may include an antenna to permit communication with the connected system 100. The controller may be coupled to one or more sensors, the one or more sensors may be located on the flush valve, located on, in or around the ceramic surfaces of the sanitaryware, located within the room or building having the sanitaryware, or combinations thereof. In this manner, the controller may collect, analyze, record, transmit, or combinations thereof, data sensed by the sensor(s).

The controller may control the flush valve based on one or more sensed items from the sensor(s). The controller may communicate with a server 122 and/or a computing device 112. The controller may communicate the sensed items from the sensor(s) to the server 122 and/or computing device 112. The server 122 and/or computing device 112 may analyze, interpret, compare, or otherwise monitor the sensed items. The server 122 and/or computing device 112 may transmit instructions to the controller. The controller may initiate an action in the sanitaryware (e.g., a function of the flush valve) in response to the instructions to the controller. Other actions may be initiated instead of or in addition to instructions to the flush valve assembly 110. Such actions may be, for example, alerting a person such as a technician. The controller may be coupled to the one or more sensors wirelessly and/or with an electric cable.

The housing of the flush valve assembly may include a cutout or slot in which the IR window is located. The IR window may include the status LED and/or the electric override button. The IR window may operate in known manner to detect the presence and/or absence of a user to initiate a flush of the sanitaryware 105. The status LED may indicate a status of the flush valve assembly 110 and/or the sanitaryware 105 (e.g., operational, do not use, out of service, flushing, user detecting, etc.). The electric override button may be employed to override a function of the toilet (e.g., to stop a flush). The antenna window may facilitate communications between (to and from) the controller, the server 122, the computing device 112, and/or other devices. The flush valve assembly 110 may include an antenna (e.g., a Bluetooth antenna) to communicate with other components of the connected system 100.

Figure 3A:
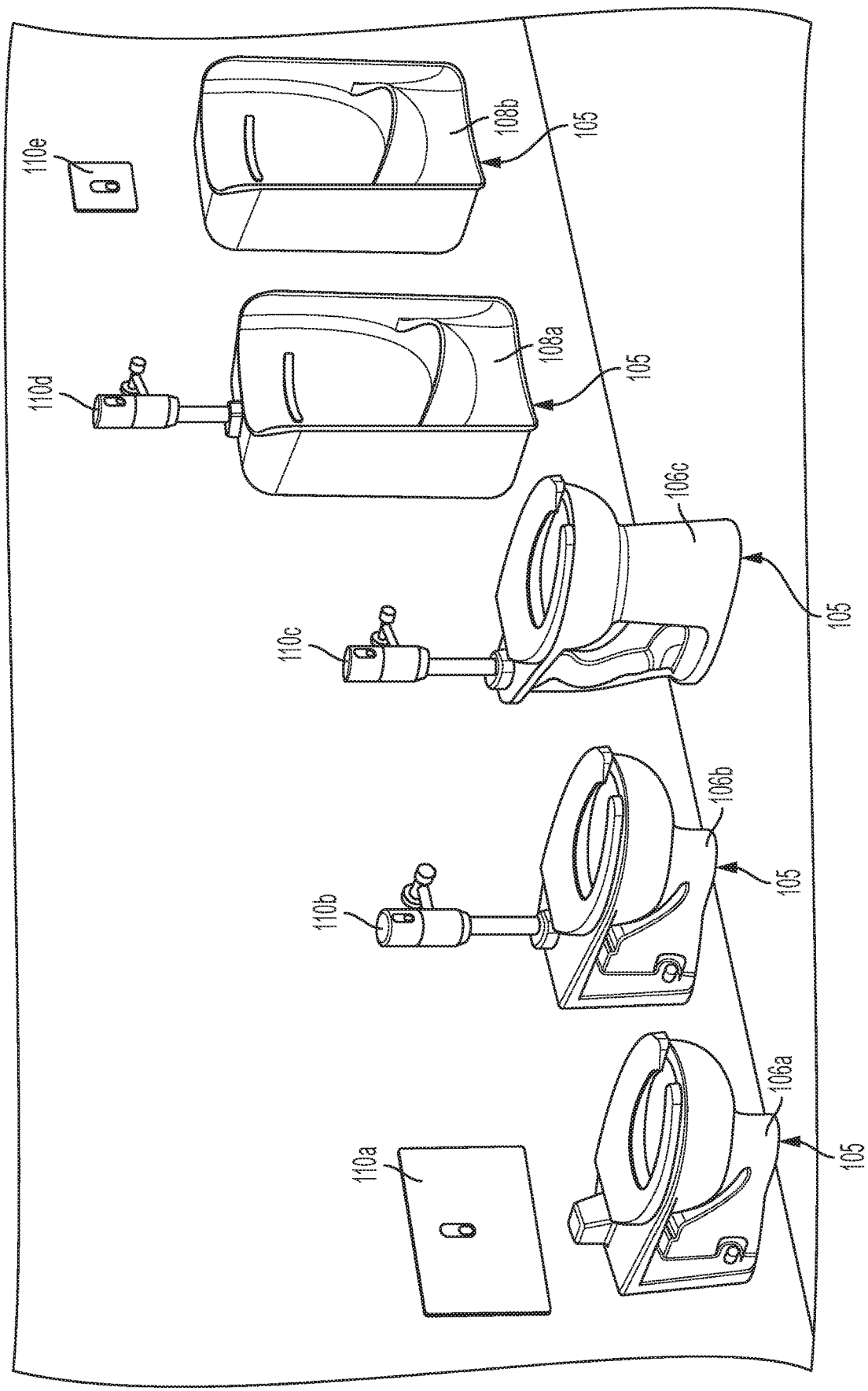
FIGS. 3A and 3B show exemplary arrangements of exemplary sanitaryware for use with a connected system.
Figure 3B:
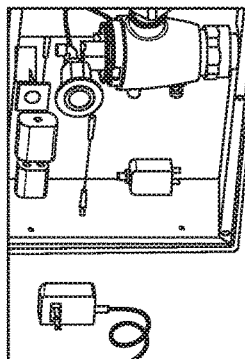

Referring to FIGS. 3A and 3B, the sanitaryware 105 may be arranged in any number of manners. In an example, the sanitaryware 105 may be a wall-hung toilet 106a with a concealed flush valve assembly 110a. The concealed flush valve assembly 110a may be located or concealed behind a wall such that a plate may conceal the flush valve and may include a cutout or slot in which the IR window is located. The IR window may include the status LED and/or the electric override button. The IR window may operate in known manner to detect the presence and/or absence of a user to initiate a flush of the sanitaryware 105. The status LED may indicate a status of the flush valve assembly 110 and/or the sanitaryware 105 (e.g., operational, do not use, out of service, flushing, user detecting, etc.). The electric override button may be employed to override a function of the toilet (e.g., to stop a flush). A plate may cover the wall around the flush valve assembly 110a to permit access to the flush valve assembly 110a for repair, maintenance, etc. The concealed flush valve assembly 110a may contain an antenna window. The antenna window may facilitate communications between (to and from) the controller, the server 122, the computing device 112, and/or other devices. The flush valve assembly 110a may include an antenna (e.g., a Bluetooth antenna) to communicate with other components of the connected system 100. In an example, the sanitaryware 105 may be a wall-hung toilet 106b with an exposed flush valve assembly 110b. In an example, the sanitaryware 105 may be a floor mounted toilet 106c with an exposed flush valve assembly 110c. Although not depicted, the floor mounted toilet 106c may have a concealed flush valve assembly. In an example, the sanitaryware 105 may be a urinal 108a with an exposed flush valve assembly 110d. In an example, the sanitaryware 105 may be a urinal 108b with a concealed flush valve assembly 110e. One or more of the examples, and/or one or more of the individual components of the examples, may be combined in one sanitaryware 105 and/or within a connected system 100. One or more of any combination of sanitaryware 105 may be combined to form the connected system 100.

Referring to FIGS. 4-7, various views of a user interface are shown. The user interface may be employed on any one or more of the computing devices 112. The user interface may be a web based application and/or a local application installed on the computing device 112. The user interface may allow for monitoring and/or control of the connected system 100. The user interface of FIGS. 4-7 is exemplary, modifications may be employed. Alternative user interfaces may be employed.

Figure 4A:
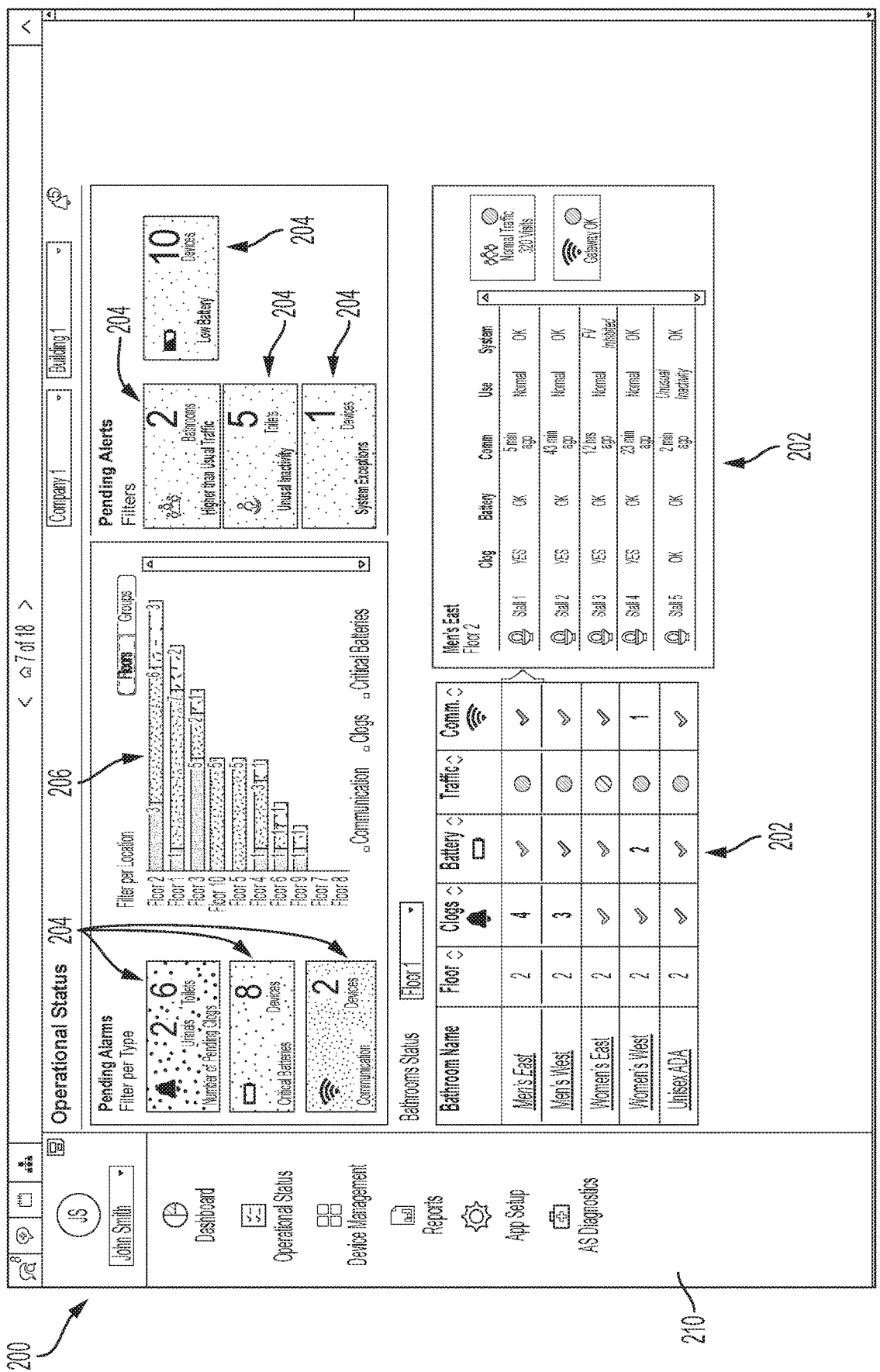
Figure 4B:
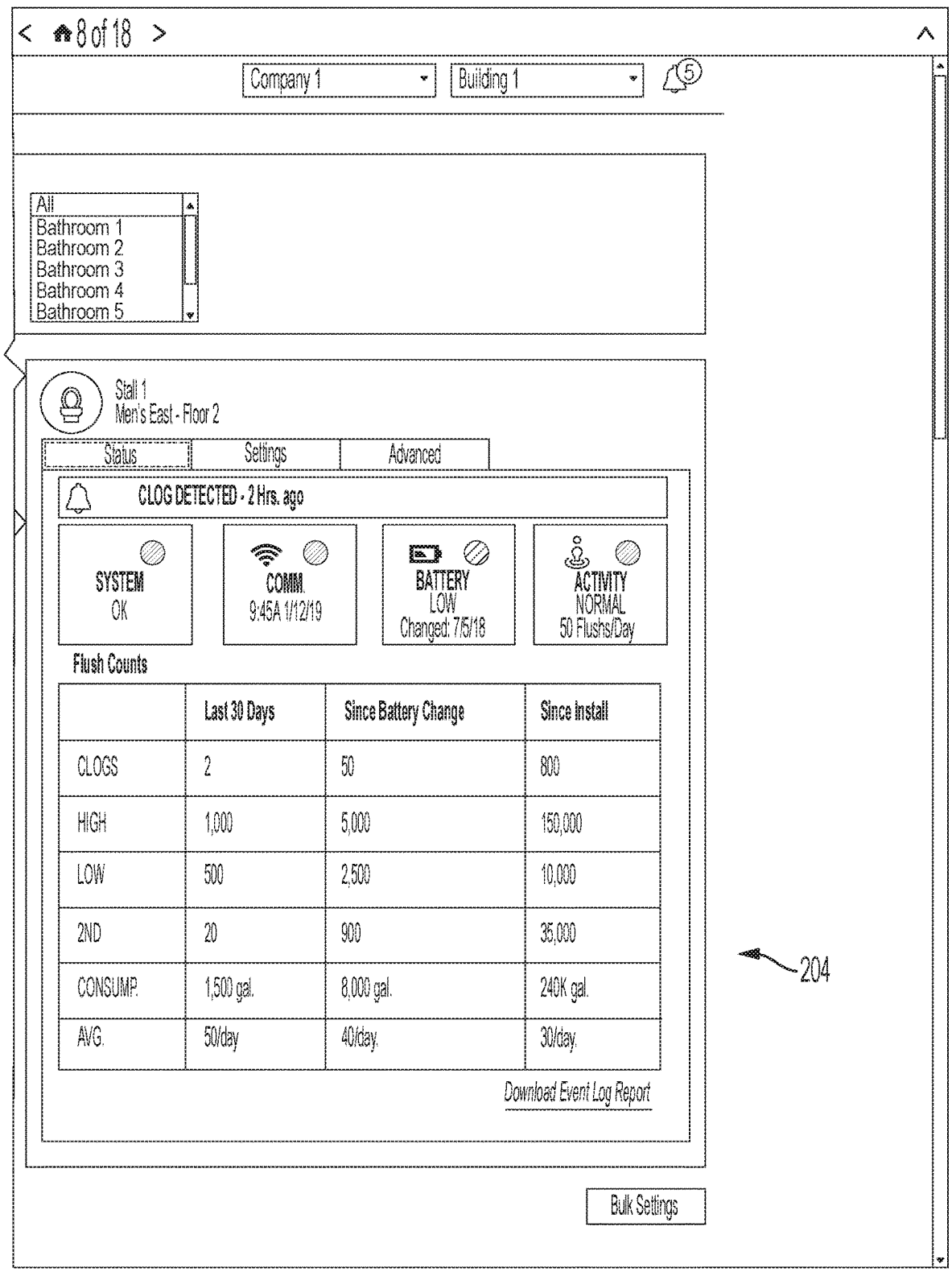

FIGS. 4A and 4B show a wire frame of a web based dashboard 200. That is, FIGS. 4A and 4B show the development side or structural level of the dashboard 200. The dashboard 200 may include visual modules 202 associated with the connected system 100. In the exemplary dashboard 200 depicted in FIGS. 4A and 4B, the connected system 100 is in a building having multiple gender specific bathrooms. Thus, the visual modules 202 include a "Men's East" module, a "Men's West" module, "Women's East" module, and "Women's West" module. Thus, a user may monitor and/or control the connected devices within each of those locations. The dashboard 200 may also include alerts or alarms 204. Such alerts or alarms 204 may be user or system specific, may be automatically generated by the connected system 100, may generated by the user, or combinations thereof. The alerts or alarms 204 may reflect a need for a technician at a toilet, batteries that need to be changed, bathrooms experiencing high or low traffic (e.g., based on some predetermined threshold), number of pending clogs (e.g., estimated based on usage or status of the sanitaryware), communicated messages from the connected system 100, lack of toilet paper and/or paper towel in a device, etc. These are merely examples of the alerts or alarms 204 that may be presented and the list is not exhaustive. The alerts or alarms 204 may be any number of items pertaining to the connected system 100. The dashboard 200 may also indicate a notification module 206. The notification module 206 may organize the alarms, communications, and/or status of the connected system 100 by location. For example, by floor, by wing, by building, or combinations thereof. The dashboard 200 may include a navigation panel 210. The navigation panel 210 may allow a user to navigate between any number of web pages to monitor and/or control the connected system 100. For example, the top window of FIG. 5 may depict a "home page" of the dashboard 200. The user may navigate to the lower window which may be an "operational status page" of the dashboard 200. Additional pages may be included. The operational status page may show the status of an individual sanitaryware fixture and/or a room, floor, wing, or building of sanitaryware or other components of the connected system 100.

Figure 4C:
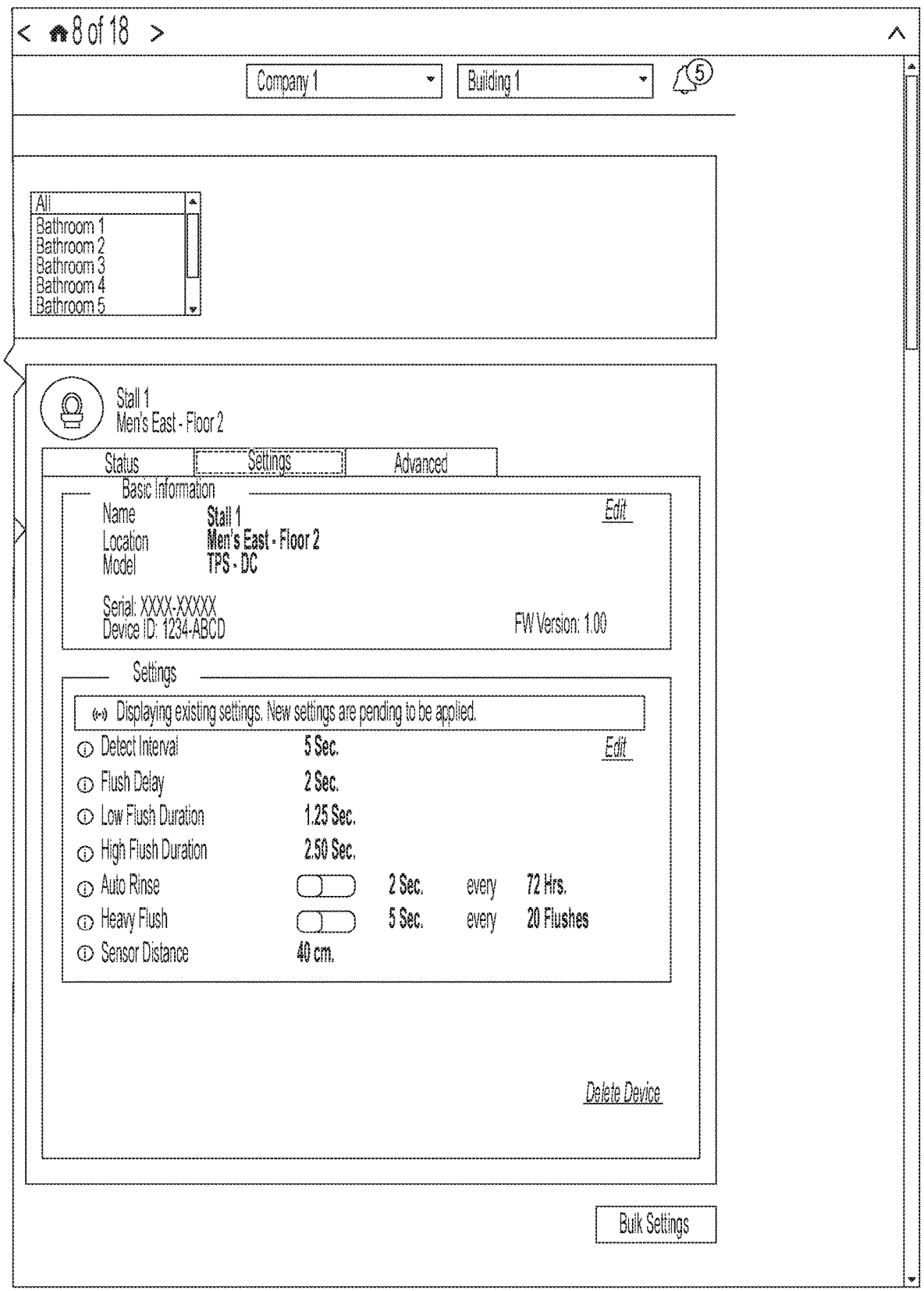

Referring to FIGS. 4A and 4B, the dashboard and system and thus the monitoring and control may be setup and customized for a particular building, system of buildings, rooms, floors, bathrooms, wings etc. Thus, the modules shown in FIGS. 4A and 4B may be customized to the particular connected system being monitored. Referring to FIG. 4C, the dashboard may allow for filtering of the device type (e.g., gateway, toilets, urinals, faucets, etc.), the bathroom type (e.g. men, women, unisex, etc.), the location (e.g., floor, wing, bathroom, wing), or combinations thereof. The dashboard may allow for selection of a particular stall on a particular floor in a particular bathroom to review and analyze the data associated with the selected stall (or other selected device). Each device (e.g., each stall, toilet, flush valve, etc.) may have settings based on a preselected or predetermined profile, may consider historical data of the particular device or building, etc. The settings may include the time of the detection interval, the delay in flush, the duration of a low flush, the duration of a high flush, the ability to have auto rinse on or off and the frequency and duration of the auto rinse, the ability to have a heavy flush on or off and the frequency and duration of the heavy flush, the detection distance of the sensor, etc.

Figure 4D:
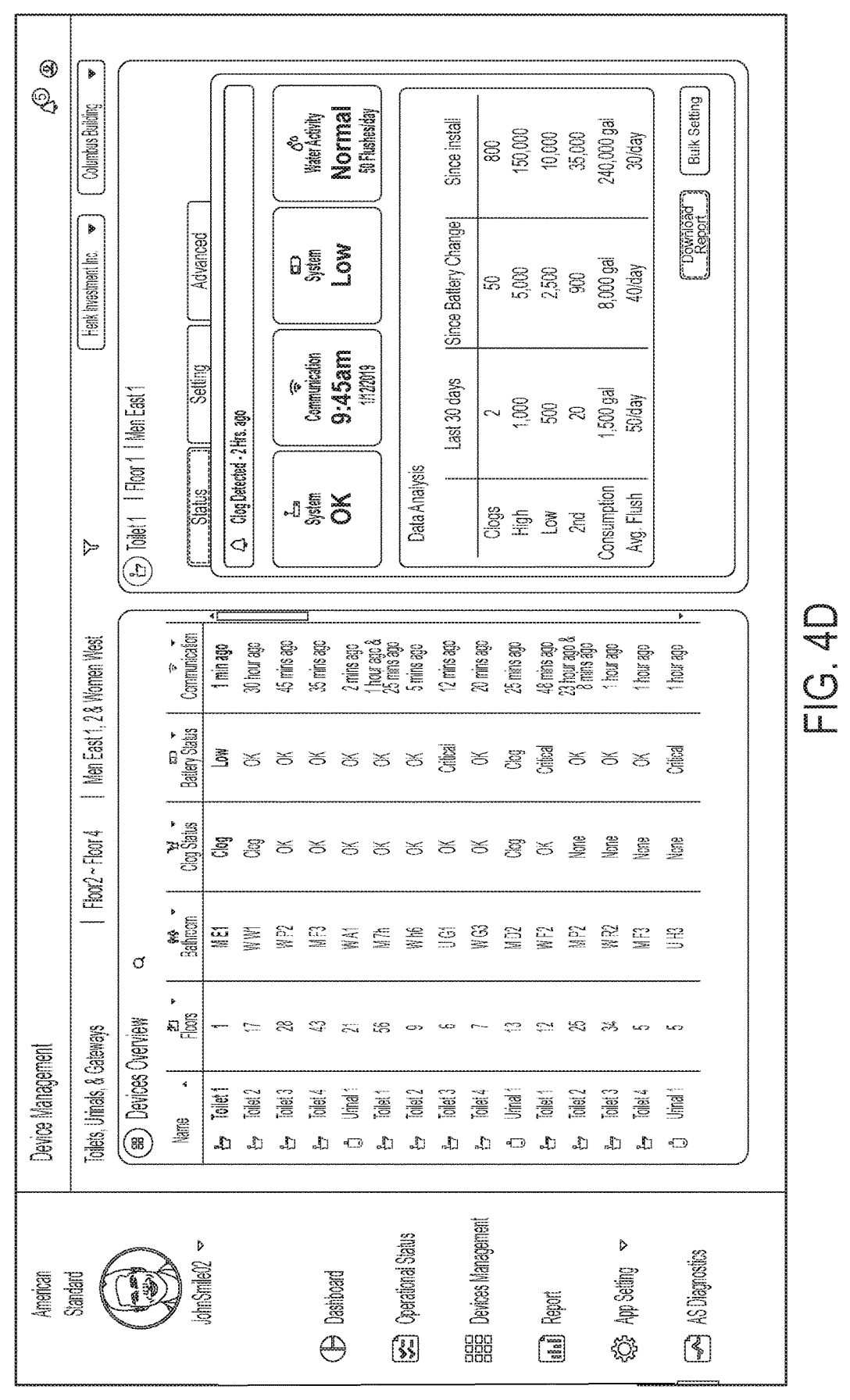

As shown in FIG. 4D, the devices may be filtered and/or categorized based one or more parameters (e.g., floor, bathroom, clog status, battery status, communication stains, etc.). Once filtered, a particular device (e.g., a particular toilet) may be selected from the list to view a more detailed report on the toilet. For example, the report may show the system status, communication status, last date and time of communication, battery status, water activity, number of flushes per day, clogs, high flushes, low flushes, second flushes, water consumption, and average flushes. This information may be viewed over any time period. For example, the information may be viewed over the last 30 days, since the battery was last changed, since installation, daily, in the afternoon, etc.

FIGS. 5A-5J depict the user interface of the dashboard 200. That is, FIGS. 5A-5J show the user side of the dashboard 200. The dashboard 200 may be employed on a computing device 112, such as a desktop computer 114 or laptop computer 116. Thus, icons or modules pertaining to the aforementioned sections may be visualized by the user on the dashboard 200 such as shown, by way of example only, in FIGS. 5A-5J. As shown in FIGS. 5A-5J, the dashboard 200 may include status, alarms, alerts, communications, or combinations thereof related to the various components of the connected system 100. For example, the traffic, clogs, battery status, communication status, number of flushes, number of high flushes, water consumption, clog status, and/or combinations of this or other illumination may be monitored and controlled with the dashboard 200. In FIGS. 5D, 5G, 5H, 5I, and 5J, the information may be aggregated or collected to provide an overall daily, monthly, or yearly status of a particular sanitaryware, other components of the connected system 100, and/or the entire connected system 100. As shown and has been described, the information may be viewed in table form, module form pictorial form. The information may be as shown in the figures and as described below.

Figure 5A:
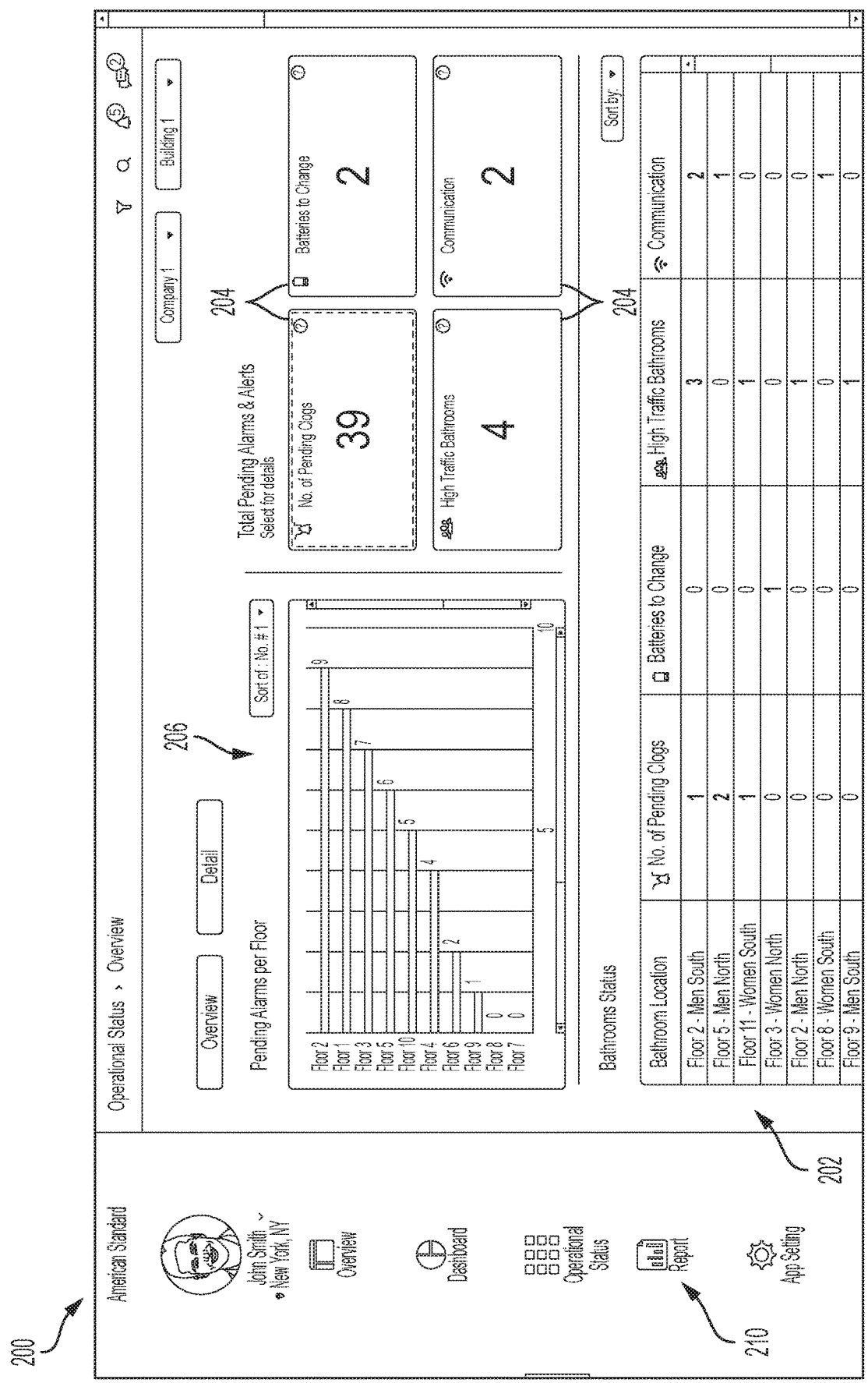
Figure 5C:
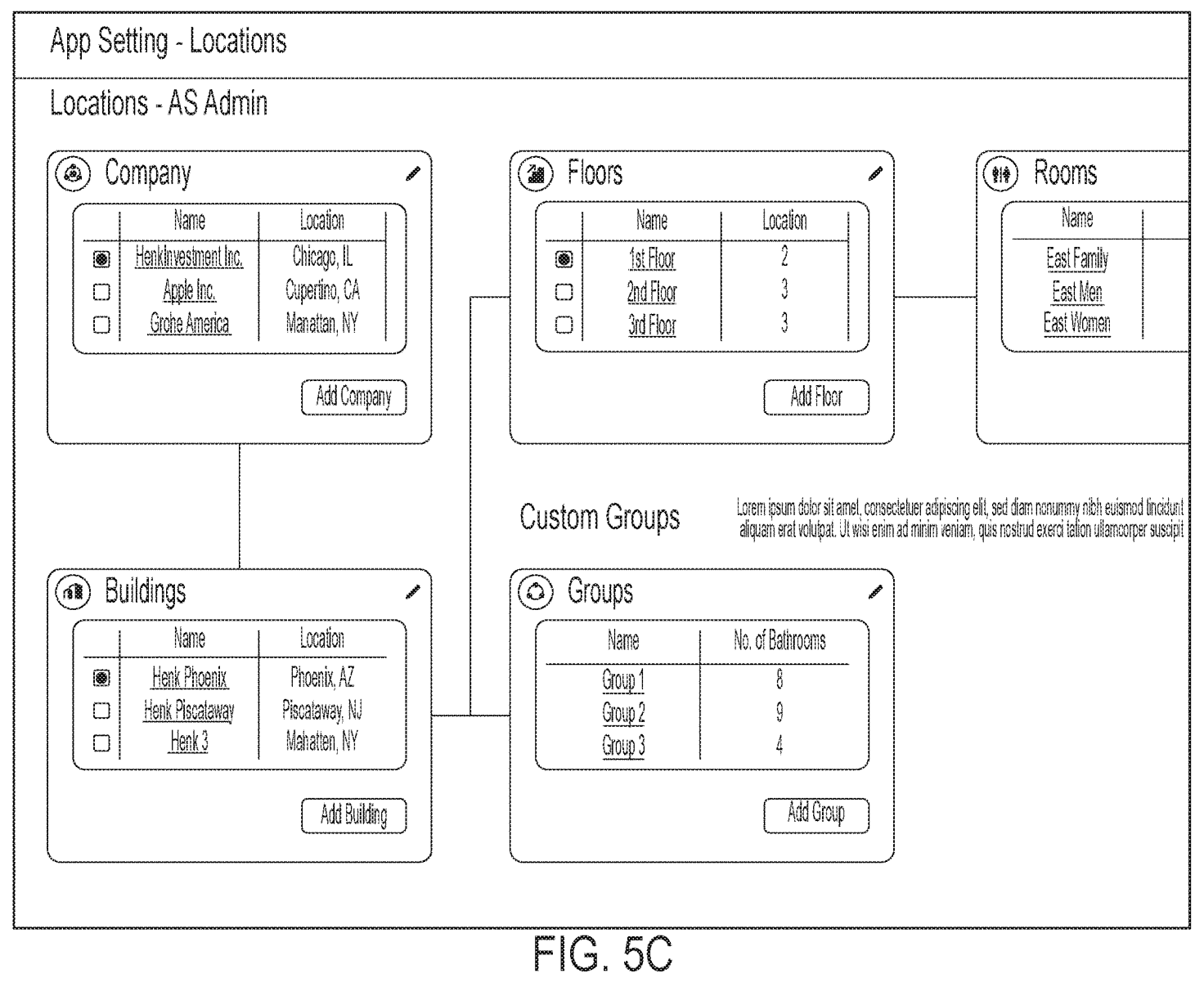
Figure 5D:
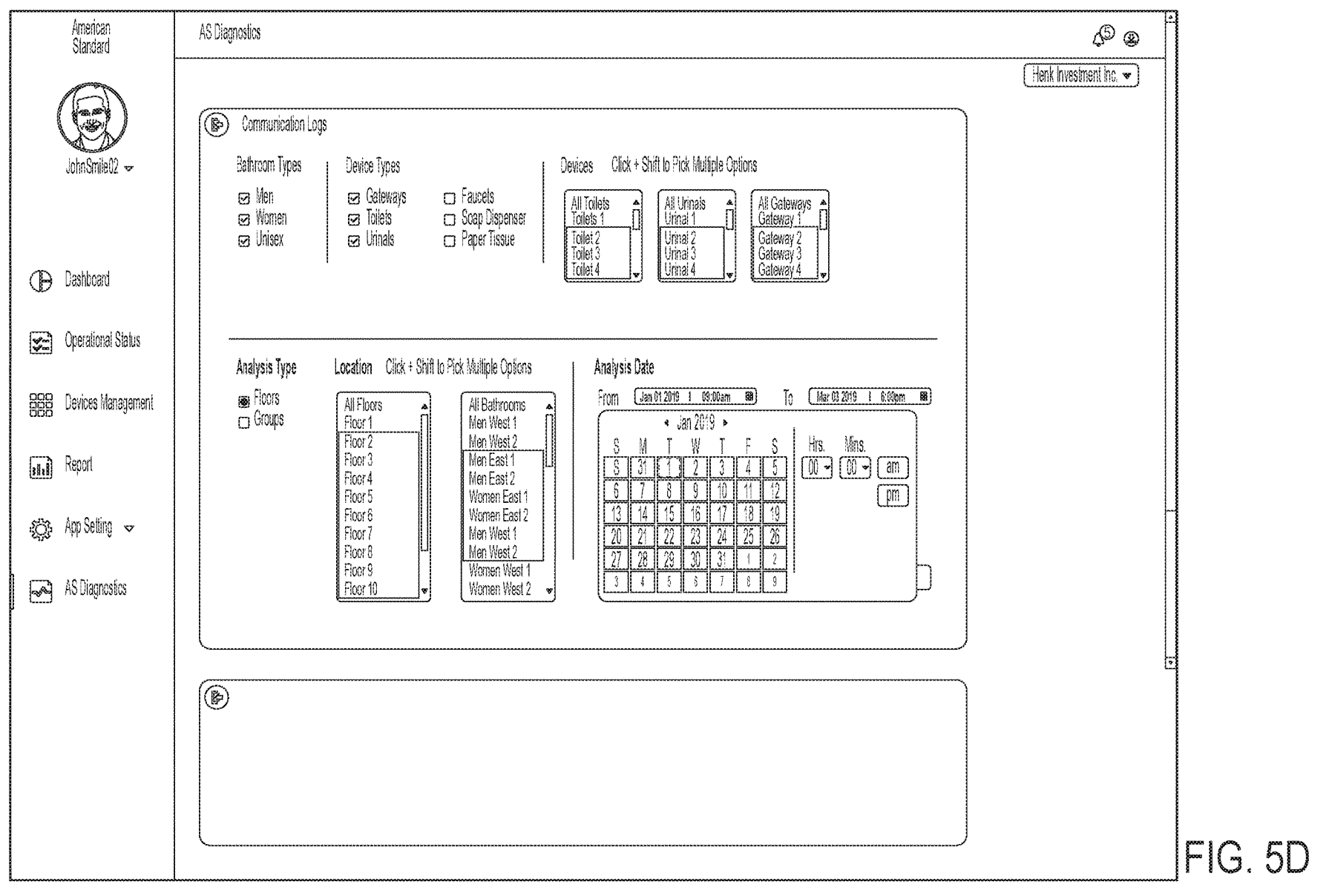
Figure 5E:
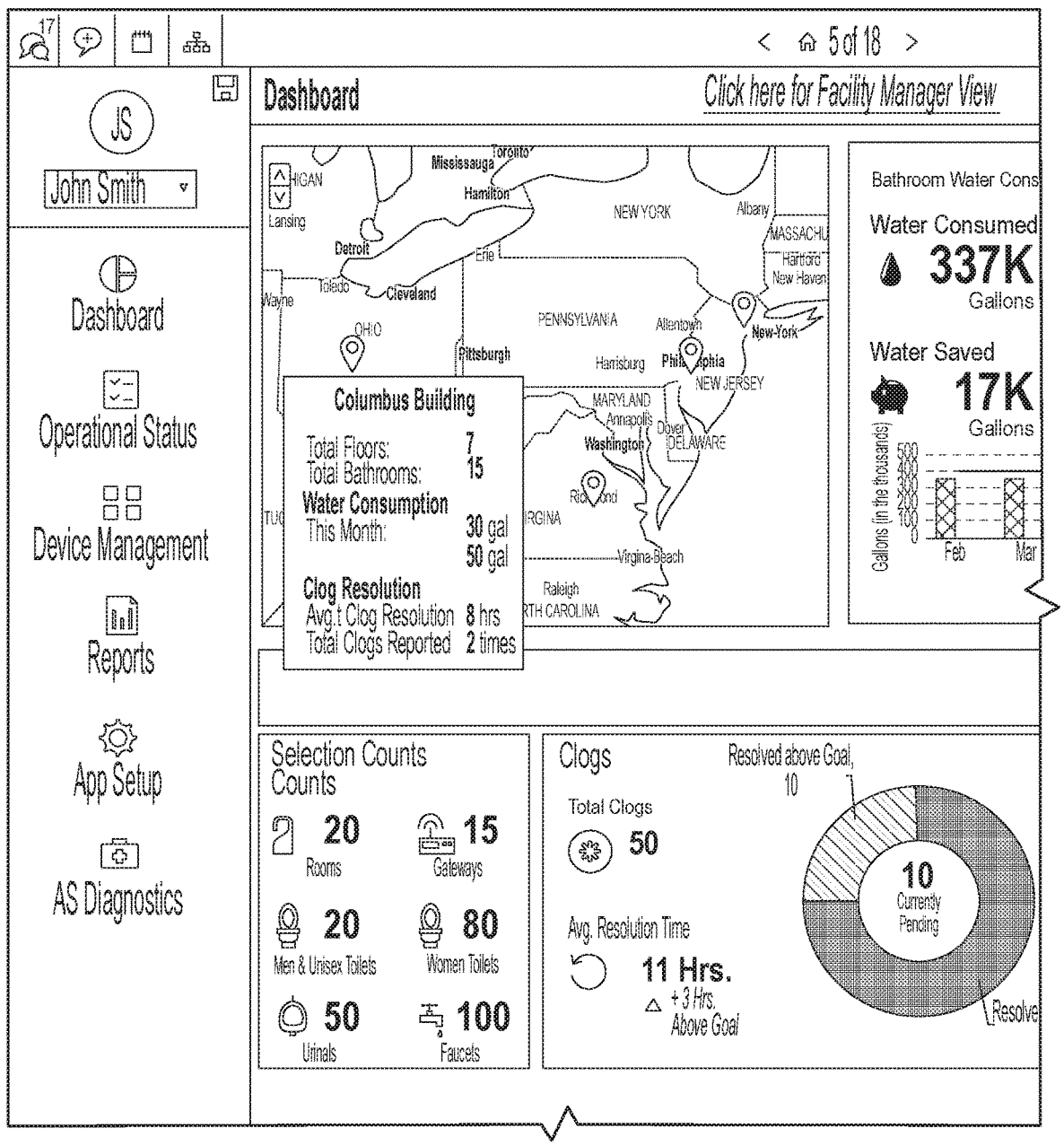
Figure 5E:
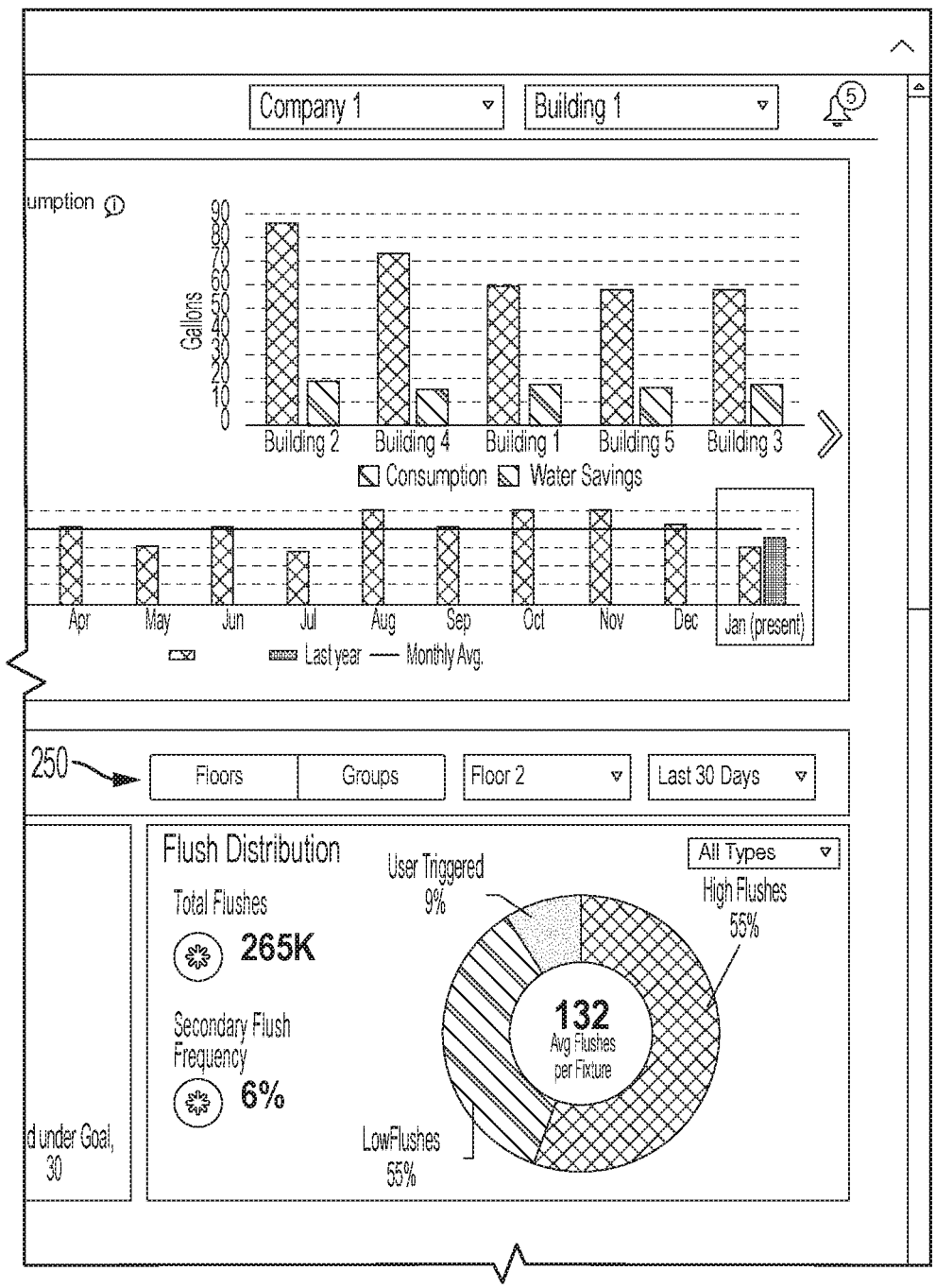
Figure 5E:
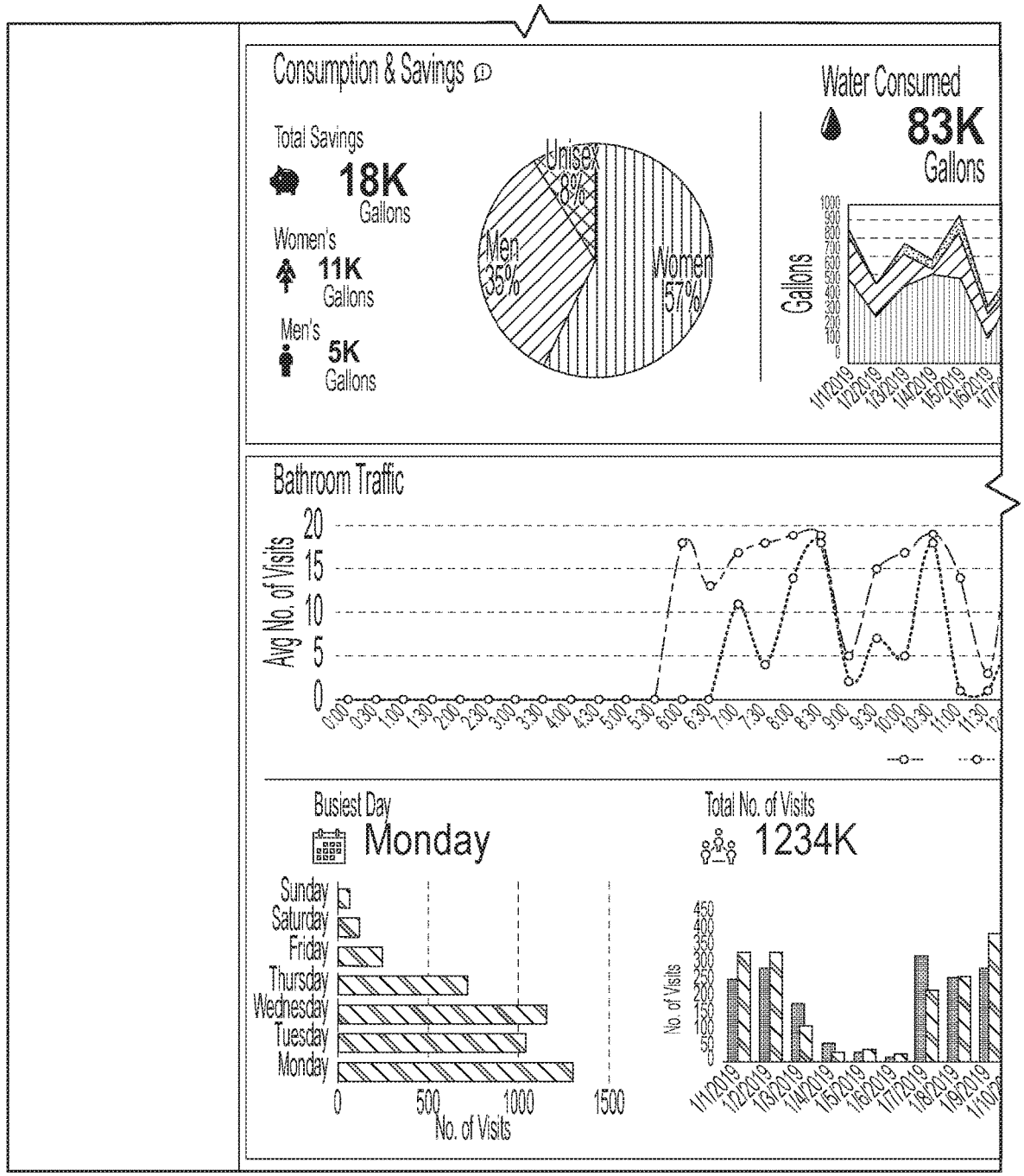
Figure 5E:
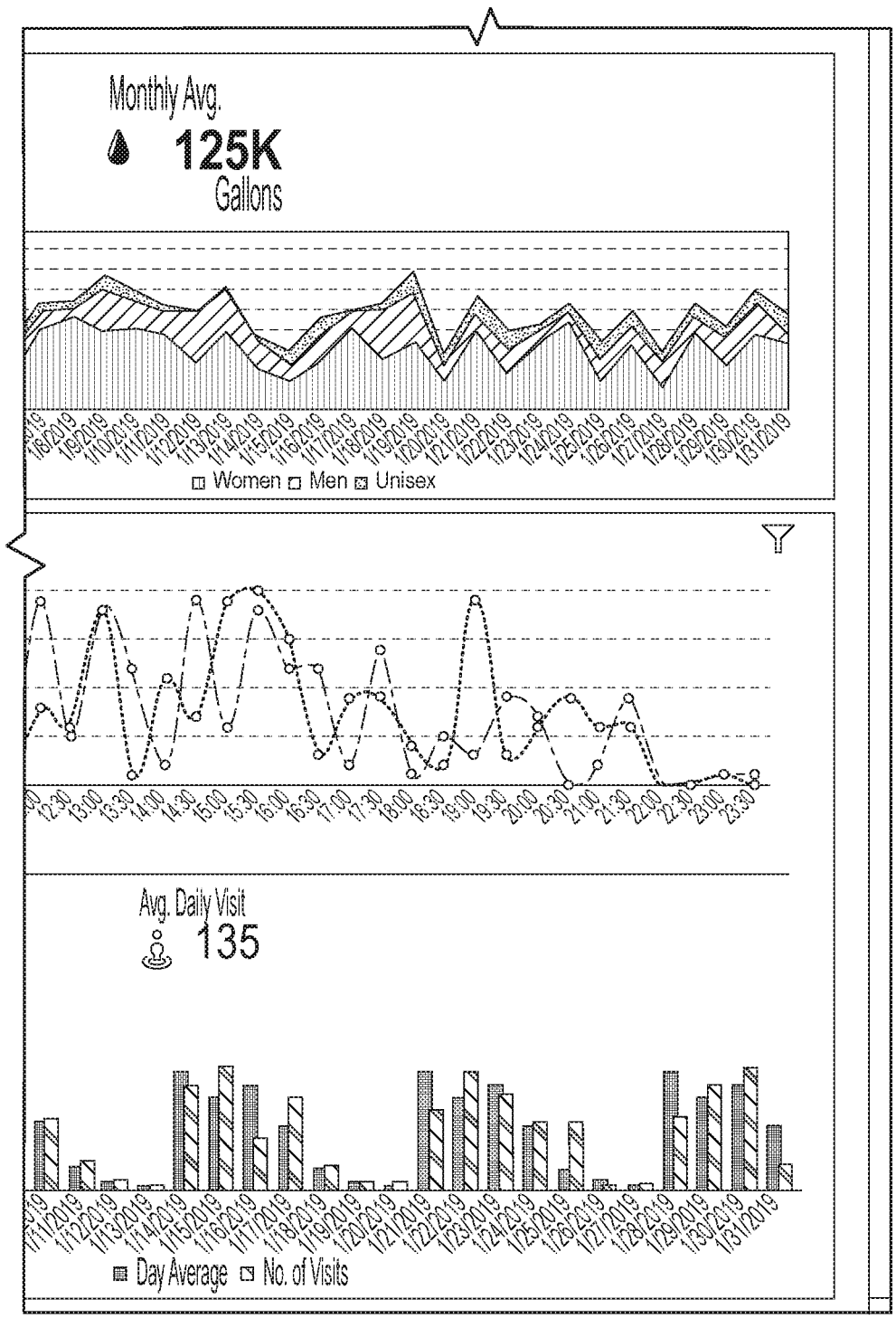
Figure 5F:
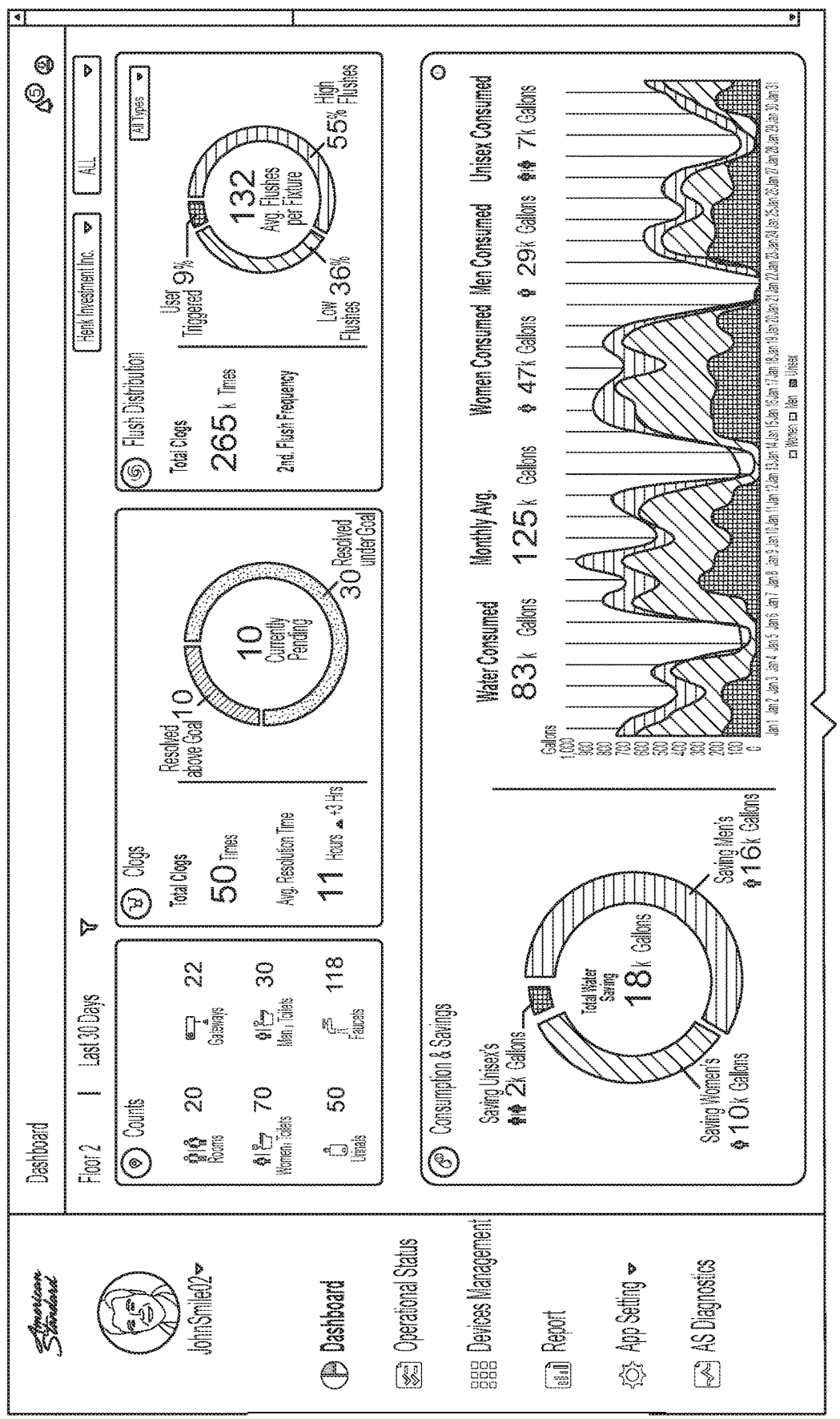
Figure 5F:
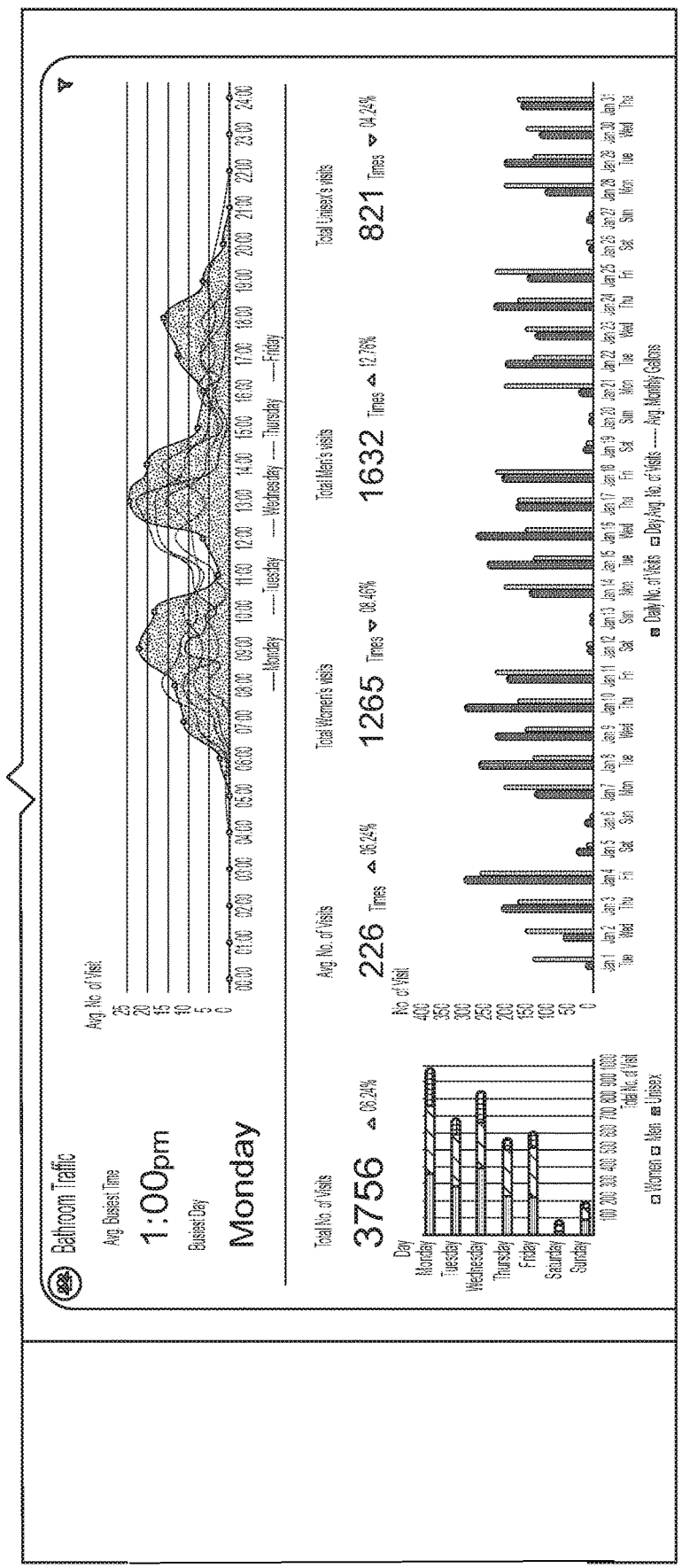
Figure 5H:
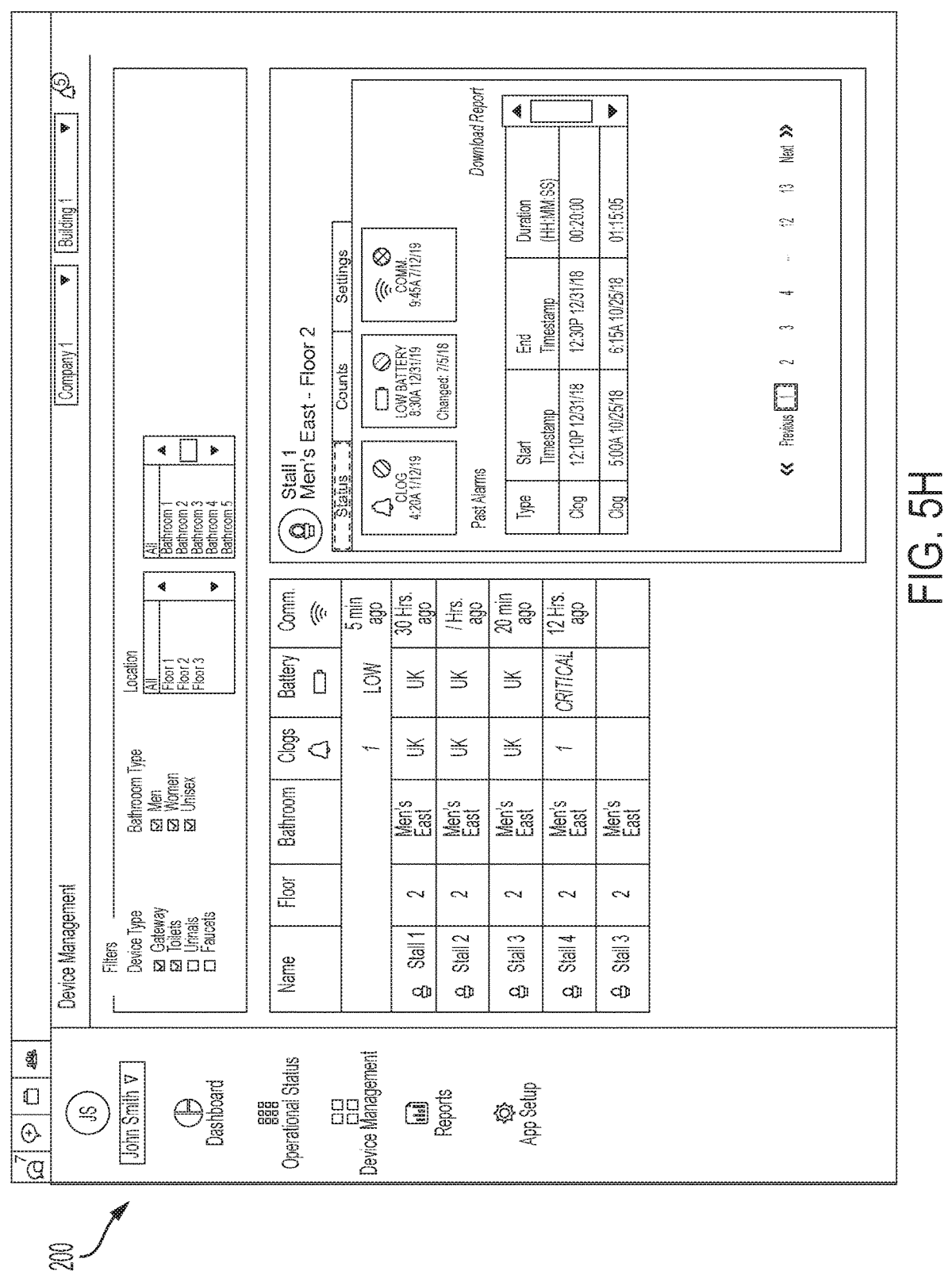
Figure 5J:
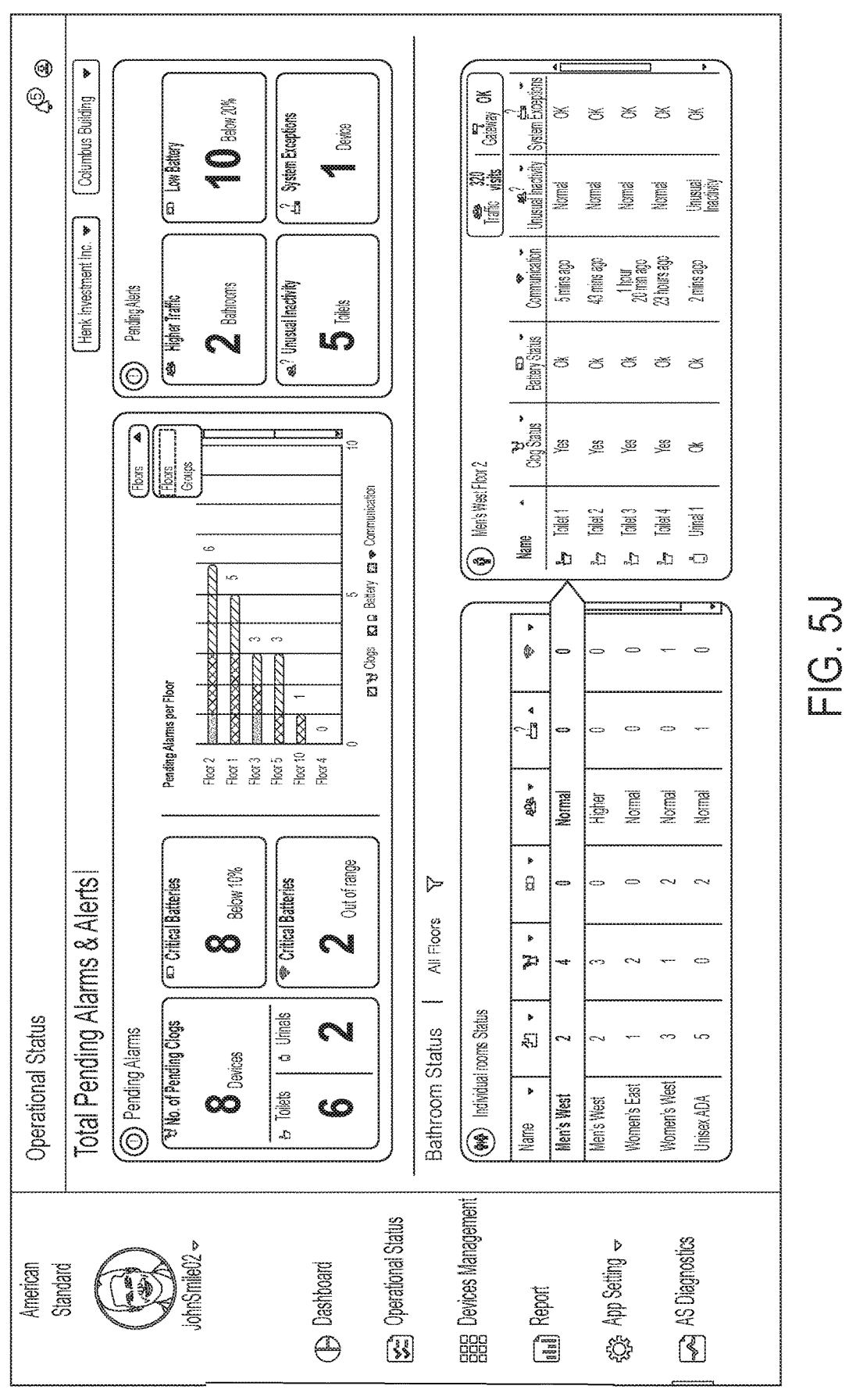

Referring to FIG. 5C, an administrator of the system may access various building systems or company's systems. Each system may have buildings, floors, groups, wings, and/or rooms. Each of the groups (e.g., buildings, floors, groups, rooms, wings, etc.) may be added to, edited, or altered based on the particulars of the company. FIGS. 5E and 5F show an exemplary generally pictorial view of the data that may be monitored, analyzed, and controlled in the connected system. The dashboard may include filters 250 to allow for the visualization of any desired subset of devices and parameters based on the particular user, building, company, etc. The view of FIGS. 5E and 5F may show any of the data described herein. This may include, for example, water consumption, water savings, total clogs, average resolution time, secondary flush frequency, total flushes, total water savings, total water savings per women's bathroom, men's bathroom, or unisex bathroom, monthly average of water consumed, bathroom traffic, busiest and least busiest days of traffic/use of the bathroom, total number of visits, total number of visits per women's bathroom, men's bathroom, or unisex bathroom, average daily visits etc. This data may be monitored, downloaded, visualized, analyzed, and/or controlled based on any number parameters. That is, for example, but not limited to, it may be viewed per toilet, per bathroom, per building, etc.

Figure 6A:
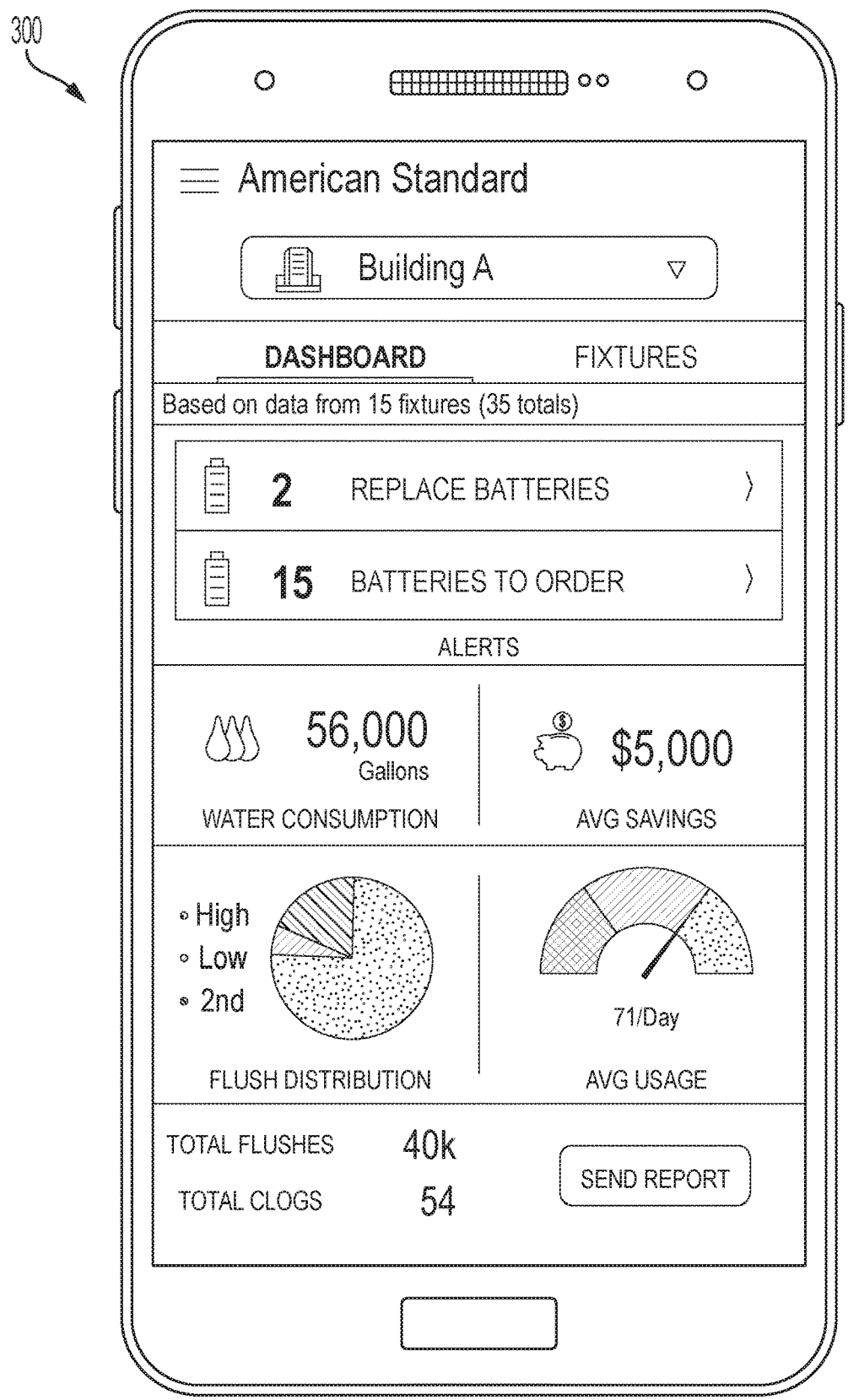
FIGS. 6A-6B show a user side of an exemplary user dashboard.
Figure 6A:
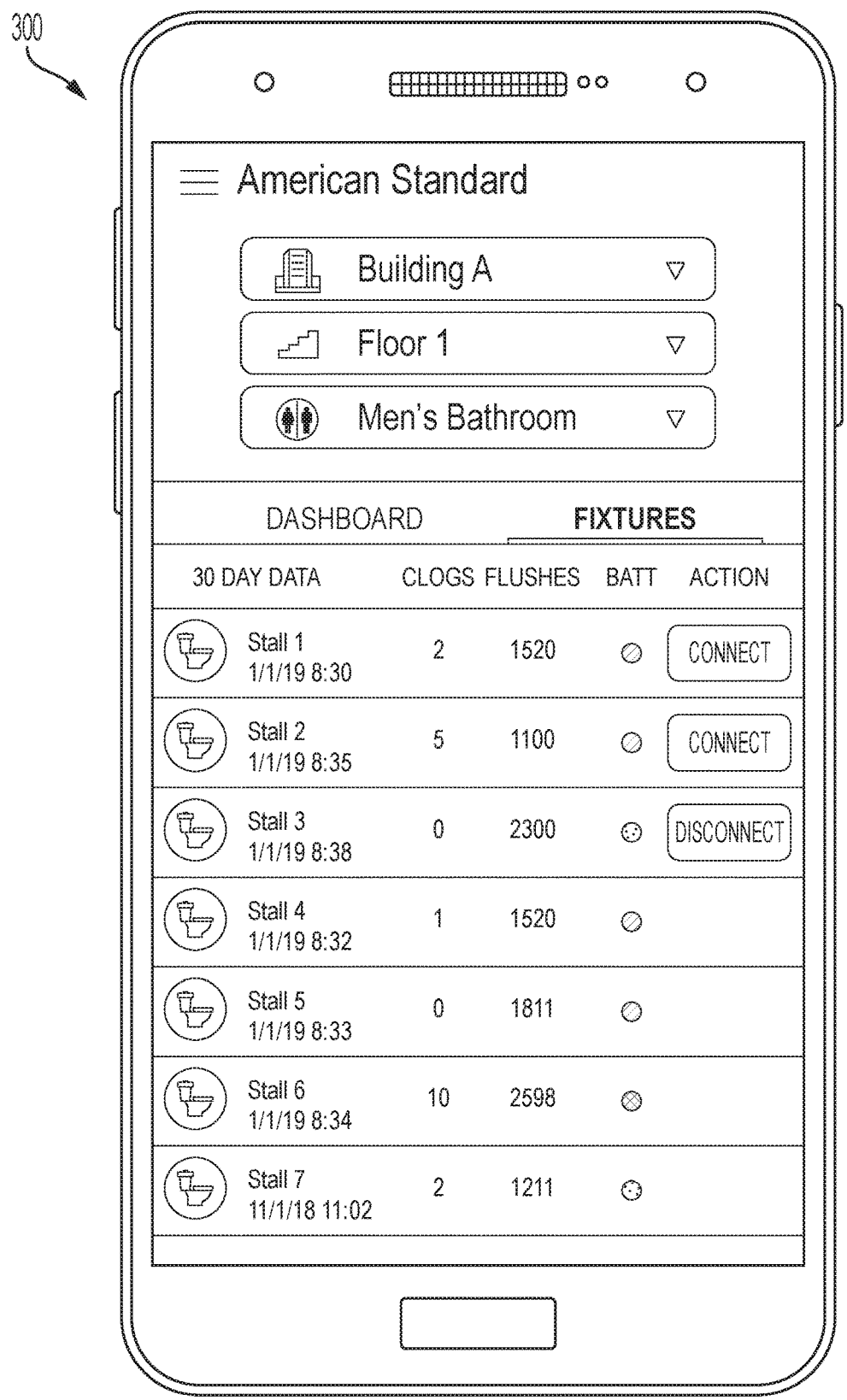
Figure 6B:
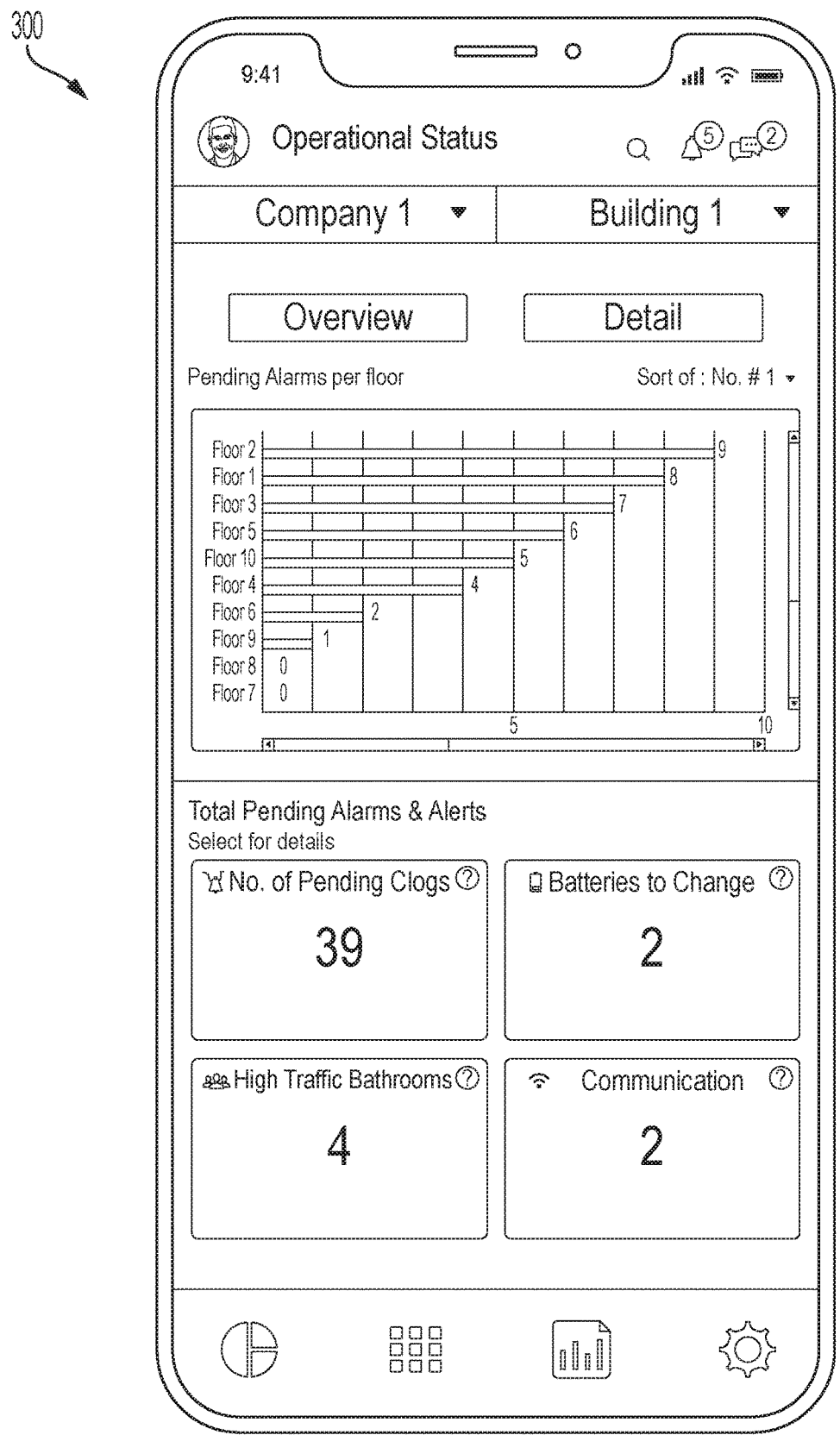
Figure 6B:
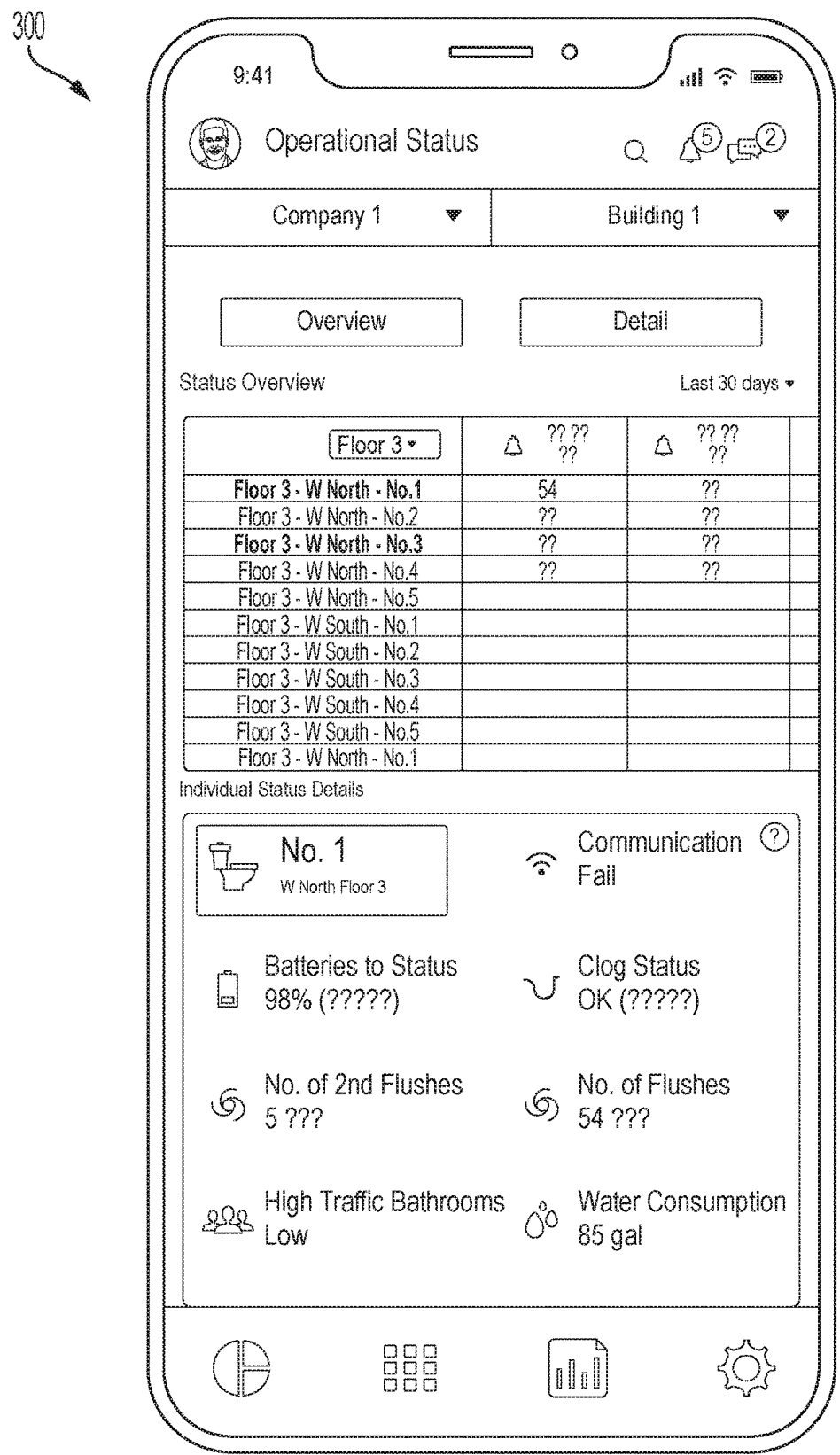

FIGS. 6A and 6B depict a dashboard 300 similar to the dashboard 200. The dashboard 300 may be employed on a mobile device, such as, for example, a mobile telephone, a tablet, or other handheld mobile device. The dashboard 300 may include the same or similar information as described with respect to FIGS. 4 and 5. The dashboards 200 and 300 may be employed as a sanitaryware/gateway configuration tool (e.g., a gateway as a master or as a slave in a mesh network where no cellular connection is available). The dashboards 200 and 300 may allow for remote control of the flush valve assembly. The dashboards 200 and 300 may allow for remote control to the flush valve assembly 110 for IR proximity sensor parameters and/or flush valve parameters. The dashboards 200 and 300 may be employed as an analytics tool to be used on a standalone system. Thus, the dashboards 200 and 300 may allow for analyzing of the usage of a particular sanitaryware or component of the connected system 100 and/or of the entire connected system 100.

Figure 7A:
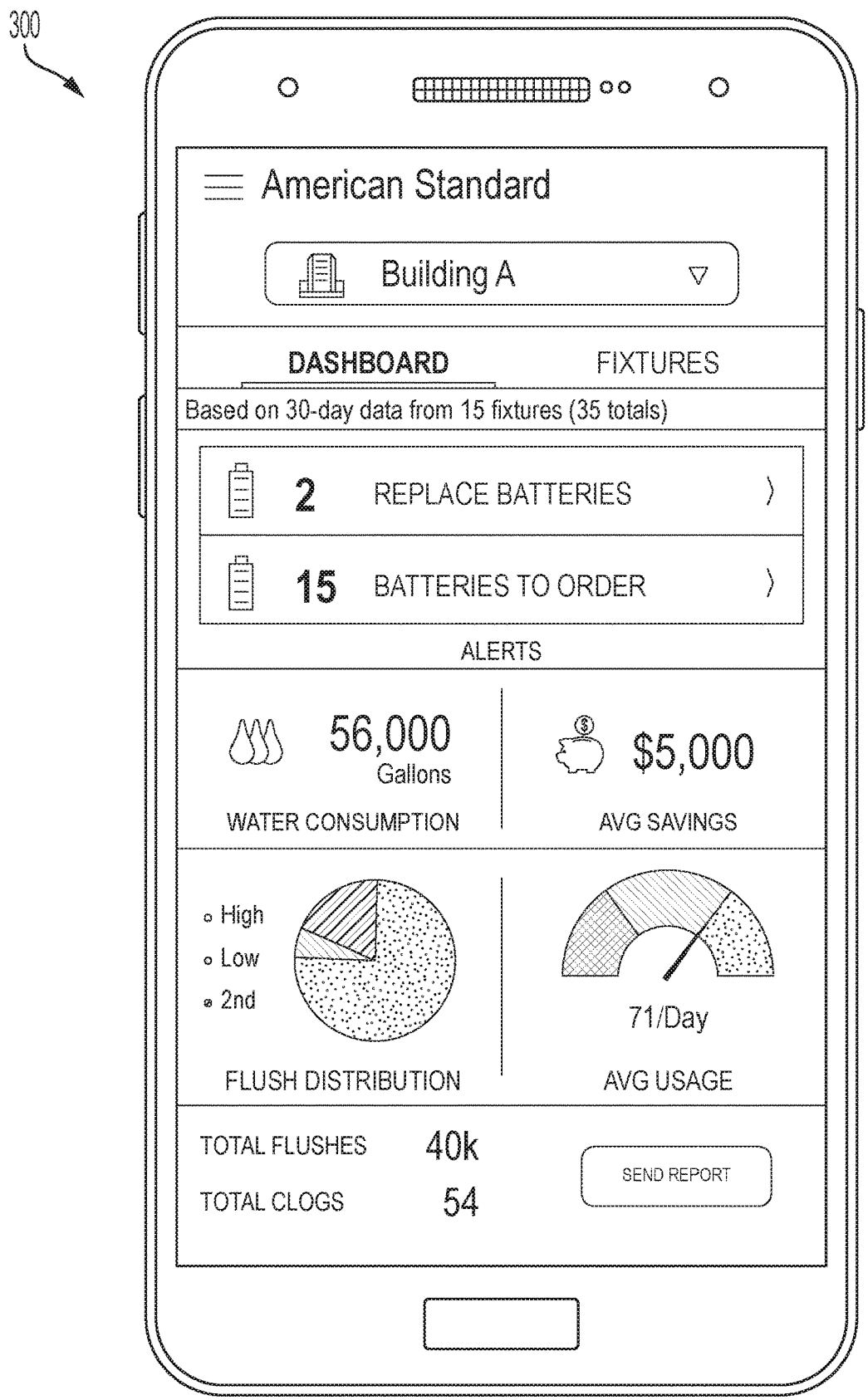
FIGS. 7A-7F show a user side of an exemplary user dashboard.
Figure 7A:
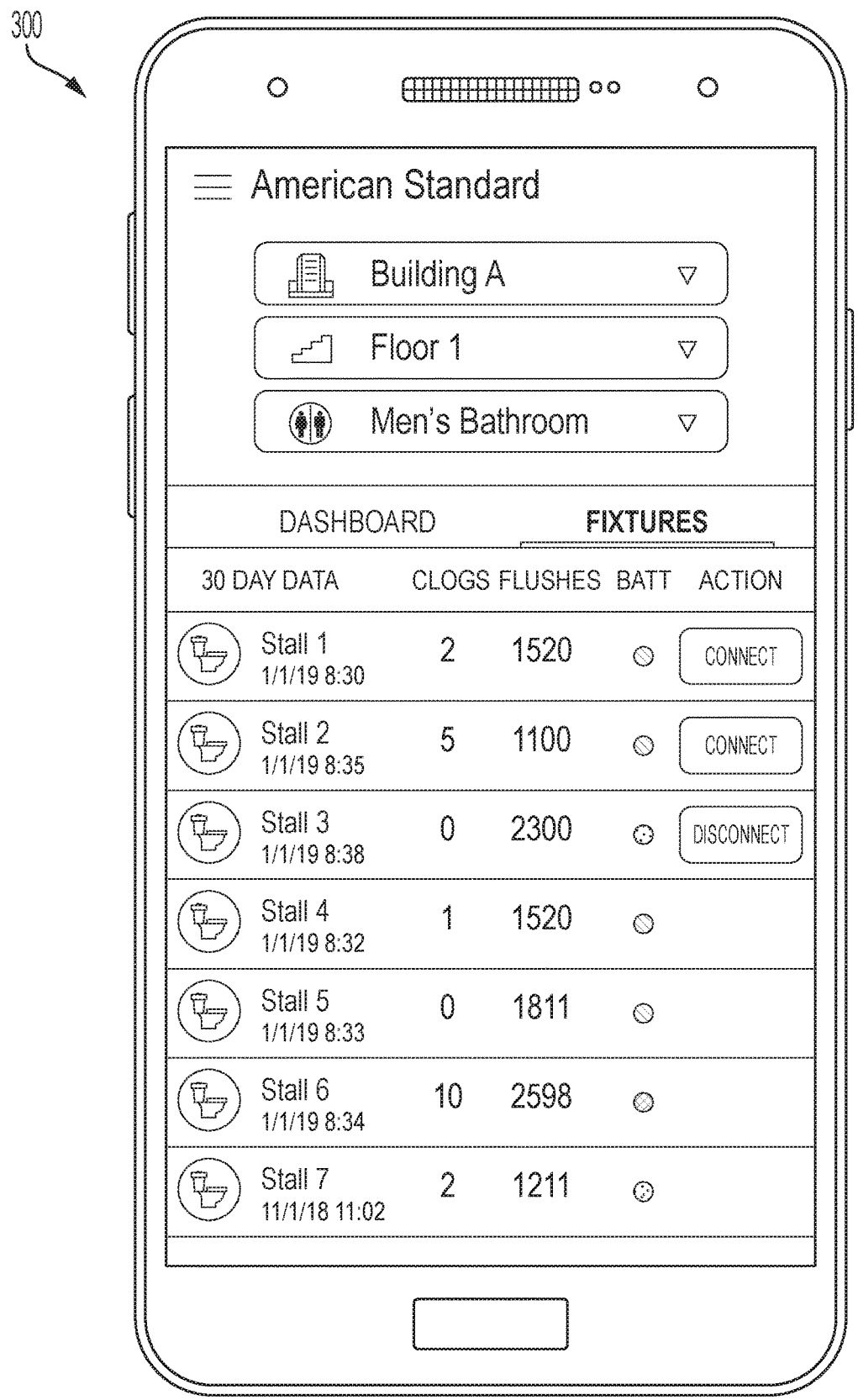
Figure 7A:
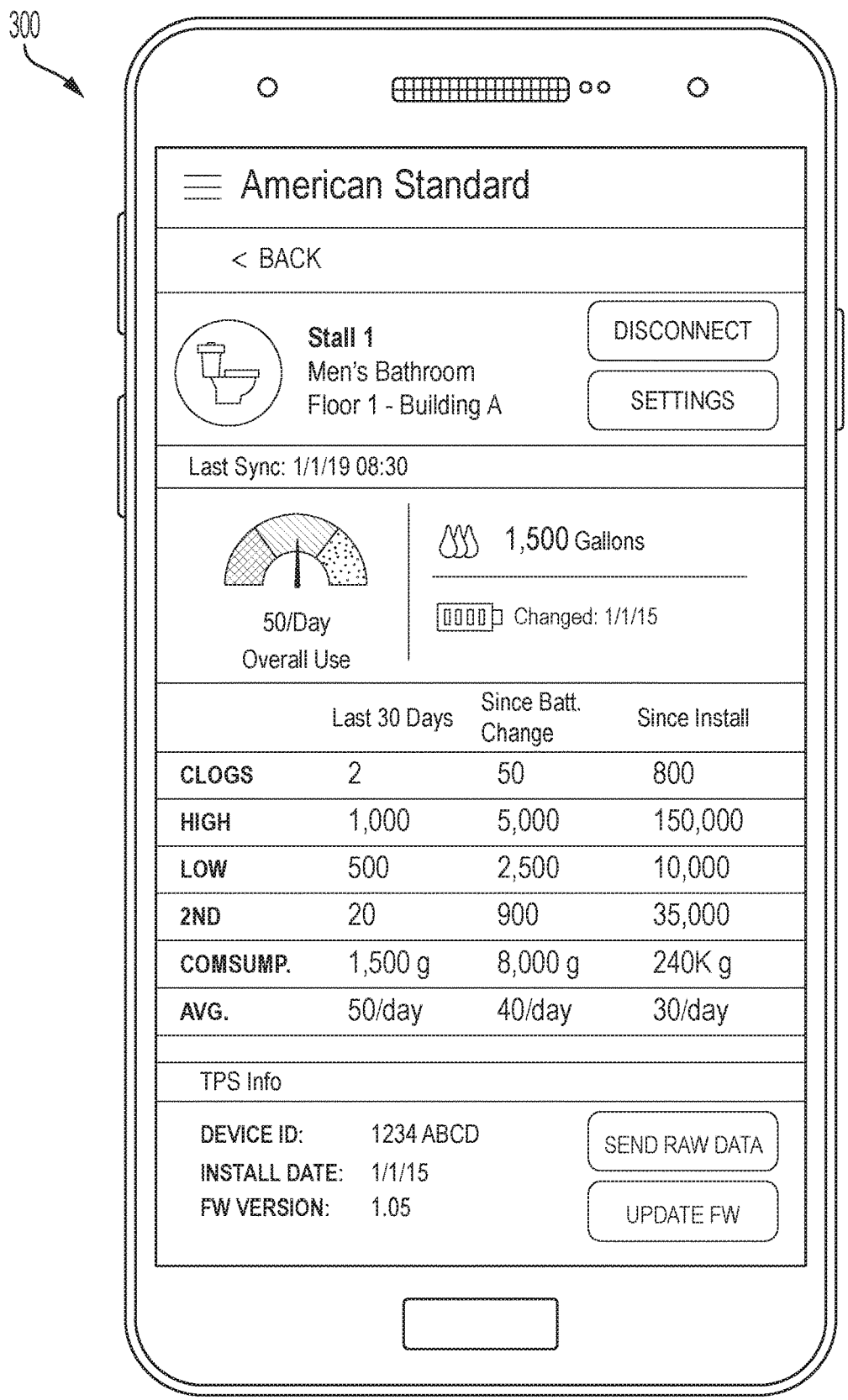

FIGS. 7A-7F show various exemplary screens available in the dashboard 300 or similar dashboard. The user may select from a stand-alone mode (e.g., not connected to the server 122, communicating directly with the particular component of the connected system 100) and a connected mode (e.g., communicating with the server 122). The user may log-in to the dashboard 300 such that each user may have a unique user dashboard personalized by the user. FIG. 7A shows an exemplary dashboard 300 similar to that previously described. In FIG. 7A, monitoring and control of each particular component of the connected system 100 is permitted. The user may select a particular building, floor, bathroom, and stall to view the status of clogs, flushes, and/or battery. The user may view the status and/or control the status of the ability of the particular component to be internet connected. The dashboard 300 may allow the user to order replacement batteries directly, view water consumption, view average savings, view flush distribution between various flush types (e.g., low and high flush, average daily usage, etc.). The dashboard 300 may allow a user to send data to a third party, control the settings of a particular component, and/or monitor and control other aspects of the connected system 100.

Figure 7B:
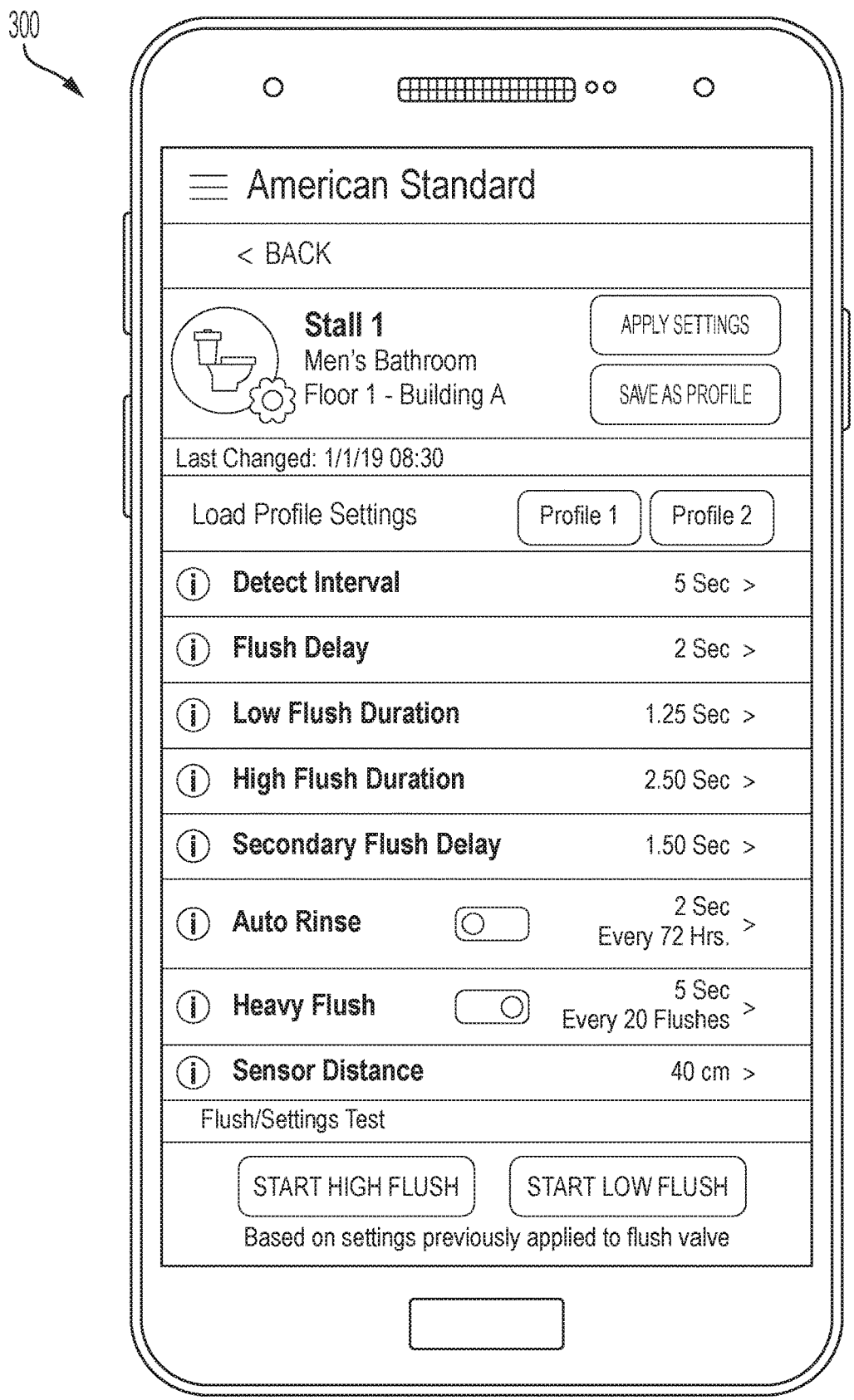
Figure 7B:
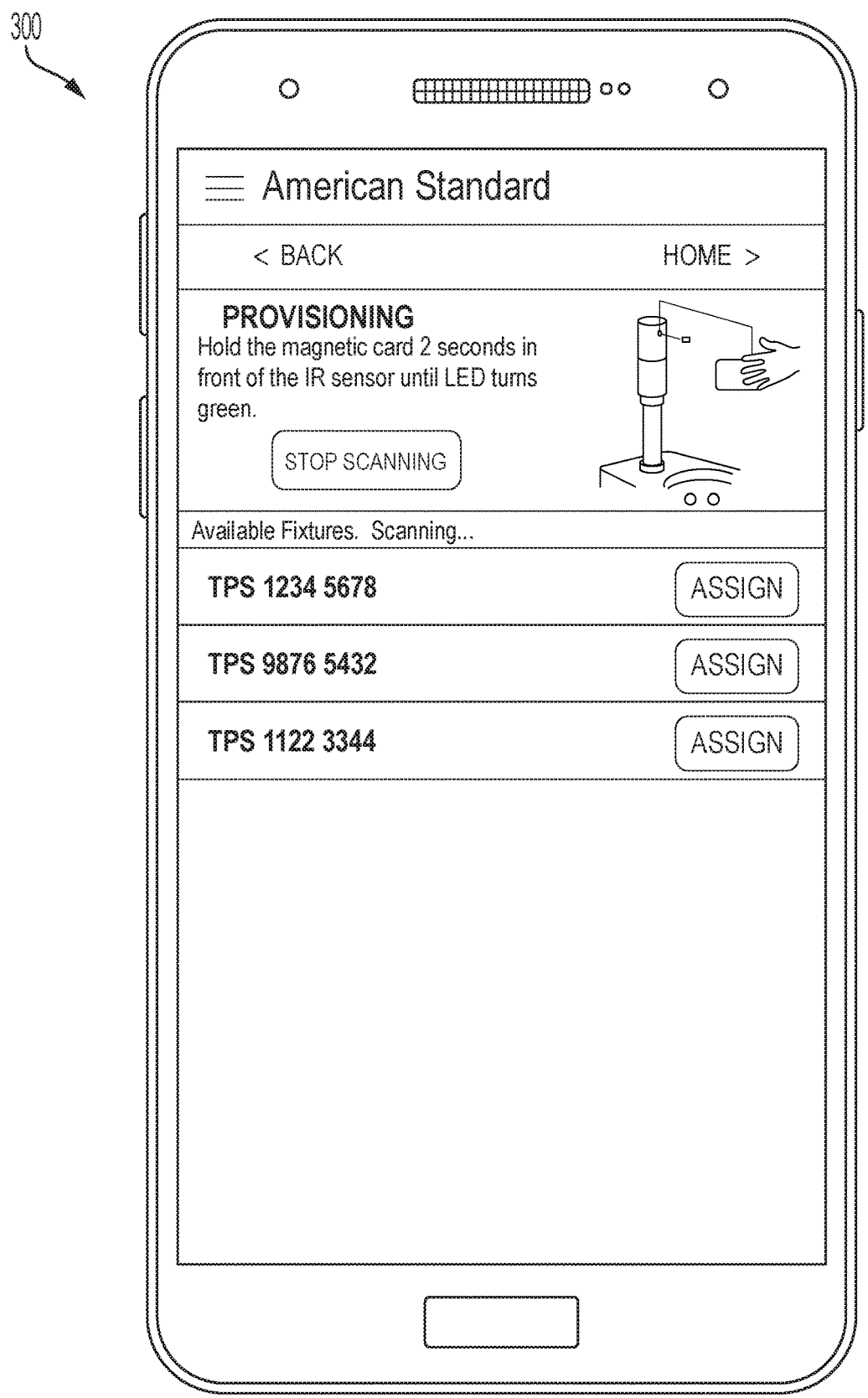
Figure 7B:

FIG. 7B shows an exemplary dashboard 300 with a detailed look at one particular sanitaryware device and its associated flush valve assembly. As depicted, the dashboard 300 may allow a user to view and control the settings of the sanitaryware device, such as, for example, the user detection interval, the delay between detection and flush, the duration the valve is open in a low flush, the duration the valve is open in a high flush, a secondary flush delay, turning on/off an automatic rinse of the sanitaryware, turning on/off an automatic heavy flush, the distance to which a sensor measures. These may be user settings and/or may be particular to the flush valve assembly, location of the toilet, or other factors, or combinations thereof.

Figure 7C:
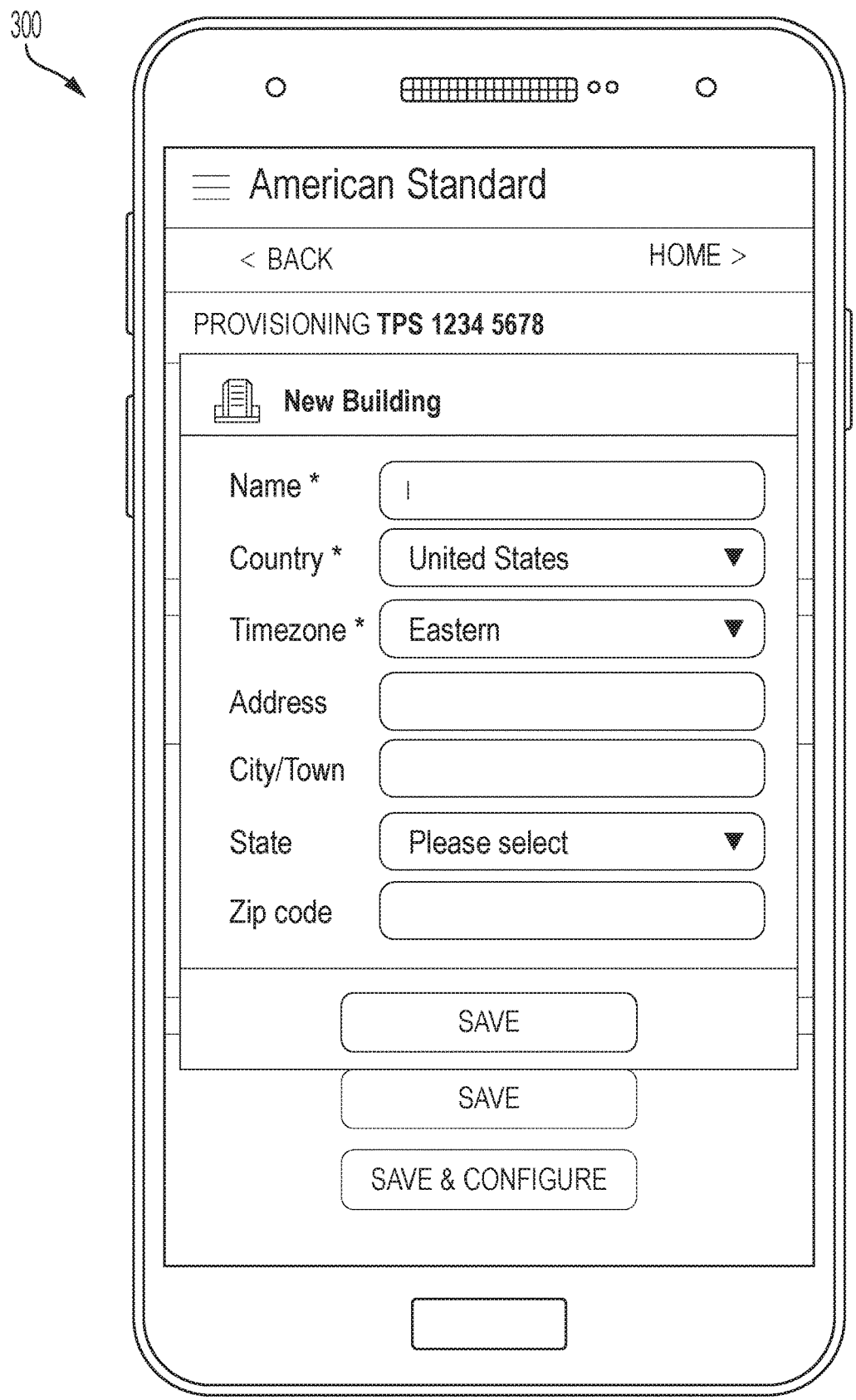
Figure 7C:
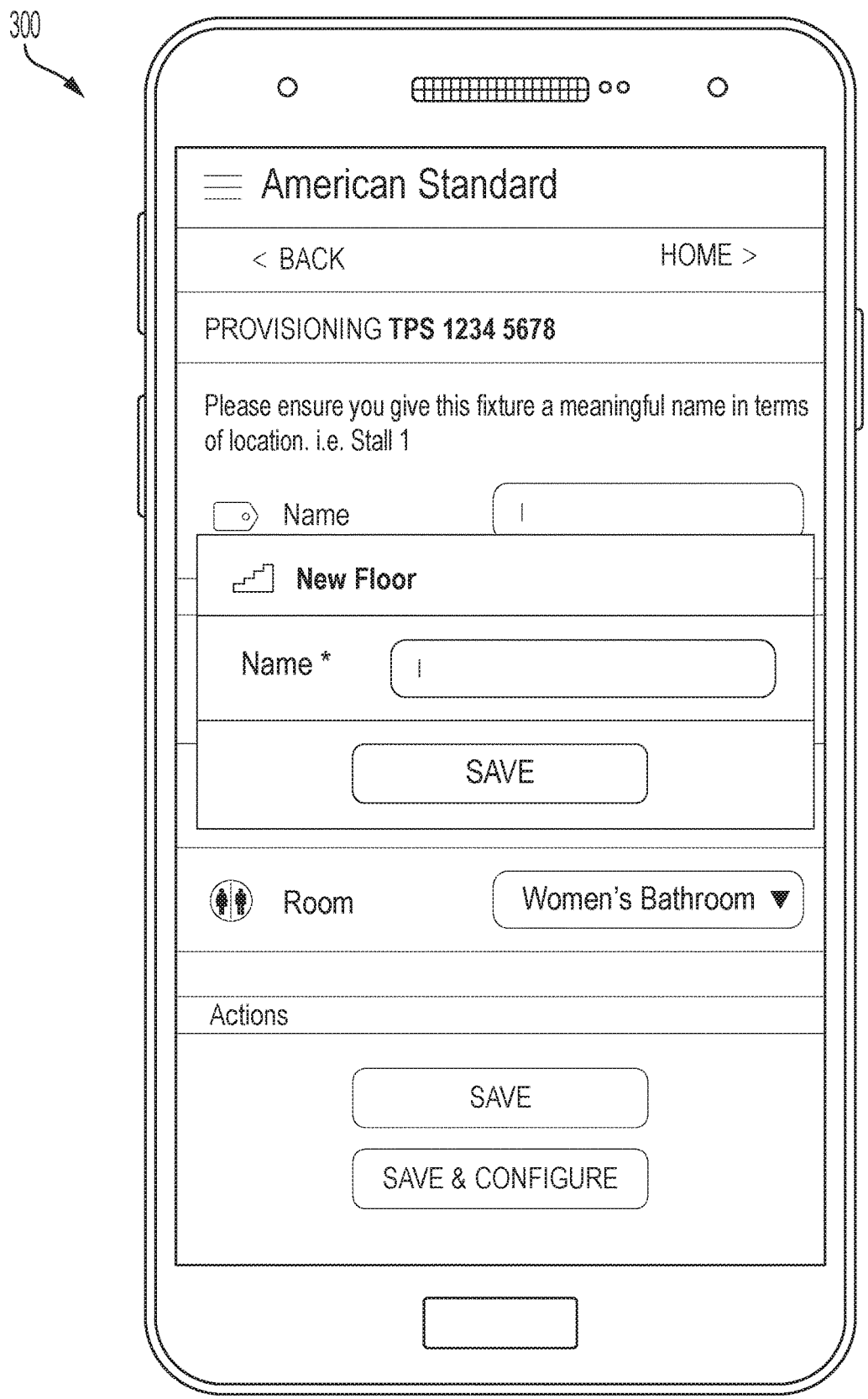

FIG. 7C shows an exemplary dashboard 300 with set-up control of the connected system 100. Each component of the connected system 100 (e.g., each toilet, urinal, sink, flush valve, faucet, soap dispenser, toilet paper dispenser, paper towel dispenser, etc.) may be separately entered into the system. This may allow for individual monitoring and/or control of each component.

Figure 7D:
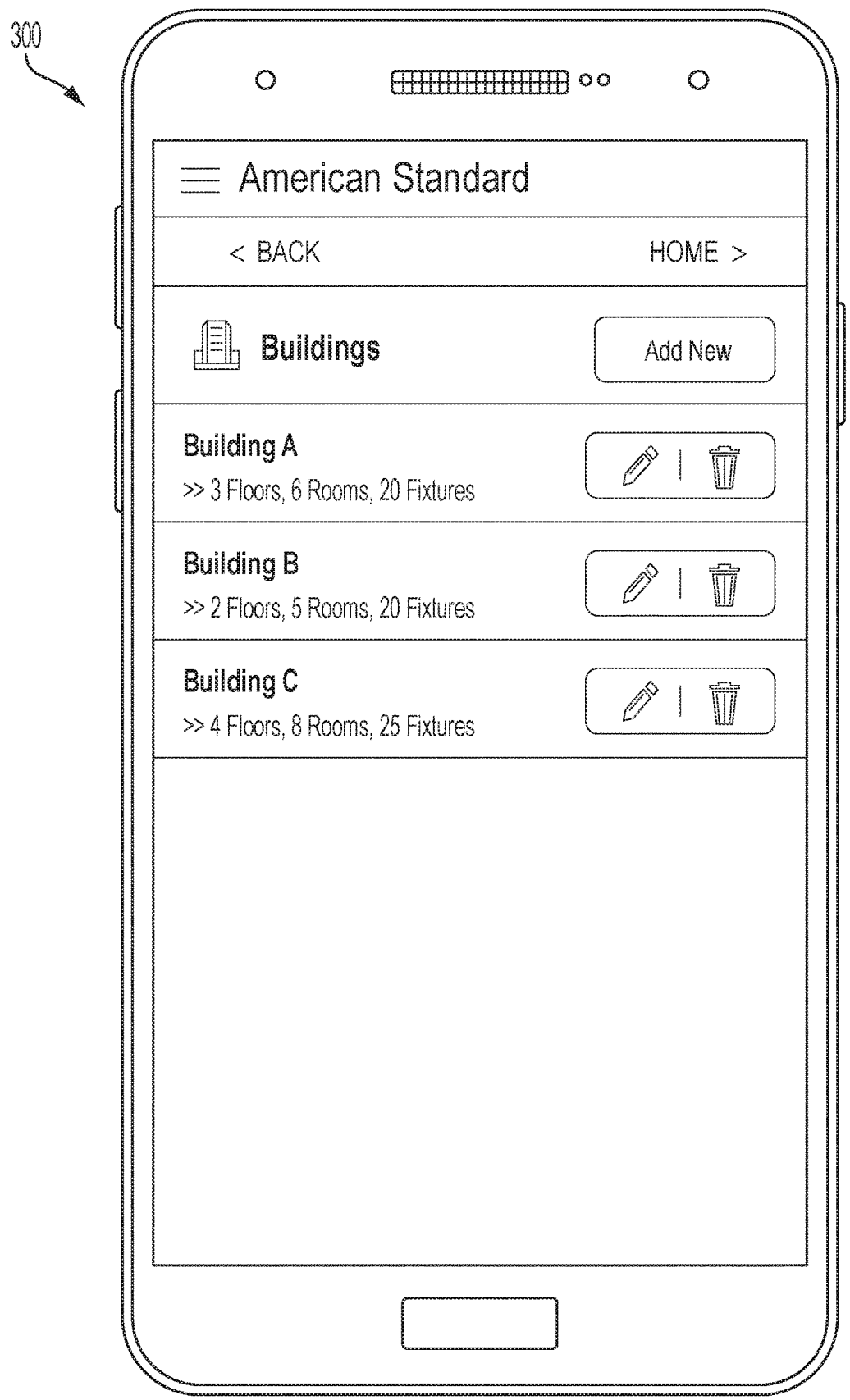
Figure 7D:
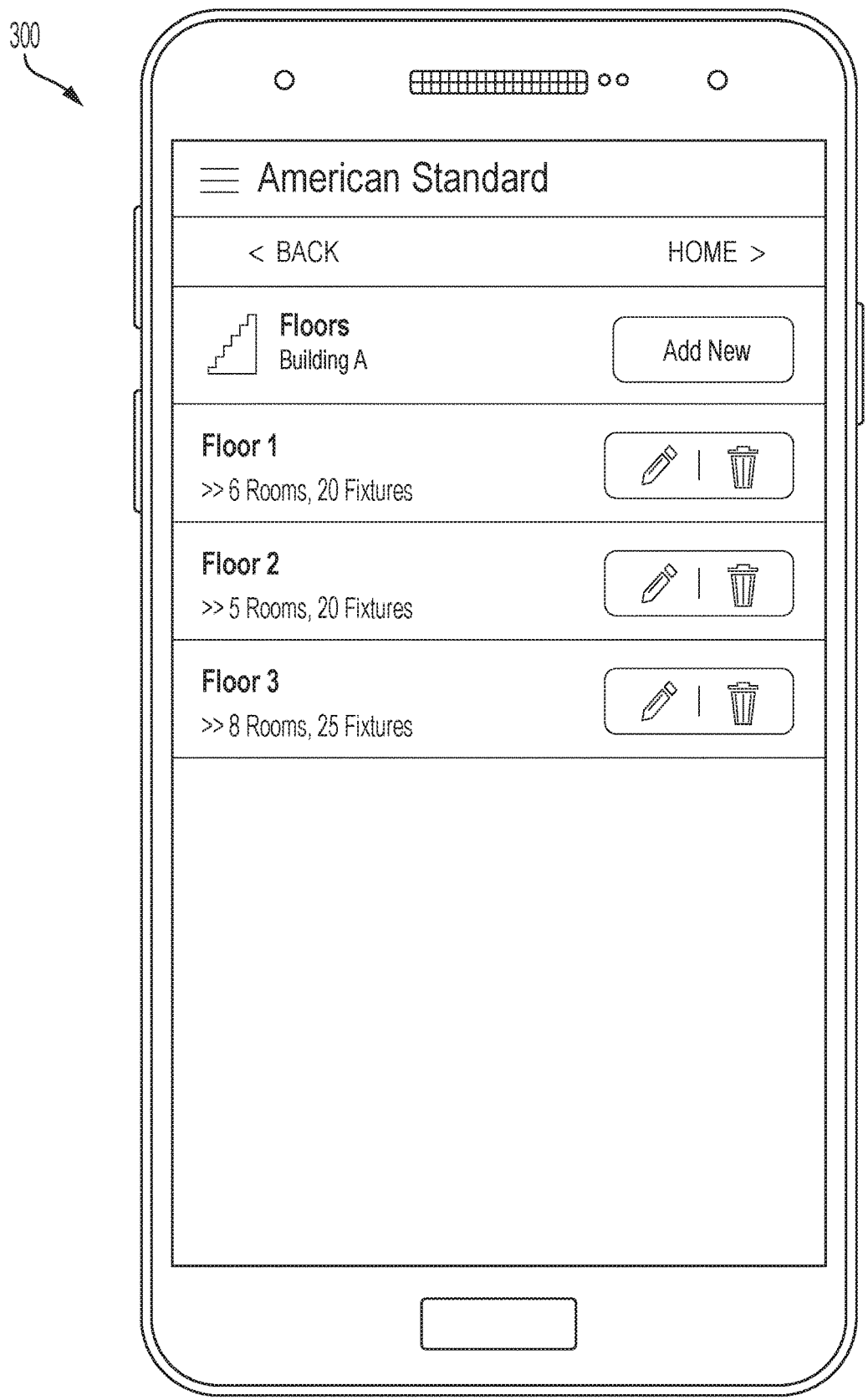
Figure 7D:

FIG. 7D shows an exemplary dashboard 300 with individual building and floor monitoring and control of the connected system. FIG. 7F shows exemplary dashboards 300 that may be employed to set up the connected system 100. Each building and floor may be assigned particular fixtures or devices within them. Although depicted as building and floors, other parameters may be assigned, such as rooms or wings, or combinations of buildings, floors, rooms, wings, etc. This may allow for monitoring and control of a subset of components of the connected system 100 as selected by the user.

Figure 7E:
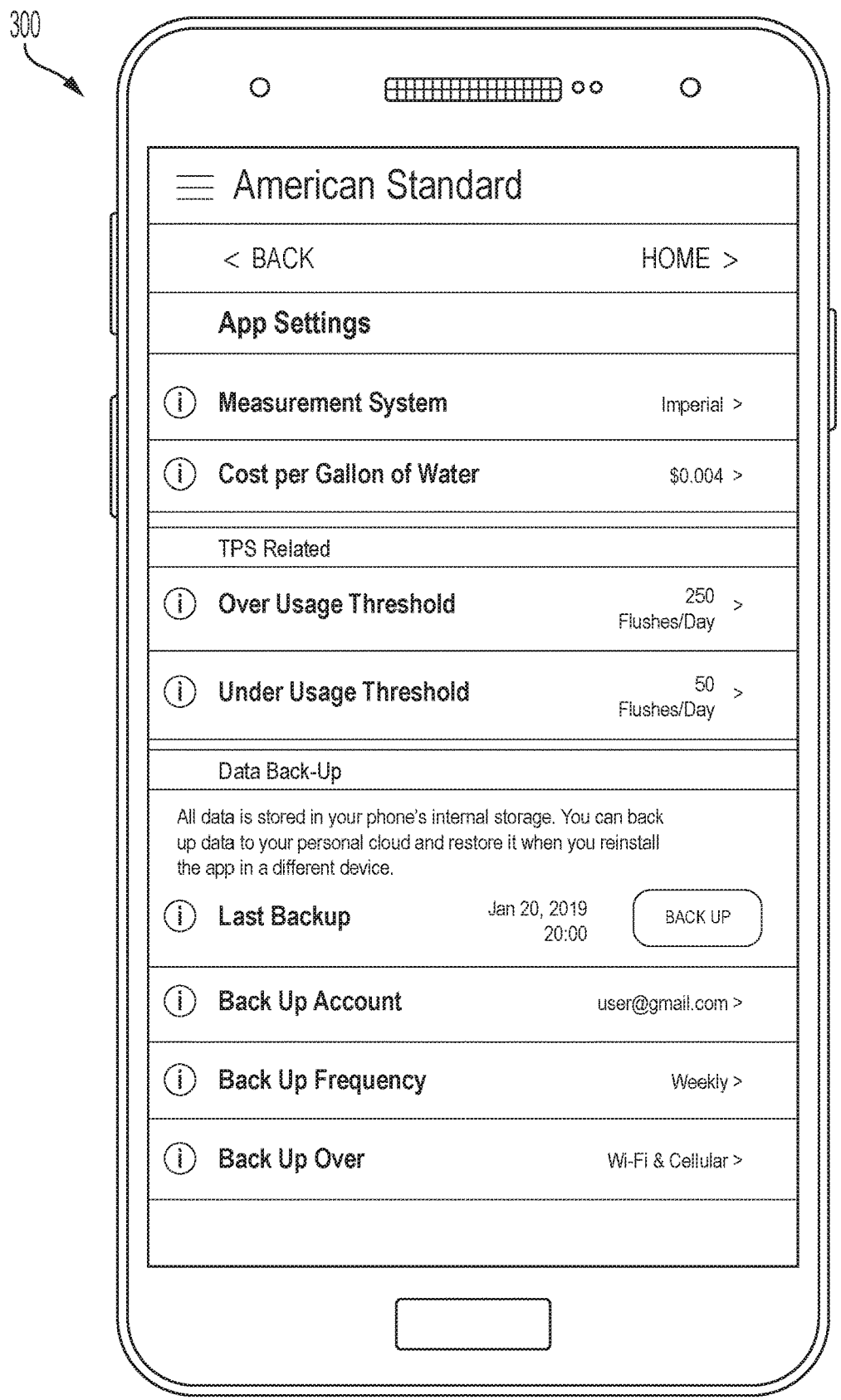
Figure 7F:
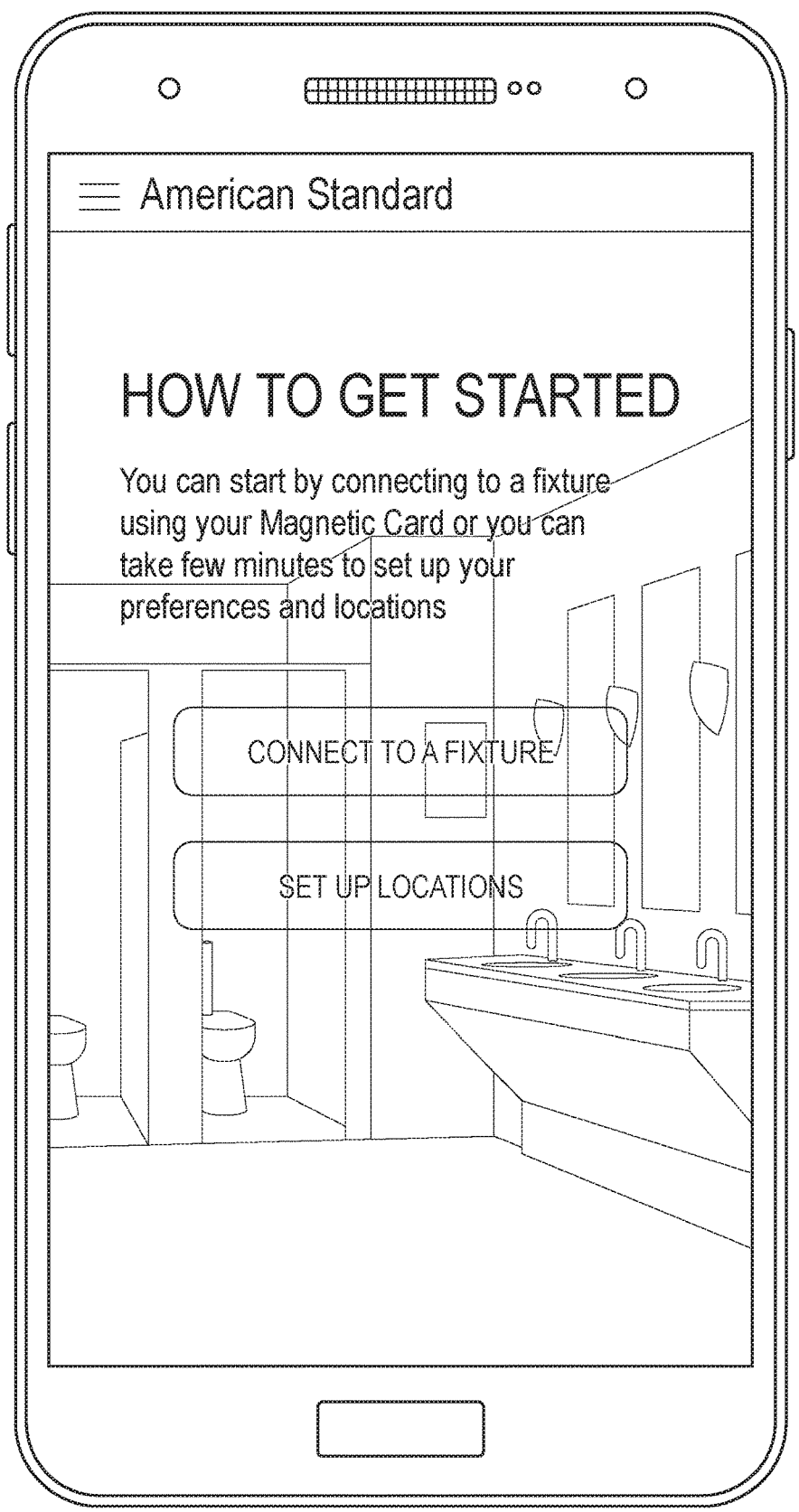
Figure 7F:
Figure 7F:

FIG. 7E shows an exemplary dashboard 300 with settings parameters. The user may set the parameters based on their particular local and/or desired settings. Such settings may include, for example, measurement system, cost per gallon of water, a threshold for over usage, a threshold for under usage, backup status, back up account, back up frequency, and back up communication settings, and any combination thereof. The settings may be used to calculate water savings or costs for the connected system, high and low usage toilets, etc. This may allow for the user to put certain portions of the connected system 100 out of service (e.g., a low used toilet may be removed), determine service frequency (e.g., a high used toilet may be serviced more frequently than a normal schedule), or perform other functions with respect to the Events described herein.

Any of the information monitored, displayed, and analyzed with the dashboard may be filtered or categorized as desired by the user. For example, by bathroom type, days, month, year, time of day (e.g., business hours, workdays, shift time), stall, usage, clog status, communication status, or by any of the parameters described herein.

Any of the information, control, settings, data, and/or modules depicted in FIGS. 5, 6, and 7 may be employed be either dashboard 200, dashboard 300, other dashboard, or other user interface employed by the user on a computing device 112.

As described herein, the dashboard may monitor historical data, system performance over time, traffic in/out of a bathroom, faucet or sink usage, sanitaryware fixture usage.

Figure 8:
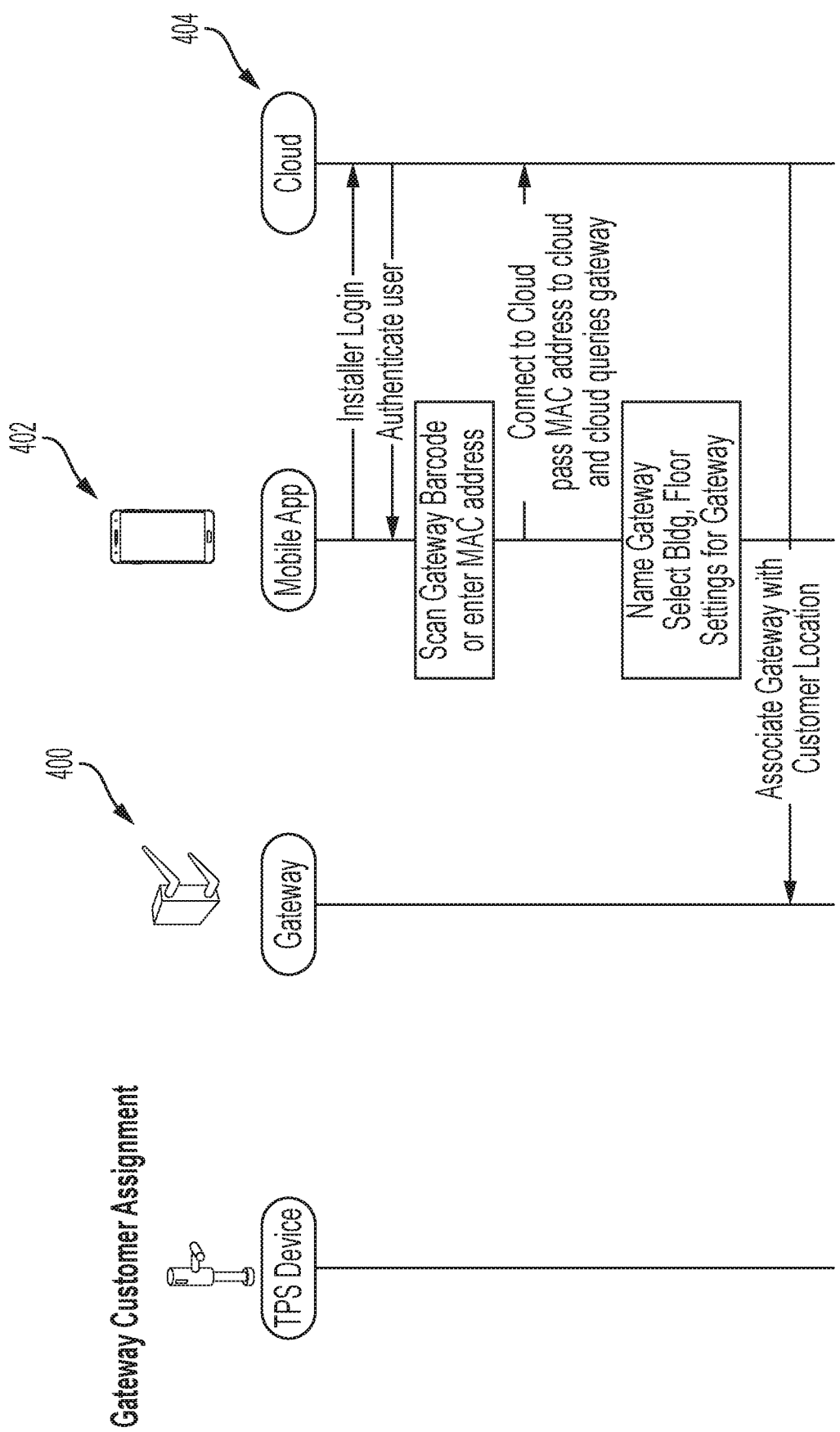
FIG. 8 shows an exemplary gateway customer assignment.

FIG. 8 shows an exemplary user gateway assignment for a connected system. The gateway 400 may be associated with a particular location by the user. The user may employ a computing device 402 (e.g. such as a mobile application) to assign the gateway location and set up the connected system. The user may initiate log-in steps on the mobile application, the server 404 may authenticate the user and allow the log-in to the mobile application on the computing device 402. The user may scan or enter the address of the gateway 400. The computing device 402 may communicate with the server 404 and transmit the gateway 400 address to the server 404. The user may name and locate the gateway 400. The server 404 may thus associate the gateway 400 with a particular location within the user's connected system. That is, the user may have a gateway 400 for each room, floor, wing, building, or subset of devices that are intended to be monitored and controlled with the connected system. The server 404 may control the gateway assigned to that particular location based on information passed to and from the user by way of the computing device 402.

Figure 9:
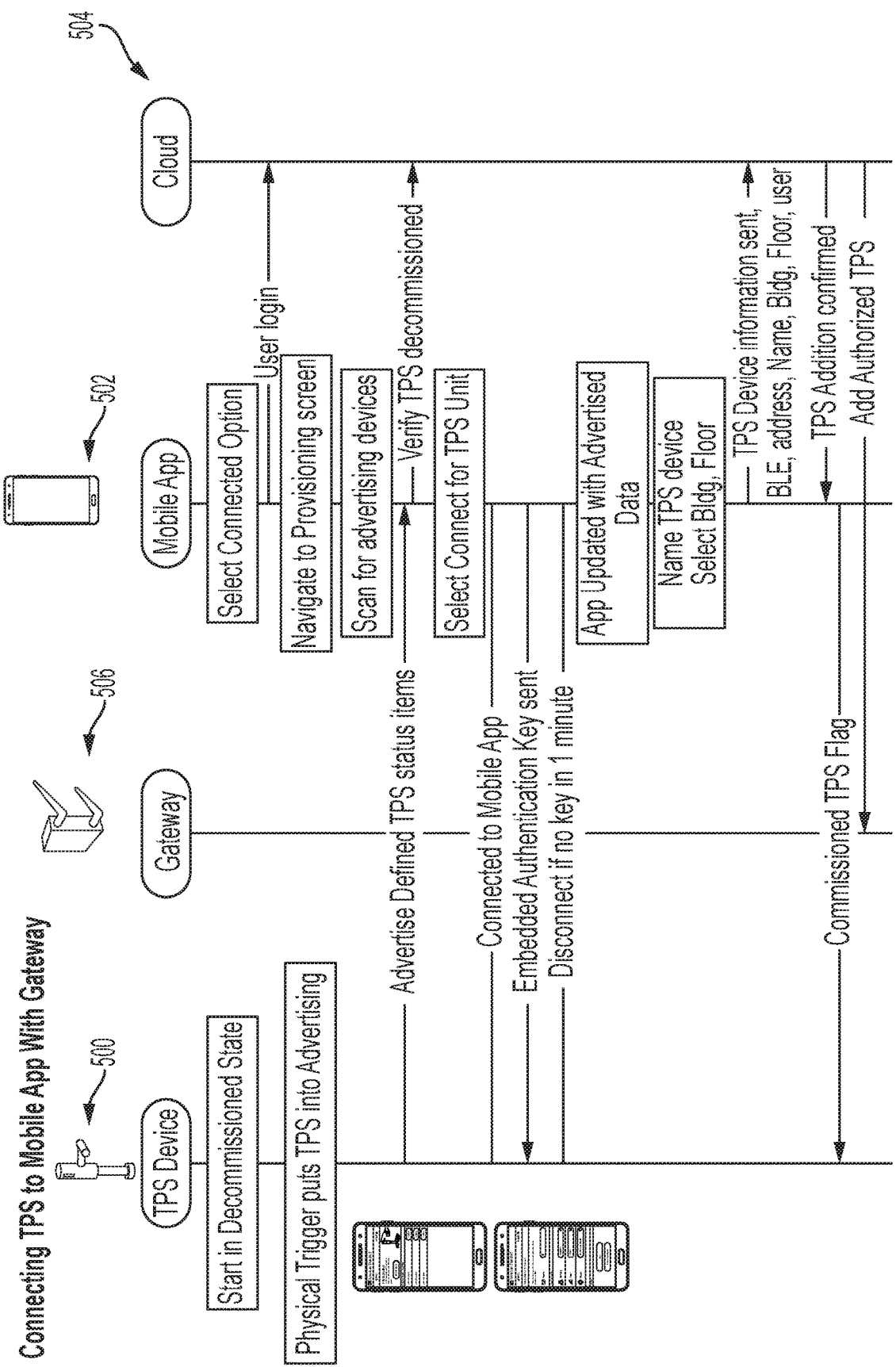
FIG. 9 shows an exemplary connection of a flush valve assembly to a computing device having a gateway.

FIG. 9 shows an exemplary flush valve assembly control for a connected system with the use of a gateway. The flush valve assembly 500 may be associated with a particular location by the user. The user may employ a computing device 502 (e.g., such as a mobile application) to assign the flush valve assembly 500 and set up the connected system. The user may initiate log-in steps on the mobile application, the server 504 may authenticate the user and allow the log-in to the mobile application on the computing device 502. The user may scan or enter the address of the flush valve assembly 500. The computing device 502 may communicate with the server 504 and transmit the flush valve assembly 500 address to the server 504. The user may name and locate the flush valve assembly 500. The server 504 may thus associate the flush valve assembly 500 with a particular location within the user's connected system. That is, the user may have a flush valve assembly 500 for each sanitaryware fixture in each of numerous rooms, floors, wings, or buildings that are intended to be monitored and controlled with the connected system. In FIG. 9, the communication between the computing device 502 and the flush valve assembly 500 occurs by way of a gateway 506 and the server 504, as described herein (e.g., as described in FIGS. 1A and 1B).

Figure 10:
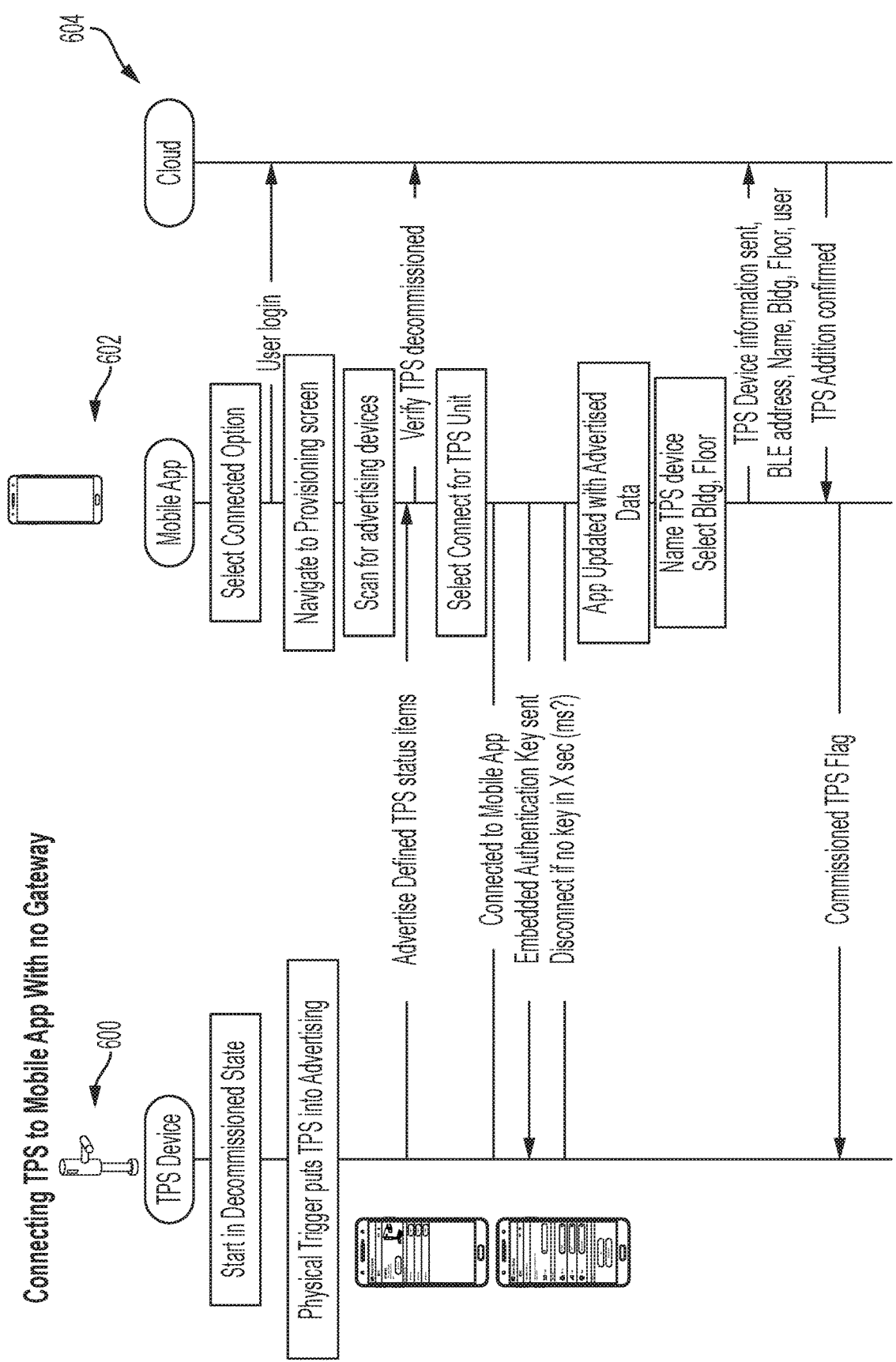
FIG. 10 shows an exemplary connection of a flush valve assembly to a computing device having no gateway.

FIG. 10 shows an exemplary flush valve assembly control for a connected system without the use of a gateway. The flush valve assembly 600 may be associated with a particular location by the user. The user may employ a computing device 602 (e.g., such as a mobile application) to assign the flush valve assembly 600 and set up the connected system. The user may initiate log-in steps on the mobile application, the server 604 may authenticate the user and allow the log-in to the mobile application on the computing device 602. The user may scan or enter the address of the flush valve assembly 600. The computing device 602 may communicate with the server 604 and transmit the flush valve assembly 600 address to the server 604. The user may name and locate the flush valve assembly 600. The server 604 may thus associate the flush valve assembly 600 with a particular location within the user's connected system. That is, the user may have a flush valve assembly 600 for each sanitaryware fixture in each of numerous rooms, floors, wings, or buildings that are intended to be monitored and controlled with the connected system. In FIG. 10, the communication between the computing device 602 and the flush valve assembly 600 occurs by way of the computing device 602 without a gateway. The computing device 602 separately communicates with the server 604. The Flush valve assembly 600 does not communicate with the server 604, as described herein (e.g., as described in FIGS. 1A and 1B).

The following events describe exemplary situations in which the above mentioned connected system 100 may be employed. Any of the features described above with respect to the connected system may be employed in the events and vice versa. The connected system and the events are not exclusive or exhaustive of those described herein. Although the following Events are described primarily in the context of sanitaryware fixtures, the concepts and applications may be used in other components of the connected system, such as, for example, faucets, sinks, toilet paper dispensers, soap dispensers, paper towel dispensers, and/or other fixtures within a building not limited to the bathroom.

Event: Flush Volume

The sanitaryware may be programmed with an algorithm to determine flush volume. This may allow the sanitaryware to select a precise or specific flush volume for the particular function and/or the particular status of the sanitaryware as previously determined. The algorithm may take into account the water level threshold of the sanitaryware bowl, the duration threshold of the presence sensor, the duration of the presence sensor, and/or the sensed water level reading. The algorithm may allow the sanitaryware to select a high flush volume or a low flush volume based on the status or condition of the bowl. A high flush volume may be, for example, about 4 liters to about 9 liters (about 1.06 gallons to about 2.38 gallons). A low flush volume may be, for example, about 2 liters to about 4.5 liters (about 0.52 gallons to about 1.19 gallons). Thus, the flush valve of the sanitaryware may be operated to a high flush or low flush based on a particular sensed condition of the sanitaryware. In some embodiments, stored information on the history of the sanitaryware at the particular time of day, or in the particular location, or other stored information may be used to instruct the flush valve on whether to initiate a low flow or high flush.

The ability of the sanitaryware to determine a flush volume based on bowl status or other stored information may have water saving advantages. The sanitaryware and/or device may determine a status of the sanitaryware and, using the algorithm, initiate a high flush and/or low flush based on the particular condition of the sanitaryware. This may allow water savings as the appropriate volume of water is flushed with every flush cycle.

The particular flush initiated and/or the bowl status indicated may be communicated to a device (e.g. a server) to log and/or monitor the operation of the sanitaryware. The information on the flush (e.g. high or low), bowl status, volume of water used, etc. that is logged may be used for a variety of purposes. For example, the information may be used for budget planning, LEED validation, tenant marketing, return on investment, fixture investment, and/or management of consumable products (e.g. cleaning fluids, detergents, deodorizers, toilet paper, etc.). The information may be used to monitor toilet habits or activities and the Metrics of the same of a user. This may be helpful in hospitals, where patient toilet activities and metrics of the same may be monitored and logged for health care purposes. The information may be used to compare a ratio of toilet usage (e.g. liquid to solid). The information may be used for influence of code agencies with data. The information may be used to monitor water usage of the sanitaryware and thus monitor water usage of all sanitaryware in a building. This may allow for potential of water savings based billing. The information may be used for customer marketing. The information may be used to control the same flush valve at a future time and/or to control a flush valve of another sanitaryware.

Thus, the monitoring and logging of the flush volume initiated with each flush of the sanitaryware, may improve the overall efficiencies of the sanitaryware. The tracking may allow the water supply to a building be carefully managed and use of the water supply may be maximized. For example, the building may be able to account for higher usage of the water supply to the building at certain times of day, based on data logged from the sanitaryware. At these times, the system may communicate with other devices (e.g. other plumbing fixtures or devices controlling other plumbing fixtures) to reduce the water supplied to these devices during this time period. Thus, as described, the monitoring of the data may improve the efficiencies of the sanitaryware by conserving water through the sanitaryware and/or throughout the building. Other uses of the data to achieve the improved efficiencies are contemplated.

Event: Clog

The ability of the sanitaryware system to determine a clog event and take appropriate action (e.g. closing the angle stop valve and/or shutting off flow to the flushometer) may have disaster prevention advantages, may allow for higher availability and/or lower downtime of the sanitaryware, may allow for a cleaner restroom, and may improve client satisfaction. The sanitaryware fixtures of the sanitaryware system may include one or more sensors as previously described. The one or more sensors may detect a parameter of the sanitaryware, such as, for example, a water level in the toilet bowl. The sanitaryware system may determine a condition of the sanitary fixture and/or system based on the sensed parameter. For example, where the sanitaryware system senses a high water level in a fixture, the system may determine a clog is present in the fixture. The sanitaryware system may thus determine a status of the sanitaryware and determine if a clog event has occurred and/or if the sanitaryware is clogged. The connected system may set a target time period for average clog resolution. The connected system may thus determine an action to be taken (e.g., which technician to dispatch) to obtain resolution within the average time period.

The sanitaryware may initiate task request to a user, janitor, or technician to clear the clog or otherwise service the sanitaryware fixture. Alternatively, or additionally, the sanitaryware system may close the angle stop or shut flow to the flushometer to prevent usage of the sanitaryware until the technician is able to service the sanitaryware. This may allow water savings as water is prevented from flowing to the sanitaryware and the sanitaryware is prevented from being used during the inoperable status of the sanitaryware. This may also prevent damage to the sanitaryware and bathroom as a user is unable to operate the clogged sanitaryware to cause further clogging which may result in damage.

The clog status of the sanitaryware may be communicated to the server to log and/or monitor the operation of the sanitaryware and may be logged for a variety of purposes. For example, the information may be used to initiate a service ticket to a janitor and/or technician. The information may be used to monitor overall health of the building by location and over time (e.g. over the course of the life of the sanitary are). The information may be used to monitor trends (e.g. trends in clogging), poor plumbing, and/or vandalism, etc. The information may be used to diagnose drain line versus sanitaryware clogs. The information may be used to monitor performance of the particular chinaware model of the sanitaryware. The information may be used to monitor building plumbing health by age, type, location, time, and/or sanitation system. The information may be used for failure analysis, diagnostic of true clog versus a failure to open the valve. The information may be used for customer marketing tracking.

Thus, the monitoring and logging of clog events may improve the overall efficiencies of the system. The tracking may allow live collection of fixtures within the building and the water supply of the building to be carefully managed. For example, monitoring the number of times or times of day a particular sanitaryware is clogged may allow for preventative maintenance or early diagnosis of a failure. The system may also communicate with other sanitaryware to allow for compensation for the out of service toilets. Furthermore, it may allow technicians and/or janitors to improve efficiencies in managing the plumbing fixtures in a building. Knowing the time, location, and sevenly of a clog may allow for the technician and/or plumber to arrive properly prepared to address the clog. The location of clogs or malfunctioning toilets may be mapped for the technician and/or janitor. This may also allow the technician and/or plumber to address more than one problem toilets at a single time. Furthermore, historical data of clogging at a particular sanitaryware may be used to control the sanitaryware and other sanitaryware. Thus, as described, the logging of the clogged events may improve efficiencies of the sanitaryware and a collection of multiple sanitaryware by allowing for disaster prevention, higher availability and/or lower downtime of the sanitaryware, cleaner restroom, and improved client satisfaction. Other uses of the data to achieve the improved efficiencies are contemplated.

Event: Leak Detection

The ability of the sanitaryware to determine leak detection in to the bowl and issue an alert, may have water saving advantages and indirect energy saving advantages. The sanitaryware may determine a status of the sanitaryware and determine if a leak is occurring, where the leak is occurring, and for how long the leak has been occurring. For example, the sanitaryware may be equipped with one or more sensors which monitor the flow through the angle stop and/or flush valve. When a constant flow is detected, the system may determine a leak is occurring.

In an exemplary embodiment, the sanitaryware may include one or more sensors that may be ultrasonic sensor(s). In the event there is leaking of water from the tank and/or flush valve into the toilet bowl, a disturbance occurs in the water in the toilet bowl. That is, a ripple or wave may be created in the static bowl water due to the dripping water from the tank and/or flush valve. For example, a toilet that is not in use may have water in the toilet bowl that is in a static state. Turbulence in the water, due to leaking from a component of the toilet may be detected with the ultrasonic sensor. A sampling of the signal using the ultrasonic sensor (absence and presence of a Time of Flight (ToF) may be used to determine if there is water leaking into the bowl. Thus, the ultrasonic sensor may be employed to detect the state of the bowl (e.g. a clog is present). The determination of the state of the bowl is described in more detail in Grover et al. The sanitaryware system may be programmed to interpret extended turbulence in the bowl as an indication of a malfunction in the sanitaryware fixture, such as an improper closure of the flush valve, defective or damaged flush valve, or other detective or damaged component.

The sanitaryware system may communicate with a technician, plumber, facilities manager, and/or janitor to initiate a service ticket for servicing of the sanitaryware fixture and/or system. Early detection of a leak may save water, save energy, and allow for early correction of the problem by initiating an alert or service ticket to at technician and/or janitor. In some embodiments, the sanitaryware may automatically send a signal to the angle stop, closing the angle stop, to prevent further fluid from leaking in the sanitaryware. At the same time, the sanitaryware may communicate an alert to a technician to remedy the problem.

The leak detection in the sanitaryware may be communicated to the server to log and/or monitor the operation of the sanitaryware system. For example, the information may be used to initiate a service ticket to a janitor and/or technician. The information ma be used to automatically close an angle stop valve. The information may be used to lower water costs (e.g. by closing valves to prevent on-going leaks), to initiate proactive service (e.g. due to part ware, such as ware to valve parts), to evaluate return on investment, for marketing, to initiate proactive replacement of parts (e.g. sending an alert or e-mail to a facility manager replace the valve or parts thereof), to monitor reliability of the data (e.g. by locality, water quality and type, usage frequency, pressure, and type). Historical data on leak detected at a sanitaryware may be used to control the sanitaryware or other sanitaryware.

Thus, the monitoring and logging of leak events may improve the overall efficiency of the system. The tracking may allow the sanitaryware and/or collection of sanitaryware in a building to be carefully managed. For example, monitoring the occurrences of leaks may allow for preventative maintenance or early diagnosis of a failure. The system may also communicate with other devices or sanitaryware to allow for compensation for the out of service sanitaryware. Furthermore, it may allow technicians and/or janitors to improve efficiencies in managing the plumbing fixtures in a building. Knowing the time, location, and severity of a leak may allow for the technician and/or plumber to arrive properly prepared to address the leak. The location of the leaking sanitaryware may be mapped for the technician and/or janitor. This may also allow the technician and/or plumber to address more than one problem toilet at a single time. Thus, as described, the logging of the leaking toilets may improve efficiencies of the sanitaryware and a collection of multiple sanitaryware by allowing for issuance of an alert, water savings, and indirect energy saving advantages.

Event: Angle Stop Control

The ability of the sanitaryware to detect a status of the angle stop may allow for disaster prevention, communication with building owner, and water savings. The sanitaryware may determine a status of the sanitaryware and determine if a clog event has occurred, if the sanitaryware is clogged, if there is a leak, or other failure of the flush valve. The sanitaryware may initiate a task request to a user, janitor, or technician to address the maintenance and/or repair. Alternatively, or additionally, the sanitaryware may automatically close the angle stop or shut off flow to the flushometer to prevent usage of the sanitaryware until the technician or janitor is able to service the sanitaryware. This may allow water savings as water is prevented from flowing to the sanitaryware and the sanitaryware is prevented from being used during the inoperable status of the sanitaryware. This may also prevent damage to the sanitaryware and bathroom as a user is unable to operate the inoperable sanitaryware until the sanitaryware can be serviced. In some embodiments, the angle stop may be controlled automatically to control the flow of water flowing through the sanitaryware. That is, the angle stop may be controlled to close, partially-close, open, or partially-open, based on the particular status of the bowl and/or based on instructions received at the sanitaryware.

The angle stop status and control thereof may be communicated to the server to log and/or monitor the operation of the angle stop and may be logged for a variety of purposes. For example, the information may be used to allow for self-diagnosis of the sanitaryware, diagnosis, and main water supply shut off. For example, the angle stop may be closed and the status of the sanitaryware may be compared both before and as the angle stop is closed. Comparing the bowl status may allow for the sanitaryware to self-diagnosis if there is a leaking valve versus a clogged toilet. The sanitaryware may then communicate the determination (e.g. leaking valve or clogged toilet) to a technician or janitor for remediation. The information may also be used to diagnosis a failure of a valve component or other sanitaryware component. This may inform further product improvements. The sanitaryware may also communicate to a janitor and/or technician that the angle stop has been closed and further initiate a service ticket. The information may be used to monitor performance of the particular angle stop and/or flush valve and allow for replacement or maintenance of same.

Thus, the monitoring and logging of angle slop status may improve the overall efficiencies of tire system. The tracking may allow a sanitaryware and multiple sanitaryware fixtures within the building and the water supply of the building to be carefully managed. Thus, as described, the logging of angle stop status may improve efficiencies of the sanitaryware and a collection of multiple sanitaryware by allowing for disaster prevention, communication with the building owner, and water savings. Other uses of the data to achieve the improved efficiencies are contemplated.

Event: Battery Status

The ability of the sanitaryware to monitor battery status may allow for initiation of a ticket, inventory management, service planning, proactive repair and/or replacement of parts, monitoring of battery life versus other trends, and marketing. The battery status may be communicated to the server to log and/or monitor the status of the battery. For example, the battery status may allow for preemptive recharging or replacement of the batteries to avoid or prevent the functions of the toilet from being inoperable due to an inoperable battery. Thus, the monitoring and logging of the battery status may improve the overall efficiencies of the system.

Event: Water Pressure Monitoring

The ability of the sanitaryware to monitor water pressure may allow for self-adjusting water volume based on pressure and may allow for water savings. The sanitaryware may monitor or sense a water pressure at one or more locations within the sanitary ware. The sanitaryware may monitor or sense a change in water pressure. In an exemplary embodiment, the sanitaryware may include one or more sensors (e.g. an ultrasonic sensor(s)) for monitoring a state of the water in the toilet bowl, as previously described and as described in Grover et al. The water in the toilet bowl may have a steady state condition where the water is stabilized (e.g. little or no disturbances in the water). At a normal or desired water pressure, the time for the water in the toilet bowl to stabilize after refilling (e.g. between flushes) may be a first time period. When there is high water pressure, the time for the water in the toilet bowl to stabilize may be greater than the first time period. When there is low water pressure, the time for the water in the toilet bowl to stabilize may be less than the first time period. The ultrasonic sensor may determine the time the water takes to stabilize and thus may determine a change in water pressure.

The sanitaryware may initiate a function in response to the water pressure being at a predetermined level or within a predetermined range, or outside of the predetermined level or range. For example, the sanitaryware may adjust a position of the angle slop to increase or decrease the pressure in the sanitaryware. The predetermined levels or ranges may be preprogramed in the sanitaryware or may be stored in the server for communicating to the sanitaryware. The predetermined levels or ranges may be updated based on historical data of the sanitary ware or other sanitaryware in the system. Thus, in the exemplary embodiment described above, the sanitaryware may maintain a desired water pressure in the system by responding to the monitored or sensed change in water pressure.

The water pressure may be communicated to the server to log and/or monitor the operation of the sanitaryware and may be logged for a variety of purposes. For example, the information may be used to initiate a service ticket. The information may be used as data capture for return on investment and/or marketing communications (re: water savings). The information may be used to facilitate troubleshooting (e.g. cost savings, less time diagnosing issues, fixing issues with one visit, bringing the right parts and tools for repair, sending the requests to the correct department or individual). The information may be used for customer education. The information may be used for trends (e.g. building plumbing health by age, type, location, time, sanitation system, etc.). The information may be used for new product development, support claims investigations and payouts, and support building water pressure management systems, etc. Thus, the monitoring and logging of water pressure may improve the overall efficiencies of the system.

Event: Sanitaryware Usage and Metering

The ability of the sanitaryware to monitor usage and metering may allow for the ability to determine fixture availability, metering, real-time bathroom availability by location, and efficient building design. The sanitaryware usage and metering may be communicated to the server to log and/or monitor the operation of the sanitaryware. For example, the information may be used to monitor how, when, and how frequently a bathroom, sanitaryware, or other bathroom fixtures are being used. The information may be used to determining trends in bathroom usage. The information may be used to determine frequency and level of cleaning and maintenance. Predictive analytics in combination with the sensor information and information from surrounding devices may be used to determine the frequency of use of the sanitaryware device (e.g., if the frequency of use is too low or too high). For example, the controller may determine a condition is an uncharacteristically high or low level of usage of the fixture or fitting and the action is initiating a service ticket. The condition may be an uncharacteristically high or low level of usage of one or more the sanitaryware fixtures as compared to historical. The information may be used to identify unusual inactivity and initiate a service ticket. The information may be used to determine service planning, monitoring how restrooms re utility by building type, and develop bathroom availability messaging. Thus, the monitoring and logging of sanitaryware usage and metering may improve the overall efficiencies of the system.

Event: Media Sensing

The ability of the sanitaryware to monitor media sensing may allow for a clean and sanitary bathroom. The sanitaryware may sense the media remaining in and/or around the sanitaryware. The sanitaryware may be communicated to the server to log and/or monitor the operation of the sanitaryware. For example, the information may be used to initiate a service ticket (e.g. to perform a bathroom cleaning and/or sanitaryware cleaning), to monitor trends in bathroom usage and clean based on those trends, to diagnose overall health of the building by location and over the course of time (e.g. plumbing issues, vandalism, drainage issues, other toilet diagnostics). The information may be used for new product development based on the low and/or high pressure building learnings, media sensing, type of sanitaryware, toilet seat cover usage, etc. Thus, the monitoring of media sensing may improve the overall efficiencies of the system.

Event: Monitor Water Level

The ability of the sanitaryware to monitor water level and determine a high or low water level may allow fora health environment and water savings. The sanitaryware may be sense a water level in the bowl of the sanitaryware. The sanitaryware may compare the water level to a predetermined range and take an action based on the water level. For example, if the water level is too high, the sanitaryware may close the angle stop or flush valve and initiate a service ticket. If the water level is too low, the sanitaryware may admit water to the bowl. The sanitaryware may communicate the water level status to the server to log and/or monitor the operation of the sanitaryware. The information may be used to facilitate trouble shooting, for the overall health of the building by location and over lime (e.g. trends, bad plumbing, vandalism, drainage, toilet diagnoses), proactively to send customer alerts on water levels, in particular low water levels. The information may be captured for return on investment and marketing communications about water savings and/or for market. Thus, the monitoring of water level may improve the overall efficiencies of the system.

Event: Line Clog

The ability of the sanitaryware to detect a line clog may allow for water savings advantages and a healthy environment. The sanitaryware may determine a status of the sanitaryware and determine if a clog event has occurred and/or if the line is clogged. The sanitaryware may be able to distinguish between a bowl clog and a line clog. For example, when there is a line clog, the water in the toilet bowl may be slow to drain and/or in a series or bank of toilets, one or more toilets may experience high water levels in the toilet bowls. A sensor may be provided (e.g. an ultrasonic sensor) to monitor or sense the water level in each toilet bowl. If the sensor detects slow draining in the toilet bowl or high water levels in one or more toilet bowls, as described in Grover et al., the system may determine there is a line clog.

For example, in a series or bank of sanitaryware fixtures, each fixture may include one or more sensors. The one or more sensors may detect a water level in the fixture bowl. The sensors may detect a rise in the water level in the fixture bowl. The system may determine from the sensor readings that the rise of water level in one or more fixtures in a series or bank of fixtures is indicative of a line clog. A line clog may exhibit a rise in water level in some or all of the fixtures in a series of fixture (e.g. in a public restroom). The system may attribute the rise in water level to the line clog and initiate a ticket to a facilities manager, janitor, and/or technician to service the plumbing and/or fixtures.

In another example, one or more sanitary ware fixtures may include one or more sensors. The one or more sensors may measure a fall in the water level in the toilet bowl. That is, the sensor may measure a rate of change in the water level in the fixture bowl. The system may attribute a slow rate in change of the water level (e.g. after a flush cycle) to a slow drain condition. The slow drain condition may indicative of malfunction or damage in the sanitaryware fixture. The system may initiate a ticket to a facilities manager, janitor, and/or technician to service the plumbing and/or fixtures.

The sanitaryware system may initiate a task request to a user, janitor, or technician to clear the line clog and/or service the plumbing to address the line clog. Alternatively, or additionally, the sanitaryware may close each angle stop in a line of sanitaryware or shut off flow upstream of the line of sanitaryware to prevent usage of the sanitaryware(s) until a technician, janitor, or plumber is able to service the line or plumbing. This may allow water savings as water is prevented from flowing to the sanitary ware and the sanitaryware is prevented from being used during the inoperable status of the sanitaryware. This may also prevent damage to the sanitaryware and bathroom as a user is unable to operate the toilet which may cause damage to the sanitaryware and/or plumbing.

The line clog status may be communicated to the server to log and/or monitor the operation of the sanitaryware and may be logged for a variety of purposes. For example, the information may be used to initiate a service ticket to a janitor and/or technician. The information may be used to monitor overall health of the building by location and over time (e.g. over the course of the life of the sanitaryware). The information may be used to monitor trends (e.g. trends in clogging), poor plumbing, and/or vandalism, etc. The information may be used to diagnose drain line versus toilet clogs. The information may be used to monitor building plumbing health by age, type, location, time, and/or sanitation system. The information may be used for failure analysis, diagnostic of true dog versus it failure to open the valve. The information may be used for customer marketing tracking, return on investment, or marking communications about water savings. The information may be used to proactively send customer alerts on low water levels. Thus, the monitoring and logging of clog events may improve the overall efficiencies of the system.

Event: Cleaning Cycle

The connected system may communicate with a user, such as a janitor or technician. The user may remotely operate (e.g. via wireless communication, a dashboard, or combination thereof) the sanitaryware or other components of the connected system. The user may send instructions via a dashboard on one or more of a tablet, mobile device, or computer to the sanitaryware. The user may thus control, maintain, and/or repair the sanitaryware remotely. For example, the sanitaryware may include a cleaning cycle. The user (e.g. janitor or janitorial staff, homeowner, other users) may instruct (e.g., via the dashboard) the sanitary Tare to enter the cleaning mode. The user may send the instructions according to a scheduled cleaning program, alternatively, a computer may send the instructions automatically, with no intervention by the user. The sanitaryware may monitor the status of the bowl as previously described and determine the status of the sanitaryware to be unclean. The sanitaryware may communicate the status to the user who may then send the instructions to enter cleaning mode. Alternatively, the sanitaryware may autonomously instruct the cleaning system to operate a cleaning cycle based on the status of the sanitaryware (e.g., as detected from interaction with the server). In an exemplary embodiment, the sanitaryware may allow for automatic cleaning in a hospitality environment. For example, when a customer checks out of a hotel or lodging room, a signal may be sent to the sanitaryware. The signal may instruct the sanitaryware to enter the cleaning cycle.

Thus, the sanitaryware may be cleaned remotely and/or selectively, according to the needs of the particular sanitaryware or in response to instructions from a user. The activation of the cleaning mode may allow for simple and fast cleaning of the sanitaryware. The user may perform needed servicing (e.g. cleaning), without flush interruption. In an exemplary embodiment, the cleaning mode of the sanitaryware may be entered and a predetermined period of time (e.g. 10 minutes) may pass before a flush is automatically performed. This may allow the disinfectant and other cleaning materials present in the cleaning mode to have sufficient time to disinfect and/or clean the sanitaryware. The flush volume of the subsequent flush after the cleaning mode may be selectively chosen. In some embodiments, the flush volume may be selected to be larger than a flush performed during the normal course of use. The flush volume may be selected to be 1.6 gallons.

Accordingly, each piece of sanitaryware or other component in a connected system may be monitored. That is, every time the sanitaryware is cleaned and/or maintenanced in some manner, the occurrence may be tracked. In some embodiments, the sanitaryware may send a signal indicating maintenance or cleaning has been performed to the server. In some embodiments, when the technician sends the cleaning signal to the sanitaryware, the occurrence may be automatically logged. This may allow the cleaning to be tracked, monitored, graphed and/or monetized.

Event: Weather

The connected system may monitor weather and provide instructions to the sanitaryware or other component based on the weather. The connected system may retrieve information from the cloud (e.g., from a weather service, weather channel, weather application, etc.) as to the impending weather. If, for example, the weather is very cold, the connected system may instruct small, periodic flushes to prevent pipes within the connected system from freezing. If, for example, the weather is very hot and/or if the sanitaryware fixture is continuously or intermittently exposed to the elements, the connected system may instruct small, periodic flushes to prevent evaporation of the water within the bowl and thus exposure of sewer gases. The execution of small, periodic flushes may bring back the mechanical seal within the sanitaryware.

The connected system of the aforementioned disclosure may facilitate the maintenance and control of one or more sanitaryware fixtures in the system. That is, for example, the system may include all of the sanitaryware fixtures in an office building or on a particular floor of an office building. The system may monitor each individual fixture. The system may use information from a single fixture or a group of fixtures to determine a condition of the plumbing, each fixture, or the collection of fixtures. The system may notify a facilities manager or other personnel of the condition to perform remedial maintenance, preventative maintenance, identify problem fixtures or plumbing, minimize water usage, and otherwise optimize the building system. In one example, the sanitaryware system may be employed in a hospitality setting, such as a hotel or inn. The system may monitor toilets within the system, perform maintenance and cleaning, place fixtures out of service, and otherwise control the fixtures within the system.

Figure 11:
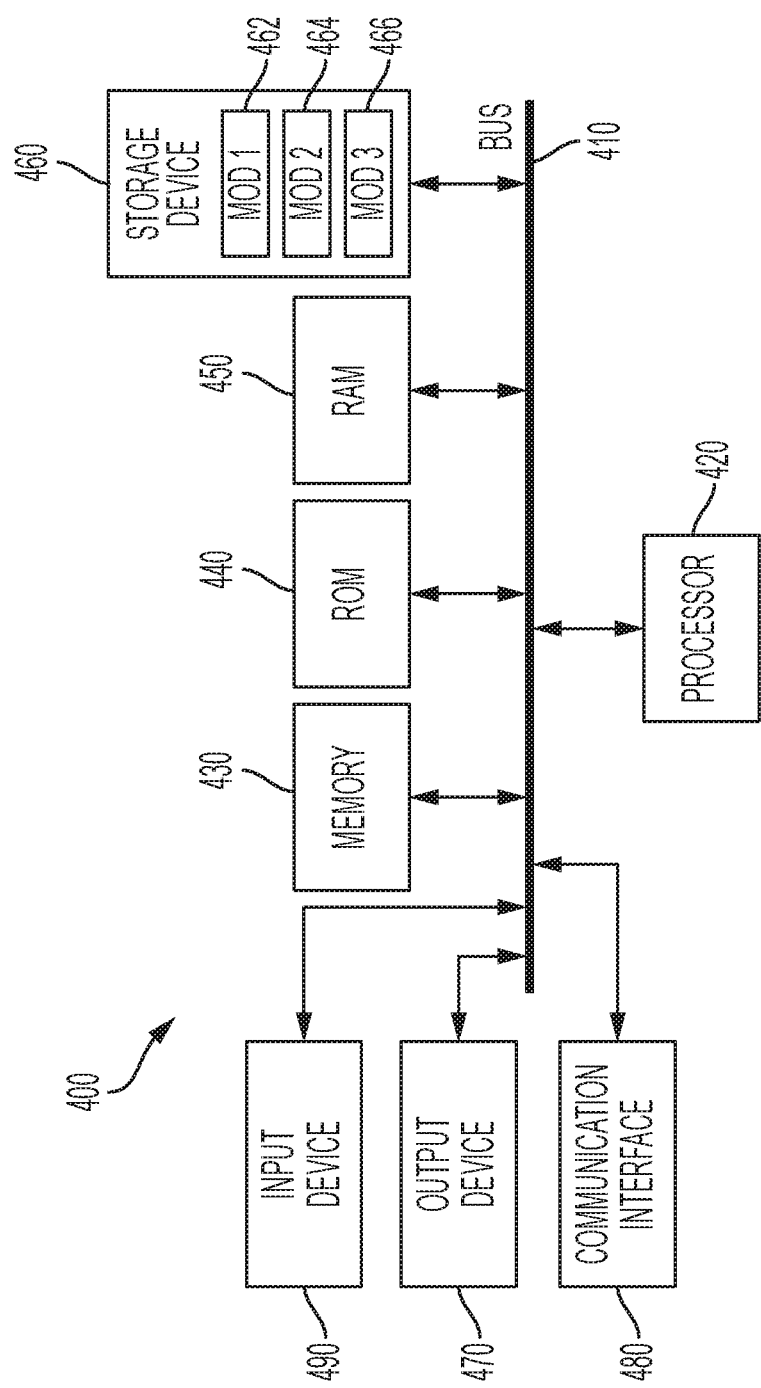
FIG. 11 shows an exemplary computing device.

Referring to FIG. 11, an exemplary system for use in the computing device 112 may include a general-purpose computing device 700, including a processing unit (CPU or processor) 720 and a system bus 710 that may couple various system components including a system memory to the processor 720. The system memory 730 may be a read-only memory (ROM) 440 and/or a random access memory (RAM) 450. The computing device 700 may include a cache of high-speed memory connected directly with, in close proximity to, and/or integrated as part of the processor 720. The computing device 700 may copy data from the memory 730 and/or a storage device 760 to the cache for quick access by the processor 720. In this way, the cache may provide a performance boost that avoids processor 720 delays while waiting for data. These and other modules may control or be configured to control the processor 720 to perform various actions. Other system memory 730 may be available for use as well. The memory 730 may include multiple different types of memory with different performance characteristics. The device 700 may operate with more than one processor 720 or on a group or cluster of computing devices networked together to provide greater processing capability. The processor 720 may include any general purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing, multiple cores or processors, a bus, memory controller, cache, etc. A multi-core processor may be symmetric or asymmetric.

The bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 may include software modules 762, 464, 466 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, bus 710, display 770, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk for the storage device 760, other types of computer-readable media which can store data that are accessible by a computer, such as magnetic cassettes, flash memory cards, digital versatile disks, cartridges, random access memories (RAMs) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device or display 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

The present disclosure may collect, share, and act on information generated from a toilet performance sensor systems as well as external behavior data from other similar or dissimilar systems. These similar systems may include other toilets and/or urinals. The dissimilar systems may include weather services, date and time management services, inline flow meters etc. The toilet performance system may be capable of differentiating between liquid and a solid event, as well as overflow events, and partial flush. In such situations the system may manage a valve by regulating the water follow or auto shutting off the system depending on the local event or external behaviors such as line clogs, weather (hot or cold), etc.

For example, during hot summers, a prolonged lack of use of a toilet can use the mechanical water seal to be compromised. In such an event if a toilet in a system of toilets detects a mechanical water seal compromise, the information can be shared with the total system to make necessary adjustment to maintain mechanical water seal. Likewise, during colder winter days, the system can be used to automatically dispense small amounts of water to maintain the integrity of the plumbing.

Additionally the system is capable of detecting water leaking into the bowl and change in the line pressure. In such situations the toilet performance system is capable of notifying water leaks to the patron as well as adjusting valve timing to regulate the water in the event of change in water line pressure. All the above mention events may be communicated to a user via wireless of wired digital communication methods. Furthermore the current sensing capability may allow reports of abnormal water levels in toilets. Similar aggregated data form system of toilets is capable of alerting users of imminent sewer line blockage.

Use of language such as "at least one of X, Y, and Z," "at least one of X, Y, or Z," "at least one or more of X, Y, and Z," "at least one or more of X, Y, or Z," "at least one or more of X, Y, and Z," or "at least one of X, Y, and/or Z," are intended to be inclusive of both a single item (just X, or just Y, or just Z) and multiple items (i.e., {X and Y}, {X and Z}, {Y and Z}, or {X, Y, and Z}). "At least one of" is not intended to convey a requirement that each possible item must be present.

Although the foregoing description is directed to the preferred embodiments of the invention, it is noted that other variations and modifications will be apparent to those skilled in the art, and may be made without departing from the spirit or scope of the invention. Moreover, features described in connection with care embodiment of the invention may be used in conjunction with other embodiments, even if not explicitly stated above.

The invention claimed is:

1. A connected sanitaryware system, comprising
a plurality of sanitaryware fixtures;
one or more sensors coupled to each of the fixtures; and
a control system comprising one or more controllers in electrical communication with a computing device and with the one or more sensors,
wherein
the one or more controllers are configured to communicate with the computing device directly and/or via a gateway,
the control system is configured to collect data from the one or more sensors, the control system is configured to determine a status of the sanitaryware fixtures based on the data, the plurality of sanitaryware fixtures comprises a plurality of toilets, the plurality of toilets comprise an ultrasonic sensor located on an exterior of a bowl of each toilet, the ultrasonic sensor configured to detect bowl contents, the plurality of toilets comprise an infrared sensor located on a flush valve assembly of each toilet, the infrared sensor configured to detect a usage time of each toilet, the control system is configured to collect bowl contents data from the ultrasonic sensor, and to collect usage time data from the infrared sensor, and the control system is configured to instruct a high volume flush or a low volume flush based on both the bowl contents data and the usage time data.

2. The connected system according to claim 1, wherein the connected system comprises a plurality of toilets, a plurality of urinals, and a plurality of faucets, and wherein the one or more sensors comprise one or more ultrasonic sensors, one or more infrared sensors, and one or more capacitive sensors.

3. The connected system according to claim 1, wherein the connected system comprises a plurality of toilets, a plurality of urinals, and a plurality of faucets, and wherein the one or more sensors comprise one or more ultrasonic sensors, one or more infrared sensors, one or more capacitive sensors, and one or more flow sensors.

4. The connected system according to claim 1, wherein the connected system comprises a plurality of toilets, a plurality of urinals, and a plurality of faucets, and wherein the one or more sensors comprise one or more ultrasonic sensors, one or more infrared sensors, one or more capacitive sensors, and one or more pressure sensors.

5. The connected system according to claim 1, wherein the control system is configured to initiate an action based on the status.

6. The connected system according to claim 1, wherein a technician may initiate an action via the computing device.

7. The connected system according to claim 1, wherein the computing device comprises a desktop computer, a laptop computer, mobile device, or combinations thereof.

8. The connected system according to claim 1, wherein the status is selected from a clog event, a leak detection, an angle stop position, battery life, water pressure, sanitaryware fixture usage, water level, line clog, bowl contents, and combinations thereof, and wherein the control system is configured to initiate an action based on the status.

9. The connected system according to claim 8, wherein the action is selected from instructing a flush valve to open, instructing a flush valve to close, instructing the high volume flush, instructing the low volume flush, initiating a service ticket, self-diagnosis of a clog, adjusting a duration a valve remains open, adjusting a valve position, monitoring usage of a bathroom, instructing an angle stop to close, sending a message to a technician, and combinations thereof.

10. The connected system according to claim 1, wherein the one or more controllers are configured to communicate with a cloud/server via the gateway.

11. The connected system according to claim 10, wherein the cloud/server is configured to send instructions to a controller of the one or more controllers via the gateway, and the controller is configured to initiate a sanitaryware action in response.

12. The connected system according to claim 10, wherein the computing device or the cloud/server is configured to send instructions to a controller of the one or more controllers based on programmed instructions and/or data stored on the computing device or the cloud/server.

13. The connected system according to claim 1, wherein the computing device is configured to communicate with a cloud/server.

14. The connected system according to claim 13, wherein the computing device is configured to receive instructions from the cloud/server and to send instructions to a controller of the one or more controllers, and wherein the controller is configured to initiate a sanitaryware action in response.

15. The connected system according to claim 13, wherein the computing device or the cloud/server is configured to send instructions to a controller of the one or more controllers based on programmed instructions and/or data stored on the computing device or the cloud/server.

16. The connected system according to claim 1, wherein the computing device is configured to send instructions to a controller of the one or more controllers, and the controller is configured to initiate a sanitaryware action in response.

17. The connected system according to claim 1, wherein the control system is configured to analyze, aggregate, store, and log the data.

18. The connected system according to claim 1, wherein the control system comprises a dashboard having visual modules and configured to monitor, display, and analyze the data.

19. The connected system according to claim 1, wherein the control system is configured to monitor data selected from historical data, performance over time, bathroom traffic, faucet or sink usage, sanitaryware usage, and combinations thereof.

20. The connected system according to claim 1, wherein the control system is configured to provide a daily, monthly, or yearly status of an individual sanitaryware fixture or of the plurality of sanitaryware fixtures.

21. The connected system according to claim 1, wherein the control system is configured to allow a technician to monitor the status of the sanitaryware fixtures remotely with the computing device.

22. The connected system according to claim 1, wherein the control system is configured to initiate an action based on the status, external data, or a combination thereof.

23. The connected system according to claim 22, wherein the control system is configured to initiate an action based on the external data or a combination of the status and the external data, and wherein the external data is data from weather services, date and time management services, or in-line flow meters.

24. The connected system according to claim 1, wherein the ultrasonic sensor is located on an exterior bottom center of the bowl of each toilet.

* * * * *